(12) United States Patent
Nomura

(10) Patent No.: US 7,990,572 B2
(45) Date of Patent: Aug. 2, 2011

(54) DEVICE ADAPTED FOR ADJUSTMENT OF SCAN POSITION OF LIGHT BEAM

(75) Inventor: Yujiro Nomura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 12/392,771

(22) Filed: Feb. 25, 2009

(65) Prior Publication Data

US 2009/0161177 A1 Jun. 25, 2009

Related U.S. Application Data

(62) Division of application No. 10/778,321, filed on Feb. 17, 2004, now Pat. No. 7,652,786.

(30) Foreign Application Priority Data

| Feb. 17, 2003 | (JP) | 2003-038040 |
| Feb. 26, 2003 | (JP) | 2003-049449 |
| Feb. 26, 2003 | (JP) | 2003-049450 |
| Mar. 14, 2003 | (JP) | 2003-069910 |
| Mar. 14, 2003 | (JP) | 2003-069911 |
| Mar. 24, 2003 | (JP) | 2003-080807 |
| Mar. 24, 2003 | (JP) | 2003-080808 |
| Mar. 24, 2003 | (JP) | 2003-080809 |
| Mar. 24, 2003 | (JP) | 2003-080810 |

(51) Int. Cl.
*G06K 15/12* (2006.01)

(52) U.S. Cl. .......... 358/1.7; 358/509; 358/1.5; 347/116; 347/247; 347/225; 347/234; 347/231; 399/4; 399/118; 399/200; 399/216

(58) Field of Classification Search .......... 358/509, 358/1.5, 1.15, 497, 474; 347/116, 247, 129, 347/225, 234, 231, 228; 399/3, 4, 118, 200, 399/216
See application file for complete search history.

(56) References Cited

U.S. PATENT DOCUMENTS

| 4,873,435 A | 10/1989 | Ono et al. |
| 5,014,094 A | 5/1991 | Amitani et al. |
| 5,276,463 A | 1/1994 | Andrews |
| 5,365,258 A | 11/1994 | Murata et al. |
| 5,532,812 A | 7/1996 | Choi et al. |
| 5,539,719 A | 7/1996 | Motoi |
| 5,629,790 A | 5/1997 | Neukermans et al. |
| 5,828,925 A | 10/1998 | Yoshizawa |
| 5,883,732 A | 3/1999 | Takada et al. |
| 5,963,240 A | 10/1999 | Shinohara et al. |

(Continued)

FOREIGN PATENT DOCUMENTS

EP 633688 A2 * 1/1995

(Continued)

*Primary Examiner* — Chan S Park
*Assistant Examiner* — Jamares Washington
(74) *Attorney, Agent, or Firm* — Sughrue Mion, PLLC

(57) ABSTRACT

An optical scanning device 65 is adapted to bring a deflector mirror plane 651 into independent pivotal motions about a first axis and a second axis perpendicular to each other. A mirror driver section including a first axis driver and a second axis driver is so controlled as to bring the deflector mirror plane 651 into pivotal motion about the first axis thereby deflecting a light beam L for scanning along a main scan direction. On the other hand, the deflector mirror plane 651 is pivotally moved about the second axis thereby to adjust the scanned beam L for its position on a photosensitive member 2 with respect to a subscan direction. Thus, even if the scanned beam is deviated from a reference scan position with respect to the subscan direction due to component tolerances or assembly errors, such a deviation can be corrected.

12 Claims, 38 Drawing Sheets

U.S. PATENT DOCUMENTS

| | | | |
|---|---|---|---|
| 6,002,506 A | 12/1999 | Suzuki et al. | |
| 6,229,656 B1 | 5/2001 | Omura | |
| 6,311,894 B1 * | 11/2001 | Miyajima et al. | 235/462.36 |
| 6,317,146 B1 | 11/2001 | Namura et al. | |
| 6,484,003 B2 | 11/2002 | Tokutake et al. | |
| 6,493,010 B1 | 12/2002 | Takahashi et al. | |
| 6,633,737 B1 | 10/2003 | Tanaka et al. | |
| 6,654,160 B2 | 11/2003 | Ogura | |
| 6,757,089 B2 | 6/2004 | Hayashi | |
| 6,775,159 B2 | 8/2004 | Webb et al. | |
| 6,800,844 B2 | 10/2004 | Kandori et al. | |
| 6,803,938 B2 * | 10/2004 | Turner | 347/237 |
| 6,949,996 B2 | 9/2005 | Matsumoto et al. | |
| 7,035,299 B2 | 4/2006 | Hori et al. | |
| 2001/0046391 A1 | 11/2001 | Koide | |
| 2002/0014579 A1 | 2/2002 | Dunfield | |
| 2002/0164157 A1 | 11/2002 | Hori et al. | |
| 2003/0112317 A1 * | 6/2003 | Murakami | 347/116 |

FOREIGN PATENT DOCUMENTS

| | | |
|---|---|---|
| EP | 1096292 A | 5/2001 |
| EP | 1237028 A | 9/2002 |
| JP | 57-090328 * | 2/1983 |
| JP | 58-207021 A | 12/1983 |
| JP | 60-107017 A | 6/1985 |
| JP | 62-139520 A | 6/1987 |
| JP | 63-183415 A | 7/1988 |
| JP | 01-183676 A | 7/1989 |
| JP | 04-194813 A | 7/1992 |
| JP | 06-043368 A | 2/1994 |
| JP | 07-060221 B2 | 6/1995 |
| JP | 07-159710 A | 6/1995 |
| JP | 07-228000 A | 8/1995 |
| JP | 7-276712 A | 10/1995 |
| JP | 8-62920 A | 3/1996 |
| JP | 08-320442 A | 12/1996 |
| JP | 09-033850 A | 2/1997 |
| JP | 09-090402 A | 4/1997 |
| JP | 09-193463 A | 7/1997 |
| JP | 10-44502 A | 2/1998 |
| JP | 11-064769 A | 3/1999 |
| JP | 11-129530 A | 5/1999 |
| JP | 11-352430 A | 12/1999 |
| JP | 2000-141746 A | 5/2000 |
| JP | 2000-168139 A | 6/2000 |
| JP | 2000-318211 A | 11/2000 |
| JP | 2001-125019 A | 5/2001 |
| JP | 2001-142021 A | 5/2001 |
| JP | 2001-162860 A | 6/2001 |
| JP | 2001-235924 A | 8/2001 |
| JP | 2001-270153 A | 10/2001 |
| JP | 2001-281594 A | 10/2001 |
| JP | 2001-296492 A | 10/2001 |
| JP | 2001-356285 A | 12/2001 |
| JP | 2002-019184 A | 1/2002 |
| JP | 2002-82303 A | 3/2002 |
| JP | 3296103 B2 | 6/2002 |
| JP | 3296130 B2 | 6/2002 |
| JP | 2002-244069 A | 8/2002 |
| JP | 2002-296531 A | 10/2002 |
| JP | 2002-307396 A | 10/2002 |
| JP | 2002-365568 A | 12/2002 |
| JP | 2003-005124 A | 1/2003 |
| JP | 2003-043406 A | 2/2003 |
| JP | 2003-043774 A | 2/2003 |

* cited by examiner

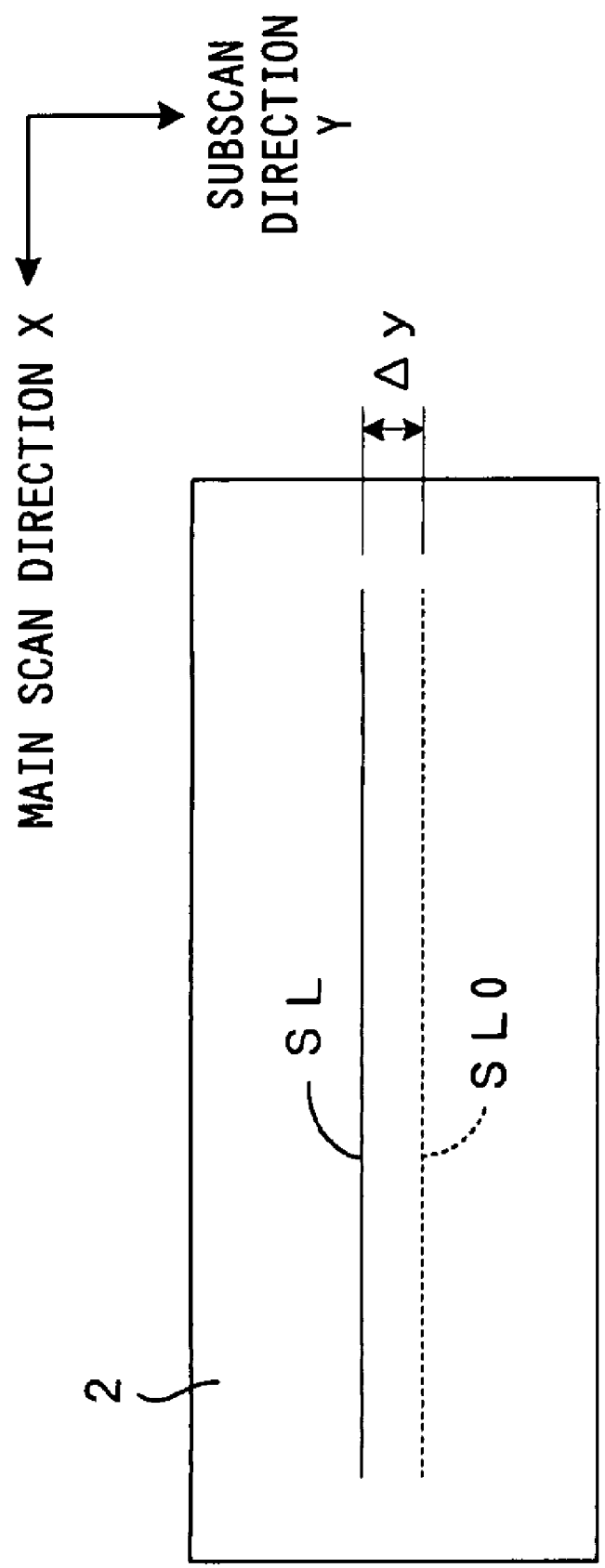

FIG. 11A FIRST COLOR (BLACK)
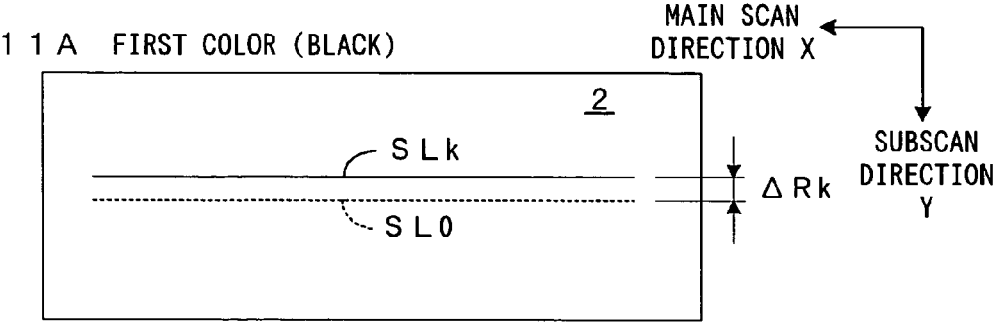
FIG. 11B SECOND COLOR (CYAN)
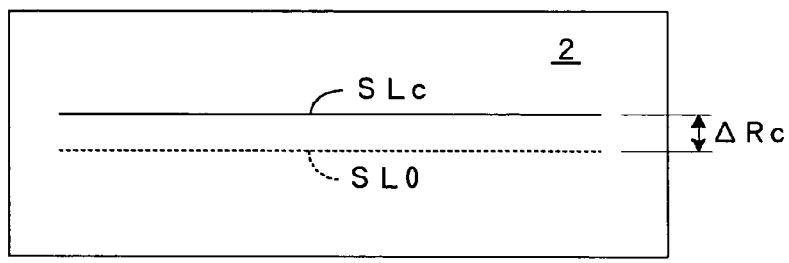
FIG. 11C THIRD COLOR (MAGENTA)
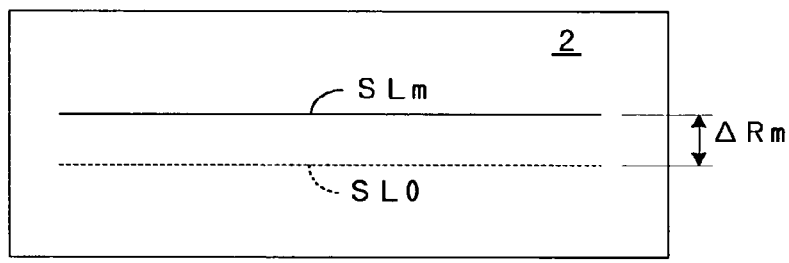
FIG. 11D FOURTH COLOR (YELLOW)
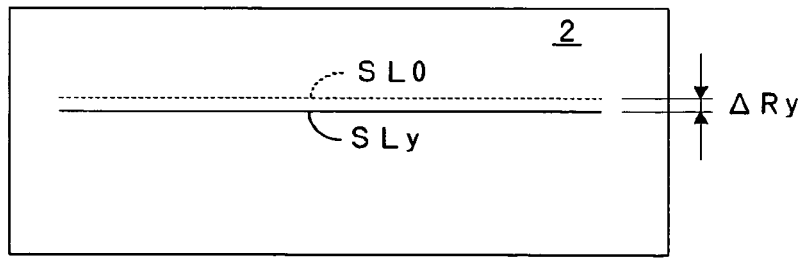

F I G. 2 8
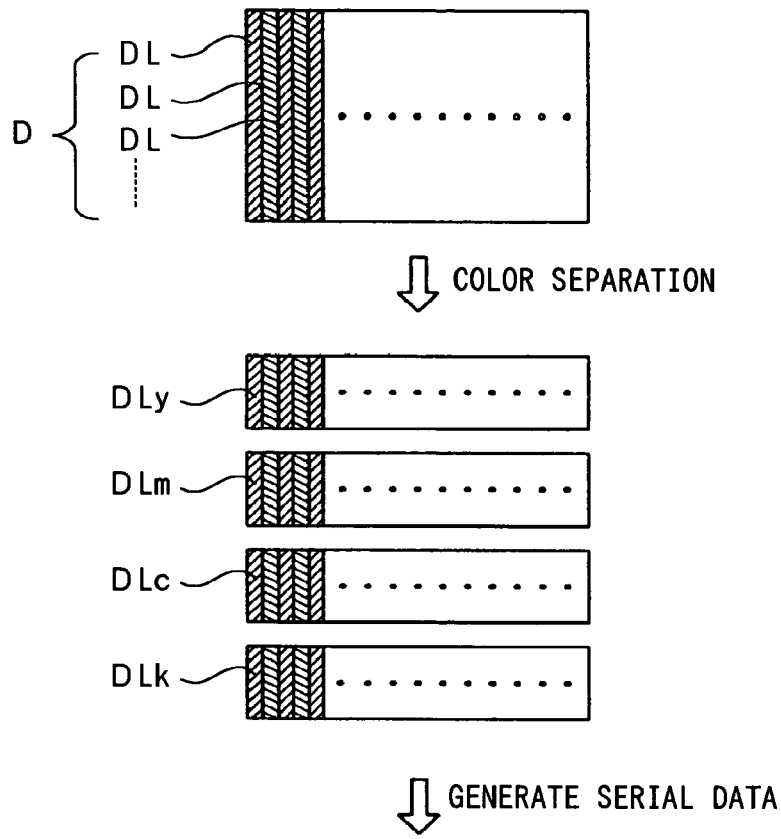
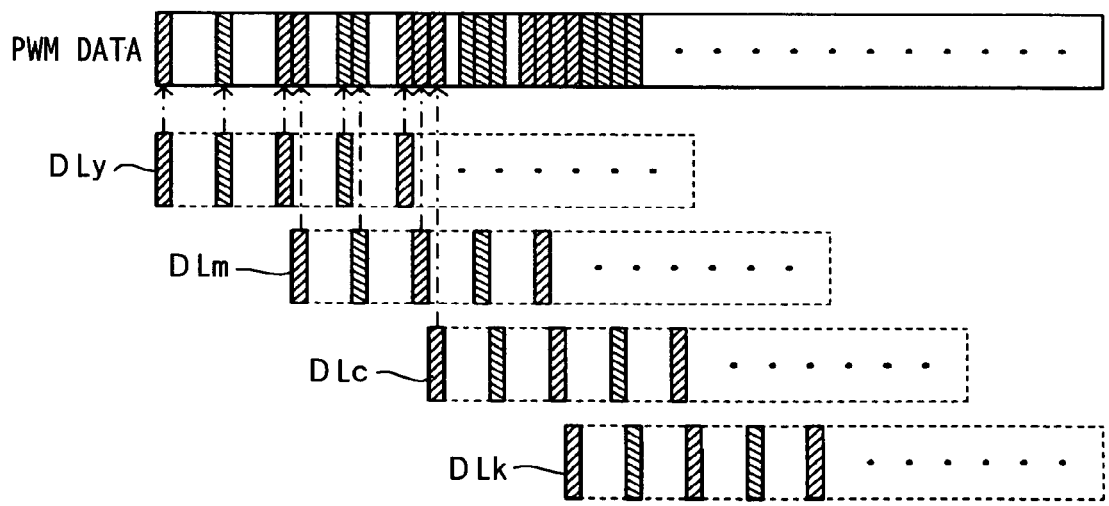

FIG. 31

| TIMING | t1 | t2 | t3 | t4 | t5 |
|---|---|---|---|---|---|
| PHOTO-SENSITIVE MEMBER Y | ⇧(4V) 2Y | ⇧(4V) 2Y | ⇧(4V) 2Y | ⇧(4V) 2Y | ⇧(4V) 2Y |
| PHOTO-SENSITIVE MEMBER M | 2M | 2M | 2M | 2M | 2M |
| PHOTO-SENSITIVE MEMBER C | 2C | 2C | 2C | 2C | 2C |
| PHOTO-SENSITIVE MEMBER K | Lk 2K Ik1 | Lk 2K Ik1 Ik2 | Lk 2K Ik1—Ik3 | Lk 2K | Lk 2K Ik5⋯Ik1 |

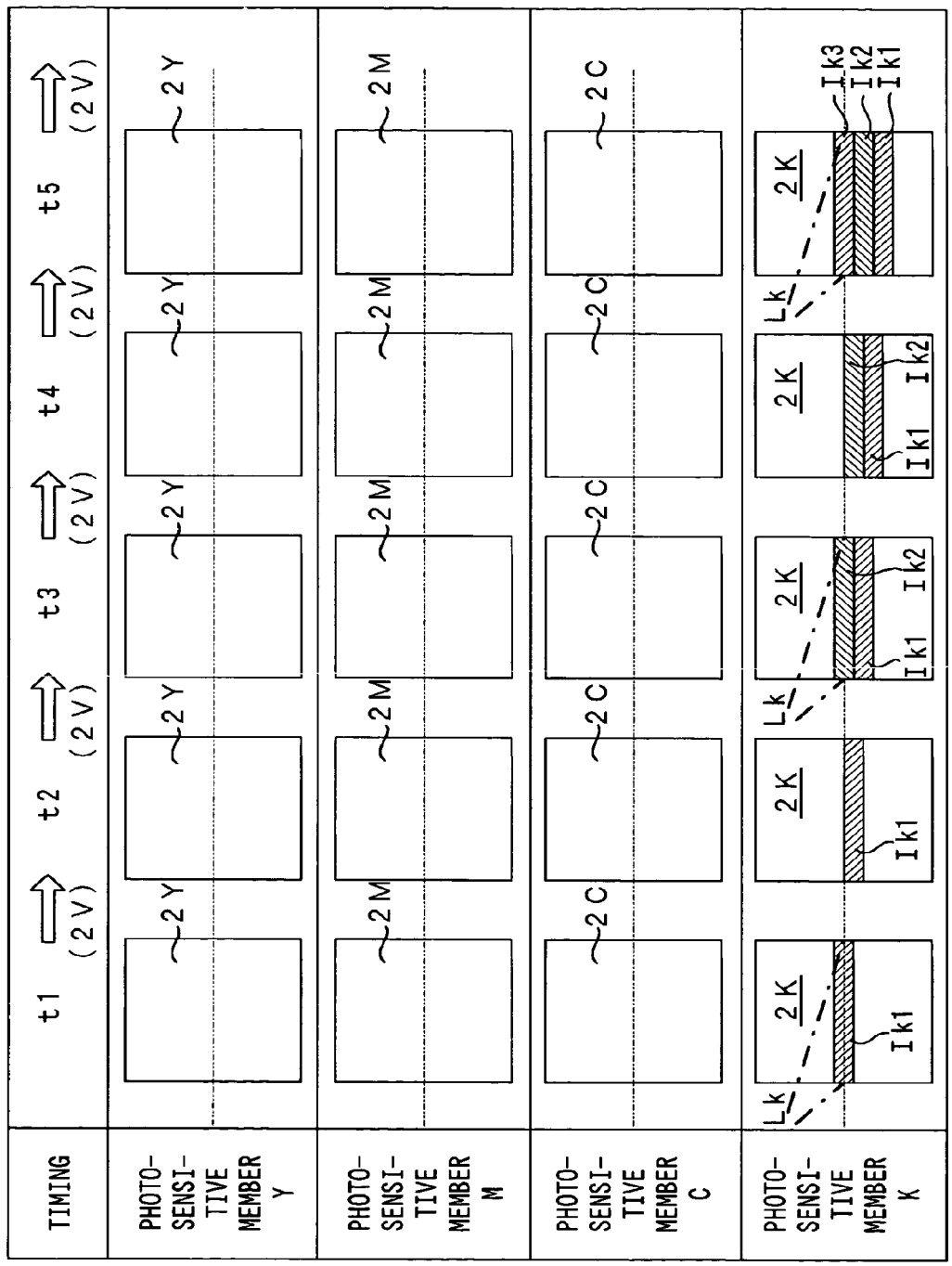

DEVICE ADAPTED FOR ADJUSTMENT OF SCAN POSITION OF LIGHT BEAM

CROSS-REFERENCE TO RELATED APPLICATION

This is a Divisional of application Ser. No. 10/778,321 filed Feb. 17, 2004; the entire disclosure of which is incorporated herein by reference.

BACKGROUND OF THE INVENTION

1. Field of the Invention

The invention relates to an exposure device for scanning a light beam on a surface of a latent image carrier, such as a photosensitive member, along a main scan direction. The invention also relates to an image forming apparatus equipped with the exposure device.

2. Description of the Related Art

Conventionally, there have been known image forming apparatuses, such as printers, copiers and facsimiles, which form an image by scanning a light beam on the latent image carrier, such as a photosensitive member, according to image data. The exposure unit of such an image forming apparatus scans a light beam, modulated based on the image data, on the surface of the latent image carrier such as the photosensitive member along a main scan direction by means of an optical scanning system, whereby a latent image corresponding to the image data is formed on the latent image carrier. After the latent image is developed into a toner image, the resultant toner image is transferred to a sheet such as a transfer sheet, plain paper sheet or copy sheet. As stated in Japanese Unexamined Patent Publication No. 2002-296531 (hereinafter referred to as "Patent Document 1"), the optical scanning system heretofore known to the art employs a polygon mirror as a light deflector.

In the first conventional apparatus, the photosensitive member as the latent image carrier is rotated at a constant speed in a predetermined direction (subscan direction). A light beam emitted from a light source such as a semiconductor laser is shaped into a collimated beam of a suitable size by means of a collimator lens and then applied to the polygon mirror. Thus, the beam is deflected by the polygon mirror so as to be scanned along the main scan direction. The scanned beam is focused on the photosensitive member via an f-θ lens comprised of two scanning lenses.

By the way, it is impossible to completely eliminate the configuration errors of the light deflector, such as a polygon mirror or pivotal mirror. For instance, the polygon mirror has a plurality of deflector mirror planes, each of which reflects the light beam. If the deflector mirror plane has an inclination relative to a rotary axis of the polygon mirror, a so-called tilted deflection plane results. Hence, a scan position of the light beam on the photosensitive member is deviated from a reference scan position with respect to the subscan direction so that the image quality is degraded. The invention disclosed in Patent Document 1 does not give adequate consideration to the configuration errors of the light deflector and improvement in the image quality is wanted. Incidentally, the reference scan position is previously defined by design, representing a position on which the light beam is to be scanned.

As conventionally known in the art, an effective measure for correcting the tilted deflection plane is to arrange a pair of cylindrical lenses powered only in the subscan direction at places forwardly and rearwardly of the light deflector. Such an arrangement establishes an optically conjugated relationship between the deflector mirror plane and the surface of the photosensitive member with respect to the subscan direction. Thus, a focusing position on the photosensitive member is not displaced even if the deflector mirror plane has an inclination.

Unfortunately however, the addition of the cylindrical lenses results in an increased number of components and hence, the apparatus is increased in costs. The increased number of optical components necessitates the increase in the size of the optical scanning system, which constitutes a major obstacle to the compact design of the image forming apparatuses. In addition, there is another problem of cumbersome optical adjustment.

Even though the aforementioned tilted deflection plane is corrected, component tolerances and assembly errors are unavoidable. In this connection, there has been a strong demand for a method which permits the scan position of the light beam in the subscan direction to be readily registered with the reference scan position without relying upon re-assembly and re-adjustment of the optical scanning system in the final adjustment stage following product assembly.

During the operation of the image forming apparatus, furthermore, the scan position of the light beam in the subscan direction may be shifted from the reference scan position because of changes in the operating environment including temperature, moisture and such, displacement of the optical component due to vibrations or age-related changes.

Such a problem is also common to image forming apparatuses for forming a color image. In addition, the color-image forming apparatus has the following problem. As the image forming apparatus of this type, there has conventionally been known one wherein a photosensitive member, an exposure unit and a developing unit are dedicated to each of four different colors including, for example, yellow, magenta, cyan and black (see, for example, Japanese Unexamined Patent Publication No. 8-62920). In this second conventional apparatus, individual images for the respective color components are formed on the photosensitive member as follows. On a per-color basis, a light source of an exposure unit is controlled based on image data representative of an image of each color component. In the meantime, a light beam from the light source is scanned on the surface of the photosensitive member along the main scan direction by means of the optical scanning system of the exposure unit. Thus, a latent image corresponding to the image data of each color component is formed on the photosensitive member.

There has also conventionally been known another apparatus wherein four light sources are provided whereas a common polygon mirror deflects light beams from the individual light sources for scanning the beams in the main scan direction (see, for example, Japanese Unexamined Patent Publication No. 2001-296492). In the third conventional apparatus, four scanned beams from the polygon mirror are respectively guided to four photosensitive members by means of respective groups of reflection mirrors so as to form respective latent images.

By the way, the second conventional apparatus has a requirement that the exposure units be provided in association with the individual color components. This not only results in the increased apparatus costs but also constitutes a major obstacle to the downsizing of the apparatus. The third conventional apparatus is more advantageous than the second conventional apparatus in terms of the apparatus costs and the downsizing thereof because the polygon mirror is shared. Similarly to the second conventional apparatus, however, the third conventional apparatus requires the provision of the same number of light sources as the color components. Thus, the third conventional apparatus still has a room for improvement in terms of the downsizing of the apparatus and such.

For the purpose of achieving a higher monochromatic printing speed than a color printing speed, the third conventional apparatus has an arrangement wherein the light beams from the light sources are arranged in close adjacency to one another and on a line along the subscan direction (direction substantially perpendicular to the main scan direction of the light beams). Furthermore, an additional light path switching portion is interposed between the light sources and the polygon mirror such as to switch the light path of the light beams between the color printing mode and the monochromatic printing mode. Therefore, the third conventional apparatus is increased in costs because of the provision of the light path switching portion for varying the printing speed between the monochromatic printing and the color printing. In addition, there exists a need for exactly adjusting the relation between the four light sources, the light path switching portion and the polygon mirror, which poses a serious problem associated with adjustment operation.

On the other hand, an image forming apparatus of a tandem system operates as follows. That is, latent images corresponding to image data items of four colors are formed on a yellow-, magenta-, cyan- and black-photosensitive member, respectively and the resultant latent images are used to form a color image. The image forming apparatus is also adapted to perform a monochromatic printing operation in addition to the color printing operation. Specifically, in the monochromatic printing operation, the optical scanning system scans only the light beam from a light source corresponding to a single color (black) so as to form a latent image on the black photosensitive drum. In this case, the optical scanning system does not scan the light beam on the photosensitive members for the other three colors (yellow, magenta and cyan). Accordingly, the latent image for monochromatic printing only need be formed on the black-photosensitive member. However, the formation of the latent image on the black-photosensitive member takes as much time as the formation of the images for color printing.

Such a problem is not limited to the image forming apparatus wherein the latent images corresponding to the image data items of the four colors are formed on the four photosensitive members, respectively, and the resultant latent images are used to form a color image. The problem is also common to image forming apparatuses wherein latent images of N colors (N denoting a natural number of N≧2) are formed on N latent image carriers such as photosensitive members, respectively, and the resultant latent images are used to form the color image. In other words, an important problem for such an image forming apparatus of the tandem system is to reduce time required for forming the image with colors limited to (N−1) or less.

Besides the aforementioned apparatus of the tandem system, the color image forming apparatus further includes an apparatus of a so-called 4-cycle system. The fourth conventional apparatus is exemplified by one disclosed in Japanese Unexamined Patent Publication No. 2001-235924. If the photosensitive member or the transfer medium is fluctuated in speed, the color-image forming apparatuses of either system encounter registration deviation between a toner image being transferred and a toner image previously transferred to the transfer medium. Even though the photosensitive member or the like is not fluctuated in speed, another drawback occurs in a case where the rotation period of the photosensitive member rotated in the subscan direction is not integral multiples of the scan period of the light beam scanned in the main scan direction. That is, the toner images of the individual colors may be out of registration by one scan stroke in maximum with respect to the subscan direction. Heretofore, there have been proposed techniques for controlling the rotational speeds of the photosensitive member and the transfer medium in order to reduce the incidence of such a registration deviation.

In cases, however, changing the rotational speed of the photosensitive member or the like may cause a problem. Specifically, if the rotational speed is changed at timing of forming the latent image by scanning the light beam on the photosensitive member or of transferring the toner image from the photosensitive member to the transfer medium, the latent image or the toner image may be adversely affected. This will result in the degraded image quality. In order to eliminate the registration deviation by changing the rotational speed, the photosensitive member or the like must be frequently changed in the rotational speed thereof during the image forming operation. This leads to an instable running speed of the photosensitive member or the like and hence, the degraded image quality will result.

SUMMARY OF THE INVENTION

A primary object of the invention is to provide an exposure device adapted for simple and high-precision adjustment of the scan position of the light beam with respect to the subscan direction.

Another object of the invention is to provide an image forming apparatus capable of forming a high-quality image by employing the above exposure device for adjusting the scan position of the light beam with respect to the subscan direction.

Still another object of the invention is to provide a tandem image forming apparatus including a plurality of latent image carriers, the apparatus facilitating optical adjustment and achieving the reduction of costs and size thereof.

Yet another object of the invention is to provide a tandem image forming apparatus including N (N denoting a natural number of N≧2) latent image carriers and an image forming method for use in the same, wherein time required for forming an image with colors limited to (N−1) or less is reduced.

Still another object of the invention is to provide an image forming apparatus for forming a color image by superimposing plural toner images of different colors on top of each other on a transfer medium, the apparatus which is adapted to form a high-quality image by reducing registration deviation between the toner images of the individual colors.

According to a first aspect of the present invention, a deflector mirror plane is capable of not only defectively scanning a light beam along the main scan direction, but also of adjusting the scanned beam for its position on a latent image carrier with respect to a subscan direction by deflecting the light beam from the laser light source in the subscan direction in synchronism with the deflective scanning of the light beam. This provides for a simple and high-precision adjustment of the scan position of the light beam on the latent image carrier with respect to the subscan direction.

According to a second aspect of the present invention, it is ensured that a high-quality image is formed because even if the scanned beam is deviated from a predetermined reference scan position with respect to the subscan direction due to the component tolerances or assembly errors, such a deviation is corrected.

According to a third aspect of the present invention, a light beam may be easily and highly precisely adjusted for the scan position thereof on a latent image carrier with respect to the subscan direction. Accordingly, a registration deviation may be decreased by adjusting the position of the scanned beam.

According to a fourth aspect of the present invention, a light beam from a laser light source is deflected along a main scan direction to form a scanned beam. Furthermore, the scanned beam from a deflector mirror plane is selectively switched from one latent image carrier to another for irradiation therewith. Thus, a linear latent image is formed on the latent image carrier corresponding to the switching operation. Despite the provision of only one laser light source, the linear latent images is formed on the individual latent image carriers by scanning the light beams on the surfaces thereof. Therefore, the present invention further reduces the size and costs of the apparatus as compared with the conventional apparatus requiring four light sources. In addition, the apparatus simplifies the operation for optical adjustment.

According to a fifth aspect of the present invention, M linear latent images are formed at a time by irradiating M scanned beams on any one of N latent image carriers, there may be achieved M-times print speed of the single-beam image forming apparatus (fourth aspect) wherein one linear latent image is formed at a time by irradiating a single scanned beam on the latent image carrier.

According to a sixth aspect of the present invention, during an image forming operation limiting the number of usable colors to (N−1) or less, the control means serially reads out 1-line image data pieces from an image data item of the limited color stored in the storage means and based on each 1-line image data piece thus read, forms a latent image on a latent image carrier corresponding to the color of the read data. Therefore, only the 1-line image data pieces of usable color(s) may be serially read out from a storage means in an efficient manner while the latent images corresponding to the 1-line image data pieces thus read may be serially formed on a latent image carrier corresponding to the usable color(s). By virtue of such efficient data retrieval and formation of the latent images based on the retrieved data, time required for making the color-limited image formation can be reduced.

According to a seventh aspect of the present invention, during an image forming operation limiting the number of usable colors to (N−1) or less, the control means serially reads out sets of M 1-line image data pieces from an image data item of the limited color stored in the storage means and based on each 1-line image data set thus read, forms a latent image on a latent image carrier corresponding to the color of the read data. Therefore, there may be obtained a special effect additionally to the same as the sixth aspect. That is, a time required for accomplishing the color-limited image formation is reduced.

According to an eighth aspect of the present invention, the third optical system comprises a single lens and has a distortion characteristic that the scanned beam deflected based on a swinging characteristic intrinsic to the deflector mirror plane is moved on the surface of each latent image carrier at a constant speed, the third optical system specified that opposite sides in a tangential plane are formed in mutually different non-arcuate shapes in a manner to correct for tangential field-curvature aberration in the light beam at any position on the surface of each latent image carrier, and that sagital curvatures at positions on the non-arcuate curve of at least either one of the opposite sides in the tangential plane are varied non-correlatively of the tangential curvature in order to correct for sagital field-curvature aberration in the light beam. Therefore, an apparatus may be reduced in size and cost, which leads to the downsizing and cost reduction of the apparatus.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 10 is a diagram schematically showing a relationship between a scan position of a scanned beam and a reference scan position on a photosensitive member;

FIGS. 11A-11D are diagrams each schematically showing a relationship between a scan position of a scanned beam and a reference scan position on a photosensitive member for each toner color;

FIG. 28 is a diagram schematically showing an image processing performed by the image forming apparatus of FIG. 25;

FIG. 31 is a schematic diagram showing another example of the monochromatic-image forming operation performed by the image forming apparatus of FIG. 25;

FIG. 32 is a schematic diagram showing still another example of the monochromatic-image forming operation performed by the image forming apparatus of FIG. 25;

DETAILED DESCRIPTION OF THE PREFERRED EMBODIMENTS

I. Single-Beam 4-Cycle Apparatus

First Embodiment

Figure 1:
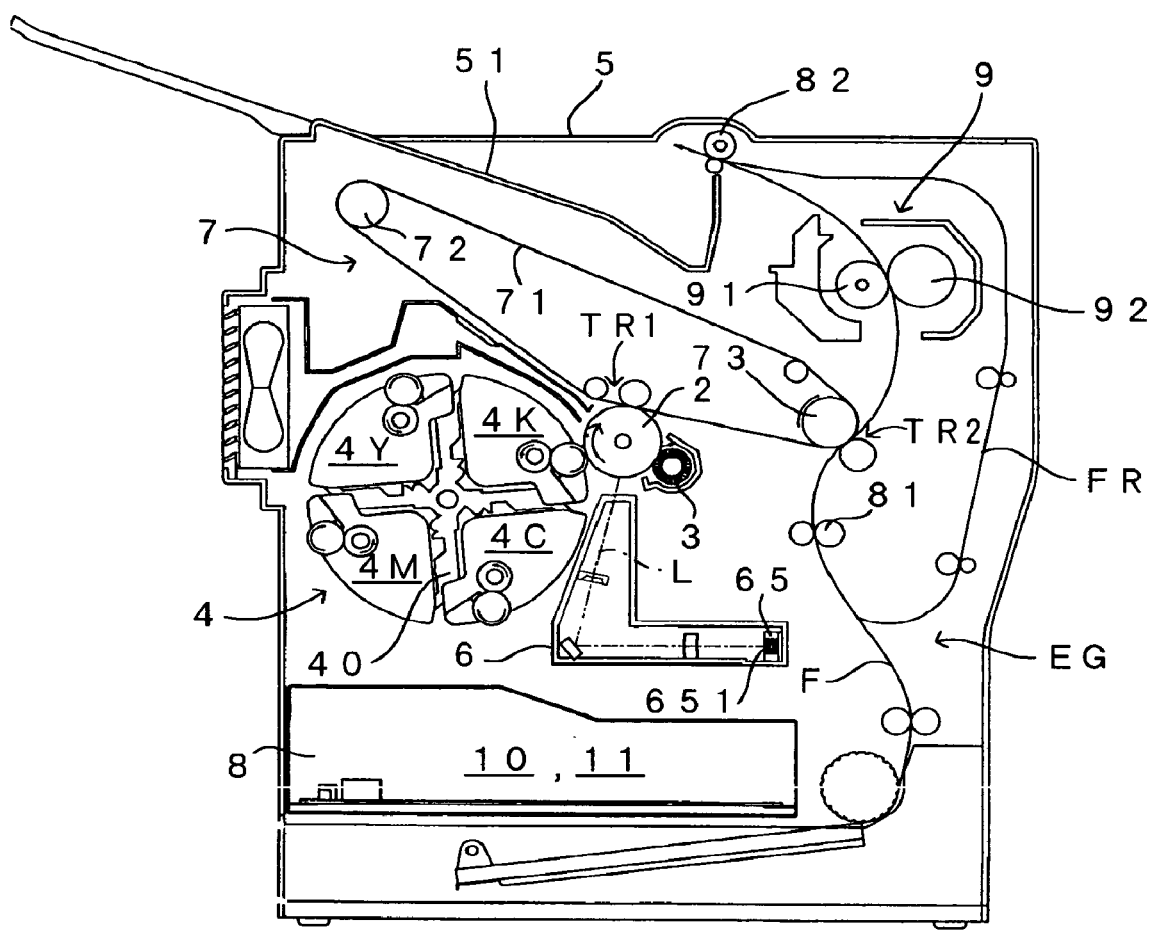
FIG. 1 is a diagram showing a first embodiment of an image forming apparatus according to the invention.
Figure 2:
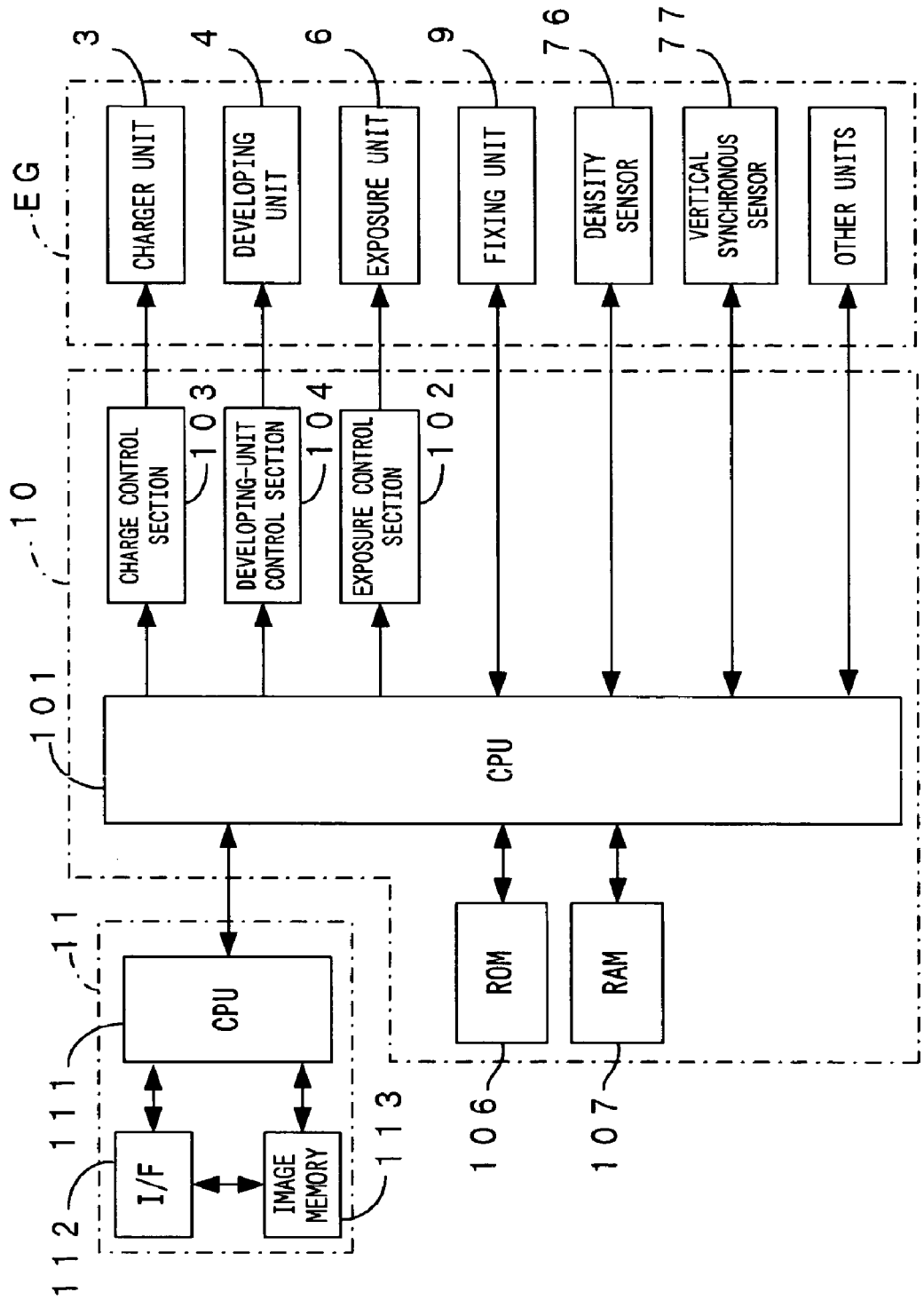
FIG. 2 is a block diagram showing an electrical arrangement of the image forming apparatus of FIG. 1.

FIG. 1 is a diagram showing a first embodiment of an image forming apparatus according to the invention. FIG. 2 is a block diagram showing an electrical arrangement of the image forming apparatus of FIG. 1. The image forming apparatus is a color printer of a so-called 4-cycle system. In the image forming apparatus, the following operations are carried out. When an external apparatus, such as a host computer, outputs a print command to a main controller 11 in response to an image forming demand from a user, a CPU 111 of the main controller 11 outputs a print command which is responded by an engine controller 10 which, in turn, controls individual parts of an engine EG for forming the image corresponding to the print command on a sheet such as a copy sheet, transfer sheet, plane paper sheet or transparent sheet for OHP.

The engine EG is provided with a photosensitive member 2 which is rotatable along a direction of an arrow as seen in FIG. 1 (subscan direction). On the other hand, a charger unit 3, a rotary developing unit 4 and a cleaner (not shown) are disposed around the photosensitive member 2 as arranged along the direction of the rotation thereof. The charger unit 3 is electrically connected with a charge control section 103 for applying a predetermined charging bias thereto. The charging bias thus applied uniformly charges an outer periphery of the photosensitive member 2. The photosensitive member 2, the charger unit 3 and the cleaner are integrated into a photosensitive member cartridge. The photosensitive member cartridge is designed to be mounted to or removed from an apparatus body 5.

An exposure unit 6 emits a light beam L toward the outer periphery of the photosensitive member 2 thus charged by the charger unit 3. The exposure unit 6 irradiates the light beam L on the photosensitive member 2 based on an image signal applied from the external apparatus thereby forming an electrostatic latent image thereon corresponding to the image signal. The details of the arrangement and operation of the exposure unit 6 will be described hereinlater.

The electrostatic latent image thus formed is developed into a toner image by the developing unit 4. According to the embodiment, the developing unit 4 includes a support frame 40 rotatable about an axis; and a yellow developing device 4Y, a magenta developing device 4M, a cyan developing device 4C and a black developing device 4K which are each formed as a cartridge removably mounted to the support frame 40 and which contain therein their respective color toners. The developing unit 4 is driven into rotation based on a control command from a developing-unit control section 104 of the engine controller 10. In the meantime, any one of the developing devices 4Y, 4C, 4M, 4K is selectively positioned at a predetermined development position to abut against the photosensitive member 2 or to oppose the photosensitive member via a predetermined gap therebetween, so that a selected color toner carried on a developing roller 44 of the selected developing device is applied to a surface of the photosensitive member 2. Thus, the electrostatic latent image on the photosensitive member 2 is visualized with the selected color toner.

The toner image developed by the developing unit 4 in the aforementioned manner is primarily transferred onto an intermediate transfer belt 71 of a transfer unit 7 in a primary transfer region TR1. The transfer unit 7 includes the intermediate transfer belt 71 entrained around a plurality of rollers 72, 73; and a driver (not shown) for driving the roller 73 into rotation thereby rotating the intermediate transfer belt 71 in a predetermined rotational direction.

On the other hand, a transfer belt cleaner (not shown), a density sensor 76 (FIG. 2) and a vertical synchronous sensor 77 (FIG. 2) are disposed in the vicinity of the roller 72. Of these, the density sensor 76 confronts a surface of the intermediate transfer belt 71 for sensing an optical density of a patch image formed on an outer periphery of the intermediate transfer belt 71. The vertical synchronous sensor 77 is a sensor for detecting a reference position of the intermediate transfer belt 71, thus functioning as a vertical synchronous sensor for outputting a synchronous signal or vertical synchronous signal Vsync in association with the drivable rotation of the intermediate transfer belt 71 in the subscan direction. In this apparatus, the operations of individual parts of the apparatus are controlled based on the vertical synchronous signal Vsync in order to synchronize the operating timings of the individual parts and to superimpose the toner images of the respective colors exactly on top of each other.

Where a color image is transferred to a sheet, the color image is formed by superimposing the toner images of the respective colors on top of each other on the intermediate transfer belt 71, the toner images formed on the photosensitive member 2. Subsequently, the resultant color image is secondarily transferred onto a sheet taken out from a cassette 8 on a sheet-by-sheet basis and transported along a transport path F to a secondary transfer region TR2.

In this process, a timing of feeding the sheet to the secondary transfer region TR2 is controlled in order to transfer the image on the intermediate transfer belt 71 exactly to a predetermined position on the sheet. Specifically, on the transport path F, a gate roller 81 is disposed at place upstream from the secondary transfer region TR2. The gate roller 81 is rotated as timed with a cycling motion of the intermediate transfer belt 71, thereby feeding the sheet to the secondary transfer region TR2 in a predetermined timing.

The sheet thus formed with the color image thereon is transported via a fixing unit 9 and a discharge roller 82 to a discharge tray 51 disposed on an upper side of the apparatus body 5. In a case where images are formed on both sides of a sheet, the sheet thus formed with an image on one side thereof is switchback-transported by the discharge roller 82. Thus, the sheet is transported along a reversal transport path FR. At place upstream from the gate roller 81, the sheet is placed again on the transport path F. At this time, the sheet is turned over so as to present its opposite side from that previously transferred with the image against the intermediate transfer belt 71 in the secondary transfer region TR2 for image transfer. In this manner, the images are formed on the both sides of the sheet.

In FIG. 2, a reference numeral 113 denotes an image memory provided in the main controller 11 for storing image data supplied from the external apparatus such as a host computer via an interface 112. A reference numeral 106 denotes a ROM for storing an operation program executed by a CPU 101 and control data used for controlling the engine EG A reference numeral 107 denotes a RAM for temporarily storing operation results given by the CPU 101 and other data.

Figure 3:
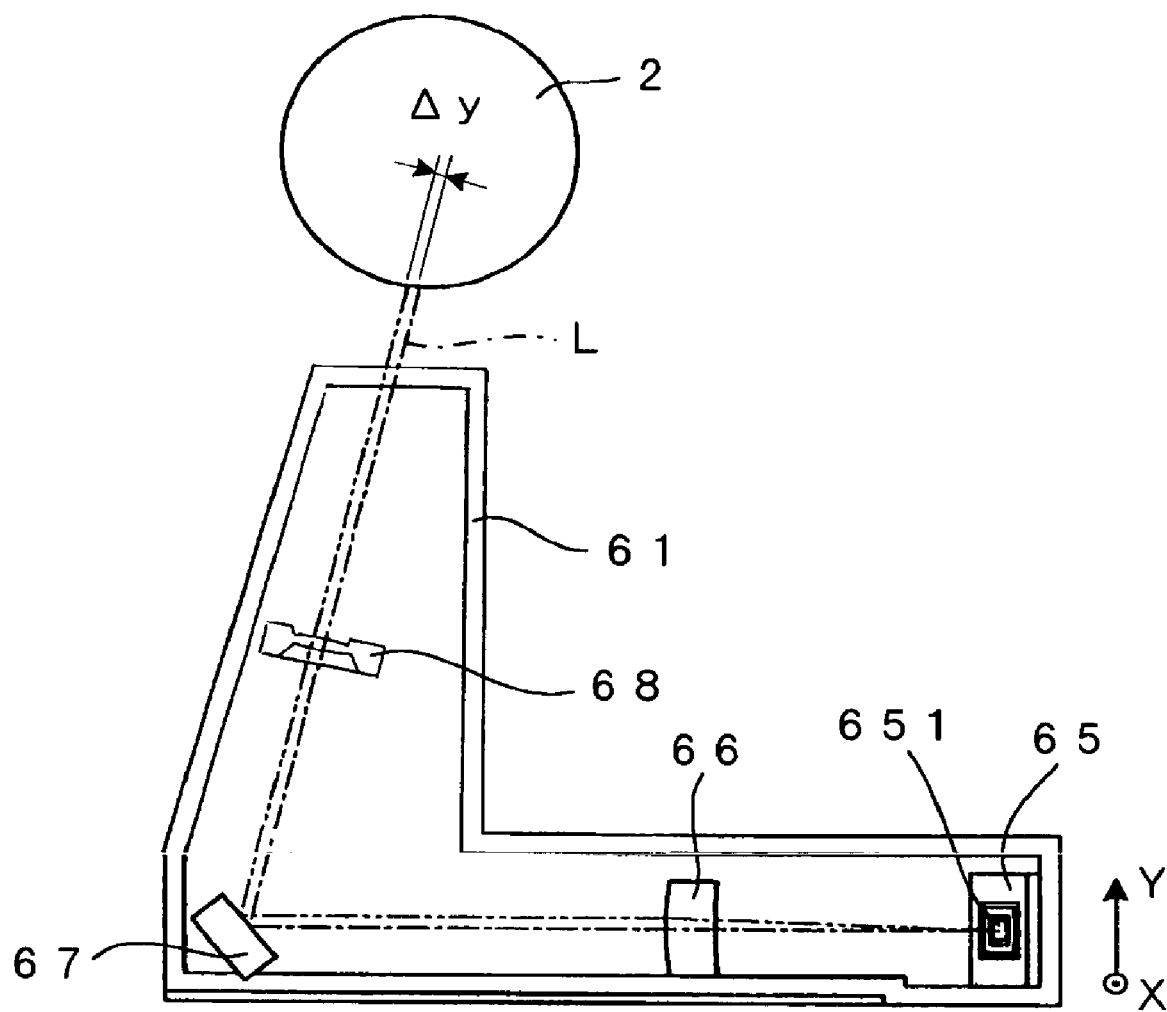
FIG. 3 is a sectional view taken along a subscan direction for showing an arrangement of an exposure unit installed in the image forming apparatus of FIG. 1.
Figure 4:
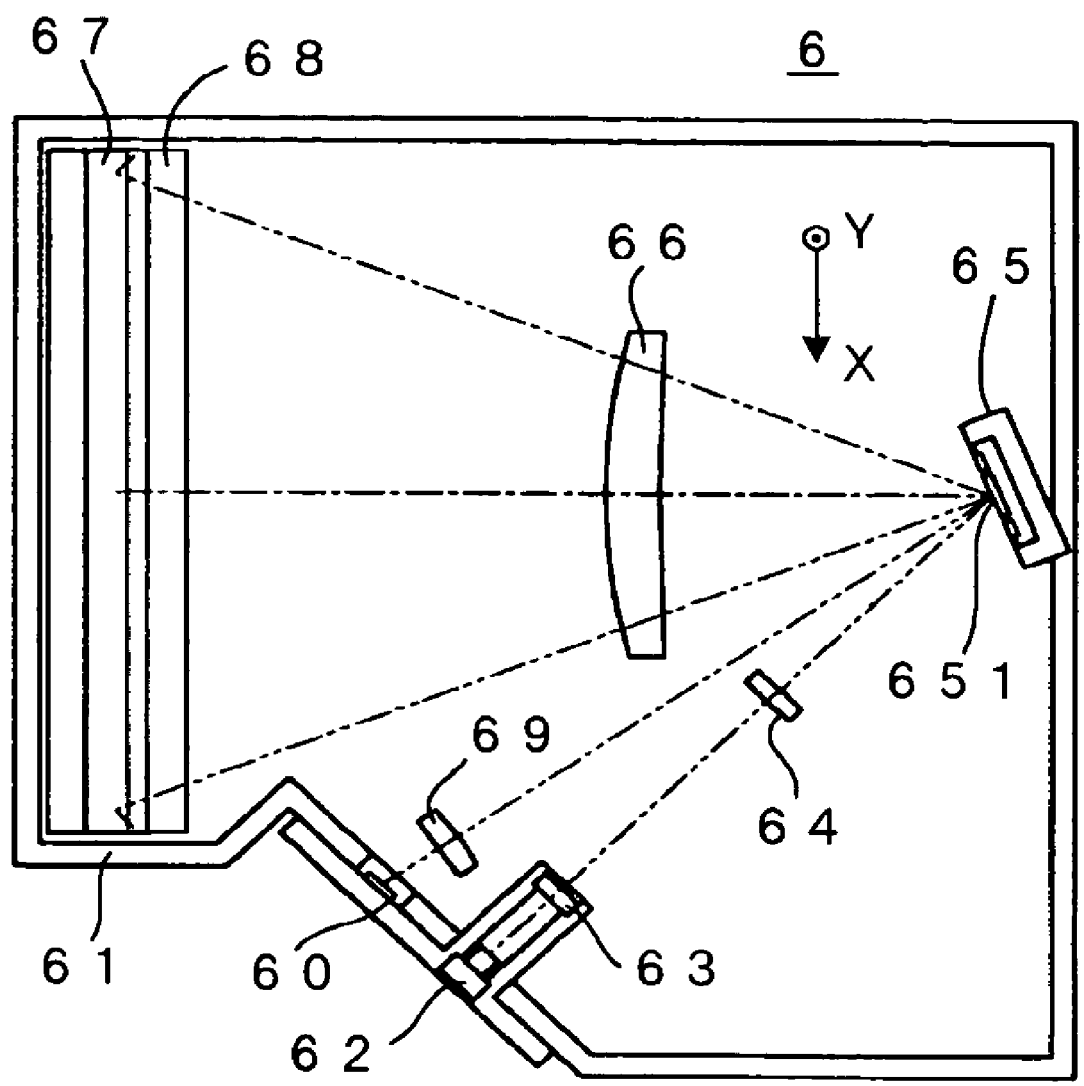
FIG. 4 is a sectional view taken along a main scan direction for showing the arrangement of the exposure unit installed in the image forming apparatus of FIG. 1.
Figure 5:
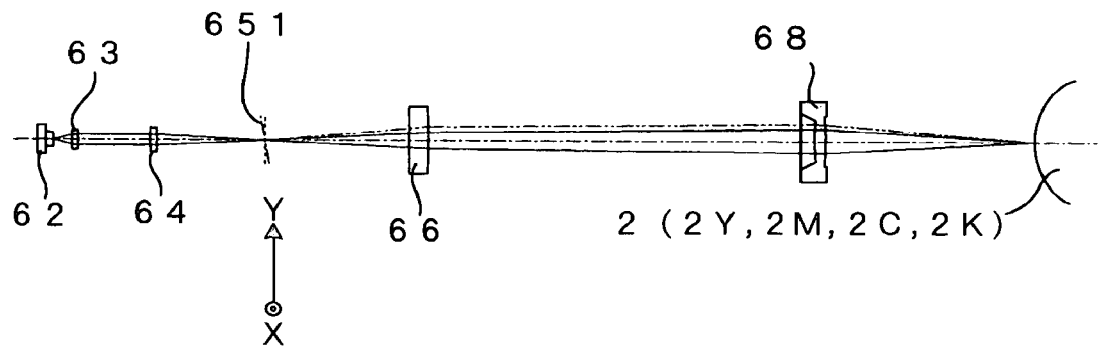
FIG. 5 is an expanded sectional view taken along the subscan direction for showing an optical arrangement of the exposure unit.
Figure 6:
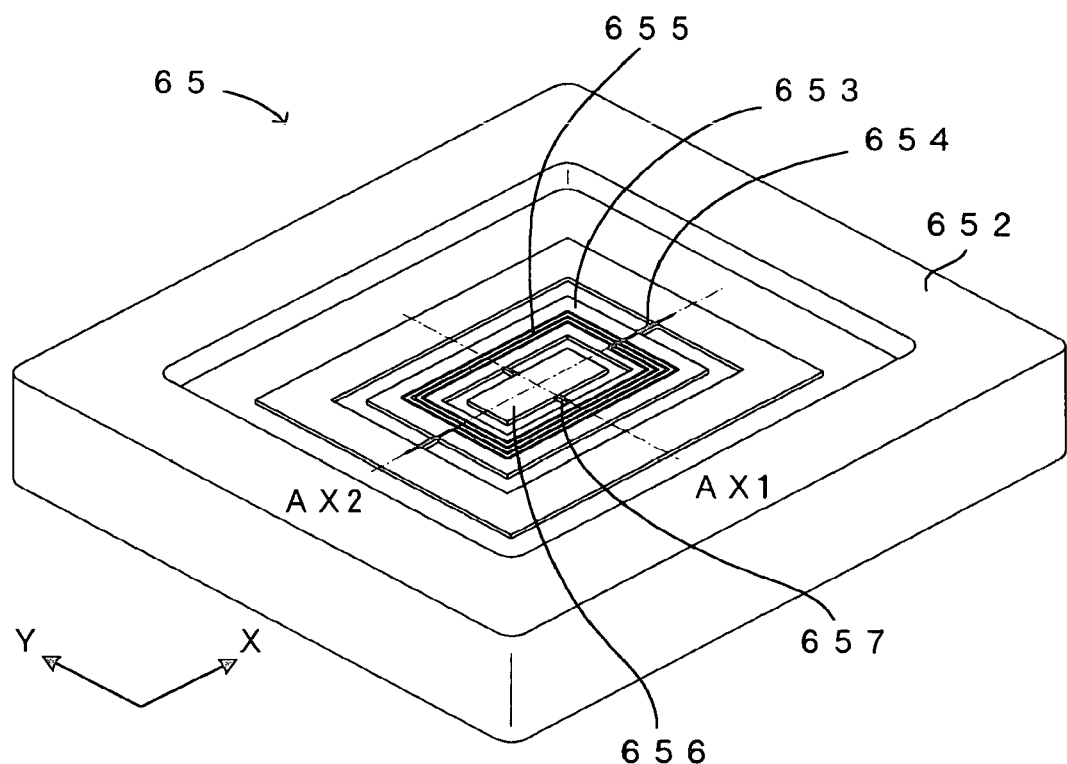
FIG. 6 is a perspective view showing an optical scanning device as one component of the exposure unit.
Figure 7:
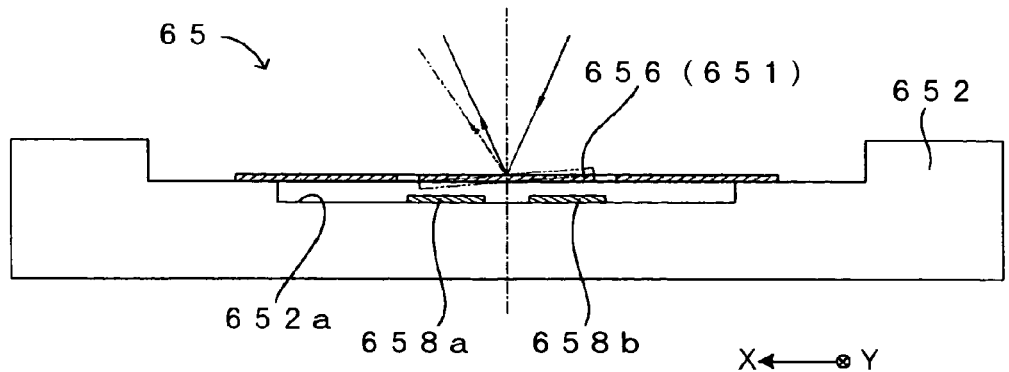
FIG. 7 is a sectional view taken along a first axis of the optical scanning device of FIG. 6.
Figure 8:
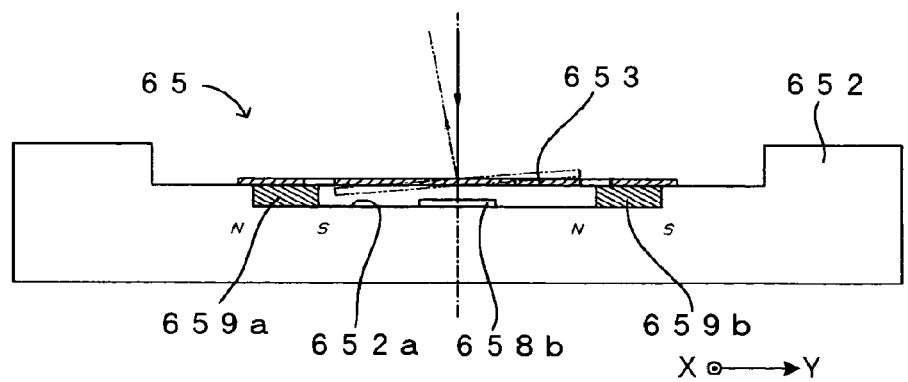
FIG. 8 is a sectional view taken along a second axis of the optical scanning device of FIG. 6.
Figure 9:
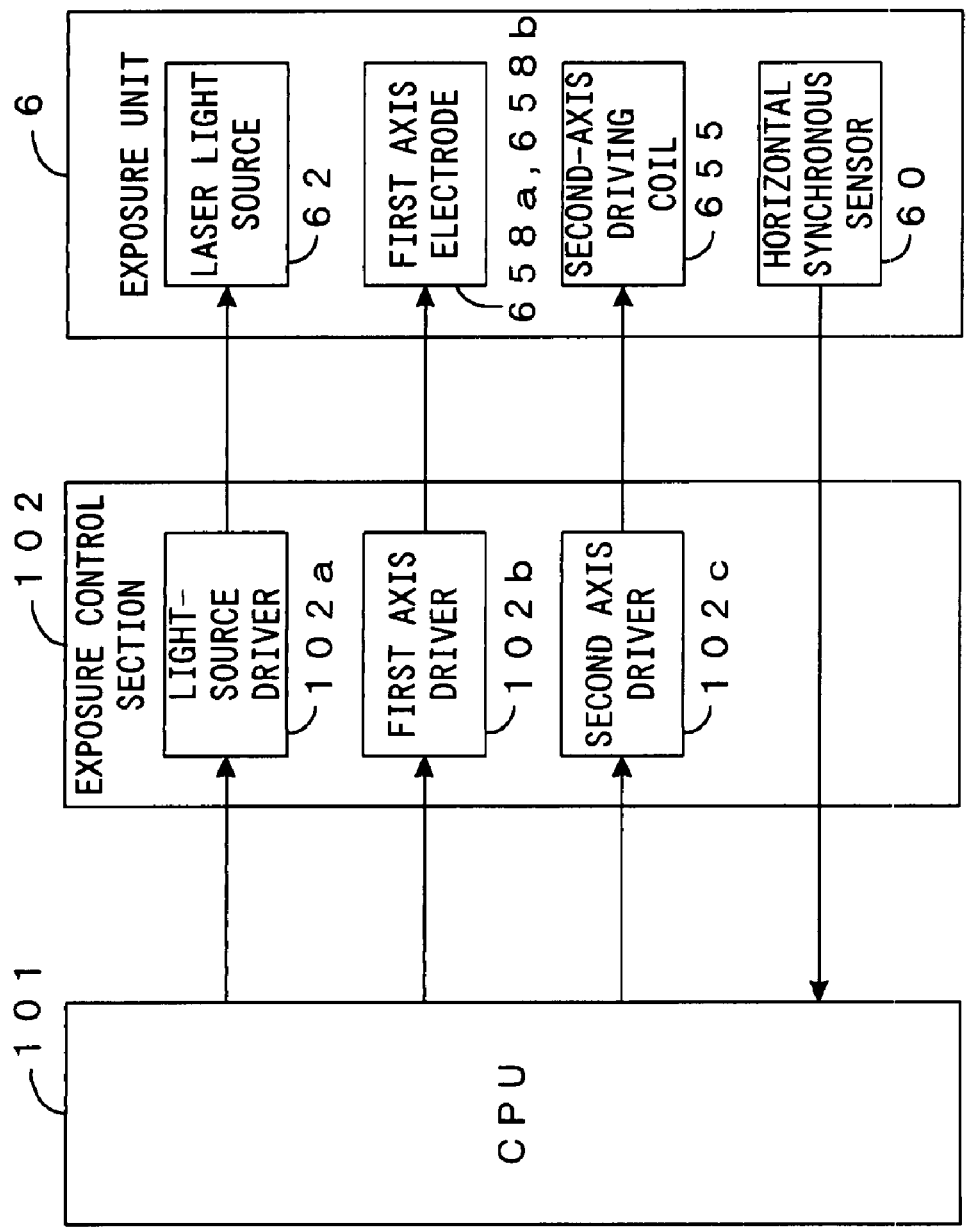
FIG. 9 is a block diagram showing arrangements of the exposure unit and an exposure control section.

FIG. 3 is a sectional view taken along a subscan direction for showing an arrangement of an exposure unit installed in the image forming apparatus of FIG. 1. FIG. 4 is a sectional view taken along a main scan direction for showing the arrangement of the exposure unit installed in the image forming apparatus of FIG. FIG. 5 is an expanded sectional view taken along the subscan direction for showing an optical arrangement of the exposure unit. FIGS. 6 to 8 are diagrams showing an optical scanning device as one component of the exposure unit. FIG. 9 is a block diagram showing arrangements of the exposure unit and an exposure control section. Now referring to these figures, the arrangement and operation of the exposure unit will be described in details as below. Additionally, FIG. 10 is a diagram schematically showing the operation of the image forming apparatus of FIG. 1.

The exposure unit 6 has an exposure unit casing 61. The exposure unit casing 61 has a single laser light source 62 fixed thereto such as to emit a light beam from the laser light source 62. As shown in FIG. 9, the laser light source 62 is electrically connected with a light-source driver 102a of an exposure control section 102. Thus, the light-source driver 102a provides ON/OFF control to the laser light source 62 based on the image data so that the laser light source 62 may emit the light beam modulated in correspondence to the image data. According to the embodiment, the laser light source 62 is equivalent to a "light source" of the invention.

Within the exposure unit casing 61, a collimator lens 63, a cylindrical lens 64, an optical scanning device 65, a first scanning lens 66, a reflection mirror 67 and a second scanning lens 68 are provided for scanningly irradiating the light beam from the laser light source 62 on the surface of the photosensitive member 2. Specifically, the light beam from the laser light source 62 is shaped into a collimated beam of a suitable size by means of the collimator lens 63 and then becomes incident on the cylindrical lens 64 powered only in the subscan direction, as shown in FIG. 5. The collimated beam is converged only in the subscan direction so as to be linearly focused at place near a deflector mirror plane 651 of the optical scanning device 65.

The optical scanning device 65 is formed using a micromachining technique which applies a semiconductor fabrication technique for integrally forming micromachines on a semiconductor substrate. The optical scanning device 65 is adapted to deflect the light beam reflected from the deflector mirror plane 651 in two directions perpendicular to each other, namely the main scan direction and the subscan direction. More specifically, the optical scanning device 65 is arranged as follows.

In the optical scanning device 65, a monocrystalline silicon substrate (hereinafter, referred to as "silicon substrate") 652 functions as a "support member" of the invention, as shown in FIG. 6. The optical scanning device 65 is also provided with an outer movable plate 653 formed by processing a part of the silicon substrate 652. The outer movable plate 653 is shaped like a frame and is resiliently supported by the silicon substrate 652 via a torsion spring 654, thus allowed to pivot about a second axis AX2 extended substantially in parallel with a main scan direction X. Disposed on an upper side of the outer movable plate 653 is a planar coil 655 which is electrically connected with a pair of outside electrode terminals (not shown) via the torsion spring 654, the terminals formed on an upper side of the silicon substrate 652. The planar coil 655 is coated with an insulation layer and serves as a "second-axis driving coil".

A flat inner movable plate 656 is pivotally supported in the outer movable plate 653. Specifically, the inner movable plate 656 is resiliently supported internally of the outer movable plate 653 via a torsion spring 657 having an axis extended perpendicularly to that of the torsion spring 654. Thus, the inner movable plate is allowed to pivot about a first axis AX1 extended substantially in parallel with a subscan direction Y. The deflector mirror plane 651 such as of an aluminum film is formed centrally of the inner movable plate 656.

As shown in FIGS. 7 and 8, a recess 652a is formed substantially centrally of the silicon substrate 652 such as to permit the outer movable plate 653 and the inner movable plate 656 to pivot about the respective axes AX2 and AX1. On the other hand, electrodes 658a, 658b are fixed to an inside bottom of the recess 652a at respective places opposite the opposite ends of the inner movable plate 656 (see FIG. 7). These two electrodes 658a, 658b function as a "first axis electrode" for driving the inner movable plate 656 into pivotal motion about the first axis AX1. Specifically, these first axis electrodes 658a, 658b are electrically connected with a first axis driver 102b of the exposure control section 102. An electrostatic attractive force is produced between the electrodes and the deflector mirror plane 651 by applying a voltage to the electrodes. The electrostatic attractive force acts to attract one end of the deflector mirror plane 651 toward the electrode. Therefore, when the first axis driver 102b applies a predetermined voltage alternately to the first axis electrode 658a and 658b, the deflector mirror plane 651 is brought into reciprocal oscillations about the torsion spring 657 as the first axis AX1. If a driving frequency of the reciprocal oscillations is set to a resonance frequency of the deflector mirror plane 651, the oscillation amplitude of the deflector mirror plane 651 is so increased that the ends of the deflector mirror plane 651 are moved as far as to positions close to the electrodes 658a, 658b. The deflector mirror plane 651 is resonantly oscillated to present its ends in proximity of the electrodes 658a, 658b, thereby allowing the electrodes 658a, 658b to contribute to the driving of the deflector mirror plane 651. Thus, the oscillations of the deflector mirror plane may be retained in a more stable manner by virtue of the cooperation between the ends of the deflection plate and the electrodes on the flat side.

As shown in FIG. 8, permanent magnets 659a, 659b in mutually different orientations are secured to the inside bottom of the recess 652a at places outwardly relative to opposite ends of the outer movable plate 653. The second-axis driving coil 655 is electrically connected with a second axis driver 102c of the exposure control section 102. When the coil 655 is energized, Lorentz force occurs as a result of the influences of the direction of a current flowing through the second-axis driving coil 655 and of the direction of magnetic flux from the permanent magnets 659a, 659b, producing a moment to rotate the outer movable plate 653. At this time, the inner movable plate 656 (deflector mirror plane 651) is also pivotally moved about the torsion spring 654 as the second axis AX2 in unison with the outer movable plate 653. If an alternating current is applied to the second-axis driving coil 655 to continue the repetitive motions of the plate, the deflector mirror plane 651 may be brought into reciprocal oscillations about the torsion spring 654 as the second axis AX2.

In this manner, the optical scanning device 65 is adapted to drive the deflector mirror plane 651 into individually independent pivotal motions about the first axis AX1 and the second axis AX2 perpendicular to each other. According to the embodiment, a mirror driver section including the first axis driver 102b and the second axis driver 102c is so controlled as to pivotally move the deflector mirror plane 651 about the first axis AX1, thereby deflecting the light beam for scanning along the main scan direction X. On the other hand, the deflector mirror plane 651 is pivotally moved about the second axis AX2 so as to adjust the scanned beam for its position on the photosensitive member 2 with respect to the subscan direction Y. In this manner, the embodiment operates the first axis AX1 as a main-scan deflection axis. Furthermore, the optical scanning device 65 functions as a "fine adjustment mechanism" of the invention which operates the second axis AX2 as a fine adjustment axis. As a matter of course, an alternative arrangement may be made such that the first axis AX1 is operated as the fine adjustment axis whereas the second axis AX2 is operated as the main-scan deflection axis.

Returning to FIGS. 3 and 4, the explanation of the exposure unit 6 is continued. As described above, the light beam scanned by the optical scanning device 65 is finely adjusted with respect to the subscan direction Y and then, emitted from the optical scanning device 65 toward the photosensitive member 2. The scanned beam is irradiated on the photosensitive member 2 by means of a second optical system comprising the first scanning lens 66, the reflection mirror 67 and the second scanning lens 68. Thus, as shown in FIG. 10, the scanned beam is scanned in parallel with the main scan direction X to form a linear latent image on the photosensitive member 2, the latent image extended along the main scan direction X.

In this embodiment, as shown in FIG. 4, the start or end of the scanned beam from the optical scanning device 65 is focused on a synchronous sensor 60 by means of a horizontally-synchronizing focus lens 69. That is, the embodiment operates the synchronous sensor 60 as a horizontally-synchronizing detection sensor for providing a synchronous signal with respect to the main scan direction X or a horizontal synchronous signal Hsync.

As described above, the embodiment offers the following working effects.

(A) The optical scanning device 65 is capable of not only defectively scanning the light beam along the main scan direction X, but also of adjusting the scanned beam for its position SL on the photosensitive member 2 with respect to the subscan direction Y by deflecting the light beam from the laser light source 62 in the subscan direction Y in synchronism with the deflective scanning of the light beam. This provides for a simple and high-precision adjustment of the scan position of the light beam on the photosensitive member 2 with respect to the subscan direction Y. As a consequence, it is ensured that a high-quality image is formed because even if the scanned beam is deviated from a reference scan position SL0 with respect to the subscan direction Y due to the component tolerances or assembly errors, such a deviation is corrected. It is noted here that the "reference scan position" means an intended position on which the light beam is to be scanned. The reference scan position is previously defined at the stage of designing the apparatus so that the product is so assembled as to register the scanned beam with the reference scan position.

Now referring to FIG. 10, one example of the fine adjustment operation will be described. In a case where, for example, it is found in the final adjustment step after the product assembly that the scan position SL of the scanned beam is deviated from the reference scan position SL0, indicated by a broken line in the figure, by an amount of deviation Δy along the subscan direction Y, the adjustment may be made as follows. The amount of deviation Δy is previously determined and stored in the RAM 107 functioning as "storage means" of the invention. The CPU 101 retrieves the amount of deviation from the RAM 107 and pivotally moves the deflector mirror plane 651 about the second axis AX2 based on the retrieved value. Thus, the scanned beam is adjusted for its position on the photosensitive member 2 with respect to the subscan direction Y so that the scan position SL of the scanned beam is registered with the reference scan position SL0. In this manner, the scan position SL of the light beam L with respect to the subscan direction Y can be readily and highly precisely registered with the reference scan position SL0. As a result, the formation of high-quality images is ensured.

The embodiment commits the amount of deviation, as "deviation information" of the invention, to storage in the RAM 107. Instead of storing the amount of deviation as it is, however, the RAM may store a value or data item related to the amount of deviation. It is desirable to employ a non-volatile memory such as to retain the amount of deviation or the related value when the apparatus is turned off.

(B) The light beam may be easily and highly precisely adjusted for the scan position thereof on the photosensitive member 2 with respect to the subscan direction Y. Accordingly, the registration deviation may be decreased by adjusting the position of the scanned beam based on the correction information necessary for the correction of the registration deviation, such as registration control amount described in Patent Document 1.

Now, description will be made on one example of the registration correction operation with reference to FIGS. 11A to 11D. Correction information necessary for correcting the registration deviation is determined prior to the actual formation of a color image or at power on, for example. The correction information includes, for example, registration control amounts ΔRy, ΔRm, ΔRc, ΔRk as shown in these figures. When the color image is formed according to a supplied print command, positions to form latent images of the individual colors are adjusted with respect to the subscan direction Y based on the registration control amounts ΔRy, ΔRm, ΔRc, ΔRk, respectively. Specifically, the laser light source 62 is operated based on an image data item representative of a toner image of black as the first color so as to form a latent image on the photosensitive member 2. In this process, the CPU 101 retrieves a registration control amount ΔRy for black from the RAM 107 and pivotally moves the deflector mirror plane 651 about the second axis AX2 based on the retrieved value. Thus, the position SLk of the scanned beam on the photosensitive member 2 with respect to the subscan direction Y is shifted from the reference scan position SL0 by ΔRy along the subscan direction Y (FIG. 11A). Thus, the black toner image is shifted by ΔRy along the subscan direction Y and transferred onto the intermediate transfer belt 71. It is noted here that the "reference scan position SL0" is defined in phantom for convenience in understanding the content of the invention and represents a scan position of the light beam when the registration control amount is zero.

As to the second and succeeding colors, the same procedure as that of the black toner image is taken to form latent images, to form toner images and transfer the resultant toner images. These toner images are superimposed on top of each other on the intermediate transfer belt 71. As to a cyan toner image, a position SLc of the scanned beam on the photosensitive member 2 is shifted from the reference scan position SL0 by ΔRc along the subscan direction Y (FIG. 11B). Thus, the cyan toner image is shifted by ΔRc along the subscan direction Y and then is transferred onto the intermediate transfer belt 71. As to a magenta toner image, a position SLm of the scanned beam on the photosensitive member 2 is shifted from the reference scan position SL0 by ΔRm along the subscan direction Y (FIG. 11C). Thus, the magenta toner image is shifted by ΔRm along the subscan direction Y and then is transferred onto the intermediate transfer belt 71. As to a yellow toner image, a position SLy of the scanned beam on the photosensitive member 2 is shifted from the reference scan position SL0 by ΔRy along the subscan direction Y (FIG. 11D). Thus, the yellow toner image is shifted by ΔRy along the subscan direction Y and then is transferred onto the intermediate transfer belt 71. Accordingly, the toner images of the respective colors are superimposed on top of each other on the intermediate transfer belt 71 as shifted from the reference position by the respective control amounts ΔRy, ΔRm, ΔRc, ΔRk along the subscan direction Y. Hence, the registration deviations are effectively decreased.

Since the registration deviations are corrected by adjusting the scan positions of the scanned beams SLk, SLc, SLm, Sly, as described above, it is no more necessary to change the rotational speeds of the photosensitive member 2 and the intermediate transfer belt 71 in order to correct the registration deviations. This permits the photosensitive member 2 and the intermediate transfer belt 71 to run in a stable manner. As a result, the formation of high-quality images is ensured.

The embodiment commits the registration control amount, as the "correction information" of the invention, to storage in the RAM 107. Instead of storing the registration control amount as it is, however, the RAM may store a value or data item related to the registration control amount. Additionally, it is desirable to employ the non-volatile memory such as to retain the registration control amount or the related value when the apparatus is turned off. In an alternative approach, the correction information may be stored in the controller 11. In these respects, the same holds for the following embodiments.

(C) In addition to the aforementioned working effects, the following working effects may also be attained by virtue of the aforementioned arrangement and operations of the optical scanning device 65. The embodiment employs the optical scanning device 65 adapted to bring the deflector mirror plane 651 into pivotal motions about the first axis AX1 and the second axis AX2. This is advantageous in terms of the downsizing of the apparatus because the exposure unit 6 is constructed in a smaller size than a case where optical scan means (either a combination of a polygon mirror and a pivotal mirror or two pivotal mirrors) is employed.

(D) The optical scanning device may be fabricated with high precisions because the micromachining technique is applied to the monocrystalline silicon substrate 652 for forming the outer movable plate and inner movable plate 656 of the optical scanning device 65. Furthermore, the optical scanning device is capable of pivotally supporting the inner movable plate 656 and the outer movable plate 653 with substantially the same degree of spring performance as that obtained from stainless steel. This permits the deflector mirror plane 651 to be pivotally moved in a stable and quick manner.

(E) For pivotally moving the deflector mirror plane 651 by means of the mirror driver section including the axis drivers 102b, 102c, the embodiment is arranged such that the deflector mirror plane 651 is pivotally moved about the first axis AX1 (main-scan deflection axis) in a resonant mode. This permits the deflector mirror plane 651 to be pivotally moved about the first axis AX1 with low energy. In addition, a main scan period of the scanned beam may be stabilized.

(F) On the other hand, the following working effect is also obtained because the deflector mirror plane 651 is pivotally moved in a non-resonant mode when the deflector mirror plane 651 is positioned via pivotal motion about the second axis AX2 (fine adjustment axis). In order to re-adjust the scanned beam for its scan position SL with respect to the subscan direction Y, the pivotal motion of the deflector mirror plane 651 about the second axis AX2 must be stopped after the re-adjustment is accomplished. Therefore, the deflector mirror plane may preferably be driven in the non-resonant mode such as to effect or to stop the pivotal motion with high precisions.

(G) There may be used an electrostatic attractive force or electromagnetic force as a drive force for bringing the deflector mirror plane 651 into the pivotal motion. Particularly, the embodiment employs the electrostatic attractive force for pivotally moving the deflector mirror plane 651 about the first axis AX1 (main-scan deflection axis), thus negating the need for forming a coil pattern at the inner movable plate 656. Therefore, the optical scanning device 65 can be reduced in size, achieving a faster light deflection for scanning.

(H) On the other hand, the electromagnetic force is used for pivotally moving the deflector mirror plane 651 about the second axis AX2 (fine adjustment axis). Hence, the deflector mirror plane 651 may be pivotally moved with a lower drive voltage than where the electrostatic attractive force is generated. This results in an easy voltage control and thence in an increased precision for positioning the scanned beam.

In addition, this embodiment involves a fear that the optical scanning device (deflector) 65 may be affected by heat generated by the optical scanning device 65 because the optical scanning device 65 is located at place below the scan position on the photosensitive member 2. However, the optical scanning device is arranged such that the silicon substrate 652 and the movable plates 653, 656 are integrally formed in a manner to permit the inner movable plate 656 to be pivotally moved relative to the silicon substrate (support member) 653 via the outer movable plate 653, and that the movable plate 656 is driven into pivotal motion by way of the electrostatic attractive force or electromagnetic force for scanning the light beam along the main scan direction X. The optical scanning device 65 so fabricated using the micromachining technique can achieve a notable reduction of heat generated by the optical scanning device in contrast to an optical scanning device wherein the polygon mirror is rotated by means of a mechanical drive element such as a motor. Hence, an interior space of the exposure unit casing 61 and a space between the exposure unit casing 61 and the photosensitive member 2 are subjected to less heat so that shimmering of heated air in these spaces is suppressed. As a result, it is ensured that the latent image is formed in a stable manner with the high-precision irradiation of the light beam on the scan position, in spite of the passage of the light beam through these spaces.

Second Embodiment

Figure 12:
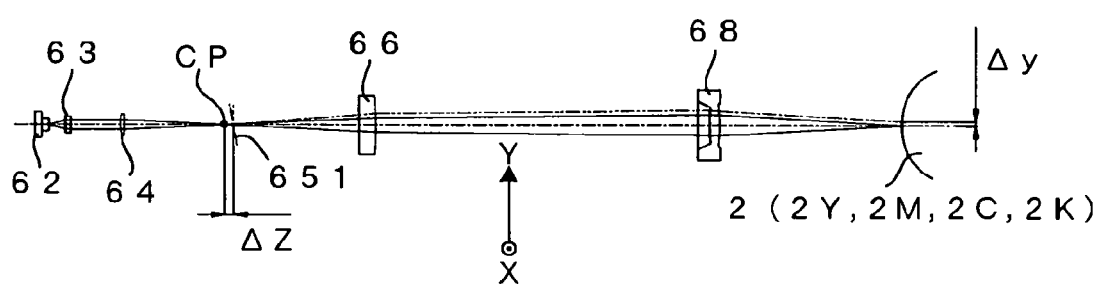
FIG. 12 is a diagram showing a second embodiment of the image forming apparatus according to the invention.

FIG. 12 is a diagram showing a second embodiment of the image forming apparatus according to the invention. While the first embodiment is arranged to establish the optically conjugated relationship between the surface of each photosensitive member 2 and the deflector mirror plane 651, the second embodiment has a so-called non-conjugated optical system wherein the deflector mirror plane 651 is shifted from a conjugate point CP with respect to the surface of the photosensitive member by a distance $\Delta z$. Therefore, the second embodiment involves a fear of error associated with the tilted deflection plane. In the second embodiment, the causative factors of deviated scanned beam from the reference scan position SL0 with respect to the subscan direction Y further includes the error associated with the tilted deflection plane in addition to the component tolerances and assembly errors.

However, except for the above difference, the second embodiment is arranged the same way as the first embodiment. That is, the optical scanning device 65 includes the fine adjustment mechanism. Hence, even if the scanned beam is deviated from the reference scan position SL0 with respect to the subscan direction Y, the deviation (deviation amount $\Delta y$) may be corrected to form the high-quality image (Effect I).

In the second embodiment, a mere correction of the registration deviation cannot eliminate a fear that the image quality may be degraded by the error $\Delta y$ associated with the tilted deflection plane. Fortunately, however, the optical scanning device 65 includes the fine adjustment mechanism. Accordingly, both the registration deviation and the error associated with the tilted deflection plane can be highly precisely corrected at a time by pivotally moving the deflector mirror plane 651 about the second axis AX2 by a value obtained by combining the registration control amount for correction of the registration deviation and the aforesaid error $\Delta y$ (Effect J).

Third Embodiment

Figure 13:
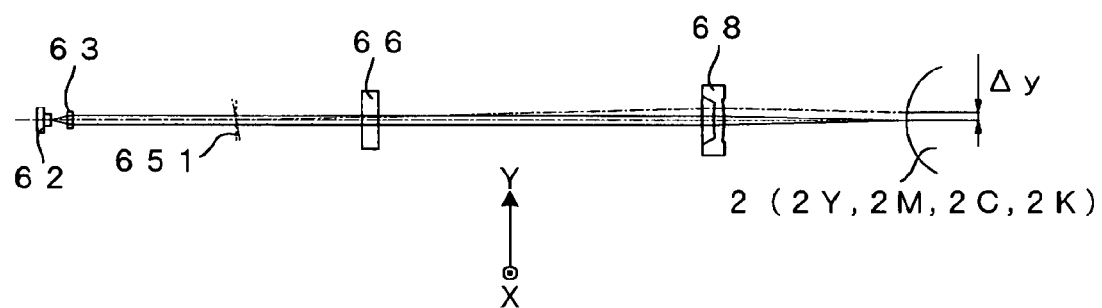
FIG. 13 is a diagram showing a third embodiment of the image forming apparatus according to the invention.

FIG. 13 is a diagram showing a third embodiment of the image forming apparatus according to the invention. According to the third embodiment, as shown in the figure, the light beam from the laser light source 62 is shaped into the collimated beam by means of the collimator lens 63 and then, the resultant collimated beam becomes incident directly on the deflector mirror plane 651 of the optical scanning device 65. The scanned beam thus deflected by the deflector mirror plane 651 is focused on the surface of each photosensitive member 2 by means of the second optical system including the first scanning lens 66 and the second scanning lens 68. Thus, the third embodiment has the non-conjugated optical system similarly to the second embodiment. Therefore, the third embodiment also involves the fear of the error associated with the tilted deflection plane.

Except for the above difference, however, the third embodiment is arranged the same way as the first embodiment. That is, the optical scanning device 65 includes the fine adjustment mechanism. Hence, even if the scanned beam is deviated from the reference scan position SL0 with respect to the subscan direction Y, the deviation (deviation amount $\Delta y$) may be corrected to form the high-quality image.

Furthermore, both the registration deviation and the error associated with the tilted deflection plane can be highly precisely corrected at a time by pivotally moving the deflector mirror plane 651 about the second axis AX2 by a value obtained by combining the registration control amount for correction of the registration deviation and the aforesaid error associated with the tilted deflection plane $\Delta y$.

The third embodiment negates the need for the provision of the cylindrical lens, thus reducing the number of components. This leads to not only the reduction of the apparatus costs but also to the downsizing of the exposure unit 6 and the compact design of the image forming apparatus. Furthermore, an operation for optical adjustment is simplified (Effect K).

It is apparent from the first to third embodiments that, regardless of whether the optical system is the conjugated type or the non-conjugated type, the position of the scanned beam can be readily adjusted with high precisions by virtue of the fine adjustment mechanism provided at the optical scanning device 65. Therefore, the optical scanning system for deflectively scanning the light beam from the laser light source 62 may be arranged in various forms, so that the degree of freedom in designing the apparatus is increased (Effect L).

Fourth to Sixth Embodiments

Figure 14:
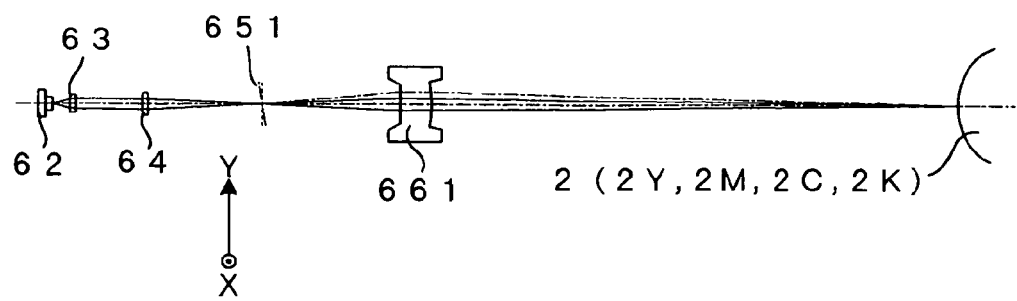
FIG. 14 is a diagram showing a fourth embodiment of the image forming apparatus according to the invention.

FIG. 14 is a diagram showing a fourth embodiment of the image forming apparatus according to the invention. The fourth embodiment principally differs from the first embodiment in the arrangement for focusing the scanned beam on the photosensitive member 2, the beam scanned by the deflector mirror plane 651 along the main scan direction X. According to the first embodiment, the first scanning lens 66 and the second scanning lens 68 constitute the optical focusing system (second optical system) such that the scanned beam L is focused on the photosensitive member 2 by means of the scanning lenses 66, 68. In contrast, the fourth embodiment uses an aspherical single lens 661 for focusing the scanned beam L on the photosensitive member 2.

The aspherical single lens 661 has the following features. That is, the lens has a distortion characteristic that the scanned beam deflected based on a swinging characteristic intrinsic to the deflector mirror plane 651 is moved on the surface of each photosensitive member 2 at a constant speed. In addition, the lens is configured such that opposite sides in a tangential plane (main scan plane) have mutually different non-arcuate shapes such as to correct for tangential field-curvature aberration (main scan direction X) in the light beam at any position on the surface of each photosensitive member 2. The lens is also specified such that sagital curvatures at positions on the non-arcuate curve of at least either one of the opposite sides in the tangential plane are varied non-correlatively of the tangential curvature in order to correct for the sagital field-curvature aberration (equivalent to the rotational direction of the photosensitive member 2). The details of the configuration and action of the aspherical single lens are described in, for example, Japanese Examined Patent Publication No. 7-60221 and hence, the description thereof is dispensed with.

Where the "optical focusing system" of the invention is constituted by the aspherical single lens 661, the system can form an extremely favorable image spot suffering little aberration, despite being comprised of the single lens. Furthermore, the aspherical single lens may constitute a scanning lens featuring a wide deflection angle and a short optical length. This provides for an effective reduction of the size and cost of the exposure unit 6 and also contributes to the downsizing and cost reduction of the image forming apparatus (Effect M).

According to the fourth embodiment, as well, it goes without saying that even if the scanned beam is deviated from the reference scan position SL0 with respect to the subscan direction Y, the deviation may be corrected to form the high-quality image similarly to the first embodiment because the optical scanning device 65 includes the fine adjustment mechanism.

Furthermore, the embodiment permits the toner images of the respective colors to be superimposed on top of each other on the intermediate transfer belt 71 as shifted from the reference position along the subscan direction Y by the respective registration control amounts ΔRy, ΔRm, ΔRc, ΔRk, thereby effectively reducing the registration deviations. In addition, the embodiment negates the need for changing the rotational speeds of the photosensitive members 2 and the intermediate transfer belt 71 for the purpose of correcting the registration deviations. Hence, the photosensitive members 2 and the intermediate transfer belt 71 are allowed to run in a stable manner. As a result, it is ensured that the image of an excellent quality is formed.

Figure 15:
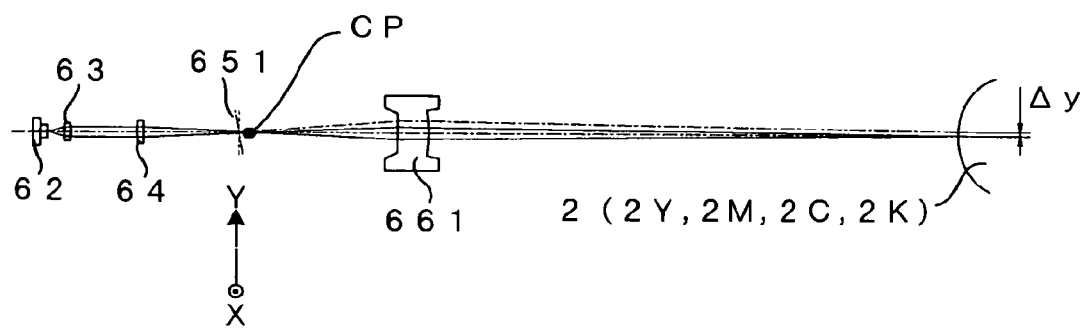
FIG. 15 is a diagram showing a fifth embodiment of the image forming apparatus according to the invention.

Similarly to the second embodiment, this embodiment may have the so-called non-conjugated optical system wherein the deflector mirror plane 651 is shifted by a distance Δz from the conjugate point CP with respect to the surface of the photosensitive member (the fifth embodiment shown in FIG. 15). Alternatively, the embodiment may have the same optical system as the third embodiment, the optical system wherein the light beam from the laser light source 62 is shaped into the collimated beam by means of the collimator lens 63 and then, the resultant collimated beam becomes incident directly on the deflector mirror plane 651 of the optical scanning device 65 (the sixth embodiment shown in FIG. 16). In these cases, as well, the optical scanning device 65 includes the fine adjustment mechanism and hence, even if the scanned beam is deviated from the reference scan position SL0 with respect to the subscan direction Y, the deviation may be corrected to form the high-quality image.

Furthermore, both the registration deviation and the error associated with the tilted deflection plane can be highly precisely corrected at a time by pivotally moving the deflector mirror plane 651 about the second axis AX2 by a value obtained by combining the registration control amount and the error associated with the tilted deflection plane Δy.

It is apparent from the fourth to sixth embodiments that, regardless of whether the optical system is the conjugated type or the non-conjugated type, the position of the scanned beam can be readily adjusted with high precisions by virtue of the fine adjustment mechanism provided at the optical scanning device 65. Therefore, the optical scanning system for deflectively scanning the light beam from the laser light source 62 may be arranged in various forms, even though the optical focusing system is comprised of the aspherical single lens 661. Hence, the degree of freedom in designing the apparatus may be increased. Other embodiments to be described hereinlater may similarly employ the aspherical single lens as the optical focusing system.

Seventh Embodiment

Figure 17:
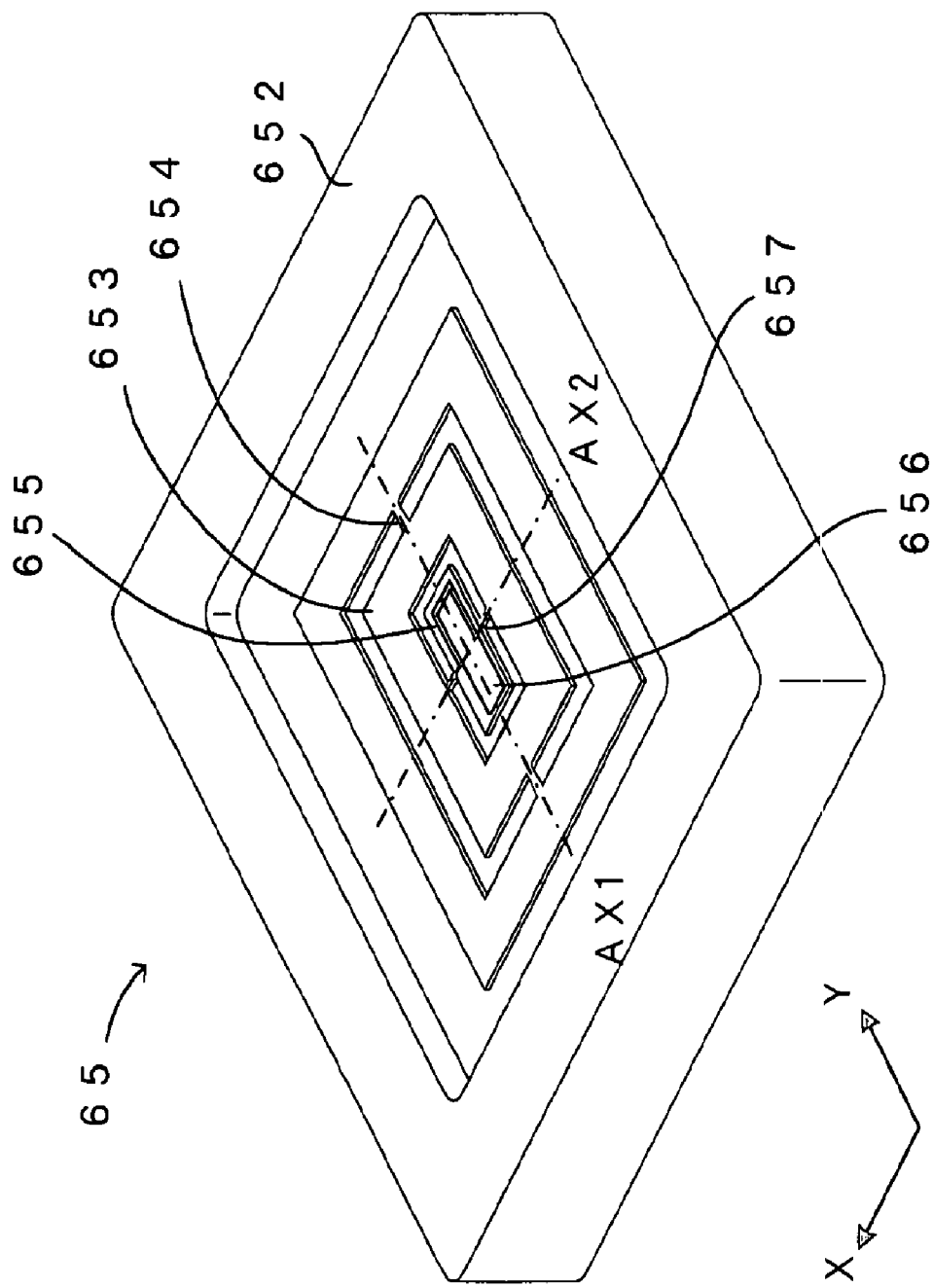
FIG. 17 is a perspective view showing an optical scanning device as one component of an exposure unit according to a seventh embodiment of the invention.
Figure 18:
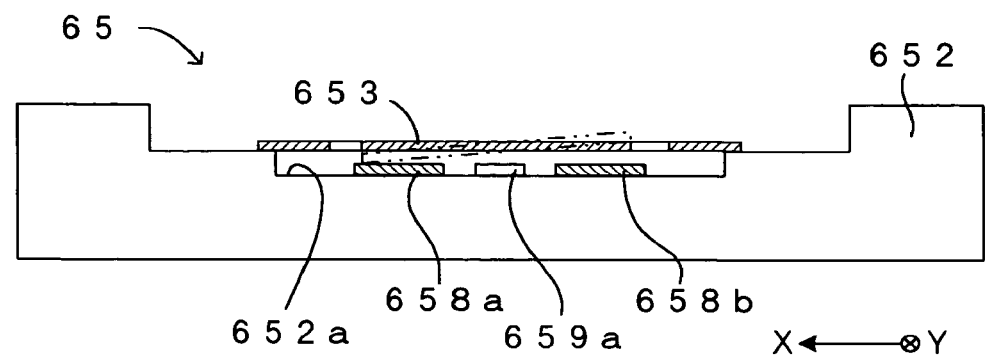
FIG. 18 is a sectional view taken along a first axis of the optical scanning device of FIG. 17.
Figure 19:
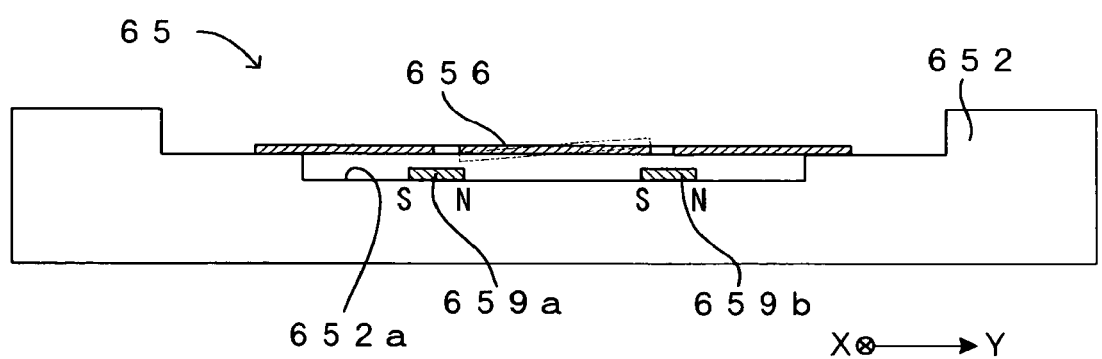
FIG. 19 is a sectional view taken along a second axis of the optical scanning device of FIG. 17.

FIGS. 17 to 19 are diagrams showing an optical scanning device employed by a seventh embodiment of the exposure unit according to the invention. The seventh embodiment is arranged the same way as the first to sixth embodiments except for an arrangement of the optical scanning device. Therefore, the following description will focus on the difference while the explanation of the other arrangements and the operations will be dispensed with.

The optical scanning device 65 is formed using the micromachining technique which applies the semiconductor fabrication technique for integrally forming micromachines on a semiconductor substrate. The optical scanning device 65 is adapted to deflect the light beam reflected from the deflector mirror plane 651 in two directions perpendicular to each other, namely the main scan direction and the subscan direction. More specifically, the optical scanning device 65 is arranged as follows.

In the optical scanning device 65, the monocrystalline silicon substrate (hereinafter, referred to as "silicon substrate") 652 functions as the "support member" of the invention, as shown in FIG. 17. The optical scanning device is also provided with the outer movable plate 653 formed by processing a part of the silicon substrate 652. The outer movable plate 653 is shaped like a frame and is resiliently supported by the silicon substrate 652 via the torsion spring 654, thus allowed to pivot about the first axis AX1 extended substantially in parallel with the main scan direction X.

The flat inner movable plate 656 is pivotally supported in the outer movable plate 653. Specifically, the inner movable plate 656 is resiliently supported internally of the outer movable plate 653 by means of the torsion spring 657 having its axis extended perpendicular to that of the torsion spring 654. Thus, the inner movable plate is allowed to pivot about the second axis AX2 extended substantially in parallel with the main scan direction X. The deflector mirror plane 651 such as of an aluminum film is formed centrally of the inner movable plate 656. Disposed on a circumferential edge of the upper side of the inner movable plate 656 is a planar coil 655 which is electrically connected with a pair of outside electrode terminals (not shown) formed on the upper side of the silicon substrate 652. The planar coil is coated with an insulation layer and serves as the "second-axis driving coil".

As shown in FIGS. 18 and 19, the recess 652a is formed substantially centrally of the silicon substrate 652 such as to permit the outer movable plate 653 and the inner movable plate 656 to pivot about the respective axes AX1 and AX2. On the other hand, the electrodes 658a, 658b are fixed to the inside bottom of the recess 652a at respective places opposite the opposite ends of the inner movable plate 656 (see FIG. 18). These two electrodes 658a, 658b function as the "first axis electrode" for driving the inner movable plate 656 into pivotal motion about the first axis AX1. Specifically, the first axis electrodes 658a, 658b are electrically connected with the first axis driver 102b of the exposure control section 102. The electrostatic attractive force is produced between the electrodes and the deflector mirror plane 651 by applying a voltage to the electrodes. The electrostatic attractive force acts to attract one end of the deflector mirror plane 651 toward the electrode. At this time, the inner movable plate (deflector mirror plane 651) is also pivotally moved about the torsion spring 654, as the first axis AX1, in unison with the outer movable plate 653. Therefore, when the first axis driver 102b applies the predetermined voltage alternately to the first axis electrode 658a and 658b, the deflector mirror plane 651 can be brought into reciprocal oscillations about the torsion spring 657 as the first axis AX1.

If the driving frequency of the reciprocal oscillations is set to a resonance frequency of the deflector mirror plane 651, the oscillation amplitude of the deflector mirror plane 651 is increased so that the ends of the deflector mirror plane 651 may be moved as far as to positions near the electrodes 658a, 658b. The deflector mirror plane 651 is resonantly oscillated to present its ends in proximity of the electrodes 658a, 658b, thereby allowing the electrodes 658a, 658b to contribute to the driving of the deflector mirror plane 651. Thus, the oscillations of the deflector mirror plane may be retained in a more stable manner by virtue of the cooperation between the ends of the deflection plate and the electrodes on the flat side.

As shown in FIG. 19, the permanent magnets 659a, 659b in mutually different orientations are fixed to the inside bottom of the recess 652a at places outwardly relative to the opposite ends of the outer movable plate 653. The second-axis driving coil 655 is electrically connected with the second axis driver 102c of the exposure control section 102. When the coil 655 is energized, Lorentz force occurs as a result of the influences of the direction of current flowing through the second-axis driving coil 655 and of the direction of the magnetic flux from the permanent magnets 659a, 659b, producing a moment to rotate the outer movable plate 653. If an alternating current is applied to the second-axis driving coil 655 to continue the repetitive motions of the plate, the deflector mirror plane 651 may be brought into reciprocal oscillations about the torsion spring 654 as the second axis AX2.

In this manner, the optical scanning device 65 is adapted to drive the deflector mirror plane 651 into individually independent pivotal motions about the first axis AX1 and the second axis AX2 perpendicular to each other. According to the embodiment, the mirror driver section including the first axis driver 102b and the second axis driver 102c is so controlled as to pivotally move the deflector mirror plane 651 about the first axis AX1, thereby deflecting the light beam for scanning along the main scan direction. On the other hand, the deflector mirror plane 651 is pivotally moved about the second axis AX2 so as to adjust the scanned beam for its position on the photosensitive member 2 with respect to the subscan direction Y. In this manner, the embodiment operates the first axis AX1 as the main-scan deflection axis, and the second axis AX2 as the fine adjustment axis.

In the exposure unit 6 equipped with the optical scanning device 65 thus arranged, as well, the light beam scanned by the optical scanning device 65 is finely adjustment with respect to the subscan direction Y and then is emitted from the optical scanning device 65 toward the photosensitive member 2 the same way as in the first to the sixth embodiments. That is, the scanned beam is irradiated on the photosensitive member 2 via the second optical system including the first scanning lens 66, the reflection mirror 67 and the second scanning lens 68. Thus, as shown in FIG. 10, the light beam is scanned in parallel with the main scan direction X to form a linear latent image on the photosensitive member 2, the latent image extended along the main scan direction X.

Accordingly, the embodiment can attain the same working effects as the first to the sixth embodiments. However, this embodiment further offers the following working effects because the drive force for driving the deflector mirror plane 651 into the pivotal motion is defined as described above.

(N) The electrostatic attractive force or electromagnetic force may be used as the drive force for bringing the deflector mirror plane 651 into the pivotal motion. On the other hand, the electromagnetic force may be used for pivotally moving the deflector mirror plane 651 about the second axis AX2 (subscan deflection axis). The following working effect is obtained from an orientational relation between the first axis AX1 (main-scan deflection axis) and the second axis AX2 (subscan deflection axis). In this embodiment, the deflection angle with respect to the main scan direction X corresponds to the angular range of scanning, whereas the deflection angle with respect to the subscan direction Y corresponds to the position of the scanned beam with respect to the subscan direction Y, as will be described hereinlater. Therefore, the deflection angle with respect to the main scan direction X is greater than the deflection angle with respect to the subscan direction Y.

In order to set the optical scanning device for a great deflection angle with respect to the main scan direction X thereby scanning the light beam across a predetermined range, it is desirable to increase the drive force applied to the deflector mirror plane 651. Specifically, where the deflector mirror plane is driven with the electrostatic force, the drive force may be increased by increasing the area of the electrodes. Where the deflector mirror plane is driven by electromagnetic induction, on the other hand, the drive force may be increased by increasing the number of coil patterns. In either driving system, therefore, the movable member for pivotally moving the deflector mirror plane 651 (the inner movable plate 656 plus the outer movable plate 653) need be increased in size to increase the drive force. However, a mere size increase of the movable member results in the increased size of the optical scanning device 65. Hence, the embodiment adopts the aforementioned arrangement wherein the inner movable plate 656 is adapted for pivotal motion about the second axis AX2 (subscan deflection axis), thereby achieving the wide deflection angle with respect to the main scan direction X. Thus, the embodiment satisfies the dual purposes of downsizing the optical scanning device 65 and enhancing the performance thereof.

As mentioned supra, the embodiment adopts the resonant mode for the light deflection along the main scan direction X. If a resonant frequency is deviated from a predetermined value, the scanned speed of the light beam is varied so that the resultant latent image is expanded or contracted with respect to the main scan direction X. This results in the degradation of the image quality. Therefore, it is crucial to set the resonant frequency to the predetermined value for high-precision forming of consistent images.

A factor affecting the resonant frequency includes a weight of the movable member (the inner movable plate 656 plus the outer movable plate 653), a spring constant of the torsion spring and the like. In order to stabilize the resonant frequency, it is essential to increase the configuration precisions of the movable member. Where the inner movable plate 656 and the outer movable plate 653 are fabricated using the micromachining technique, the fabrication precisions are increased with increase in the size of the movable member. This is advantageous in stabilizing the resonant frequency. Unfortunately, however, the increased size of the movable member leads to the increased size of the optical scanning device 65, as described above. According to the embodiment, therefore, the subscan deflection axis is defined by the second axis AX2 disposed internally of the movable member, so that the outer movable plate operated in the resonant mode may be increased in size without changing the overall size of the movable member. As a result, the dual purposes of downsizing the optical scanning device 65 and enhancing the performance thereof are satisfied.

(O) Furthermore, the light beam from the laser light source 62 is converged by the first optical system only in the subscan direction so as to be linearly focused at place near the deflector mirror plane 651 of the optical scanning device 65. Therefore, the deflector mirror plane 651 may be reduced in size, offering an advantage in high-speed scanning.

Eighth Embodiment

Figure 20:
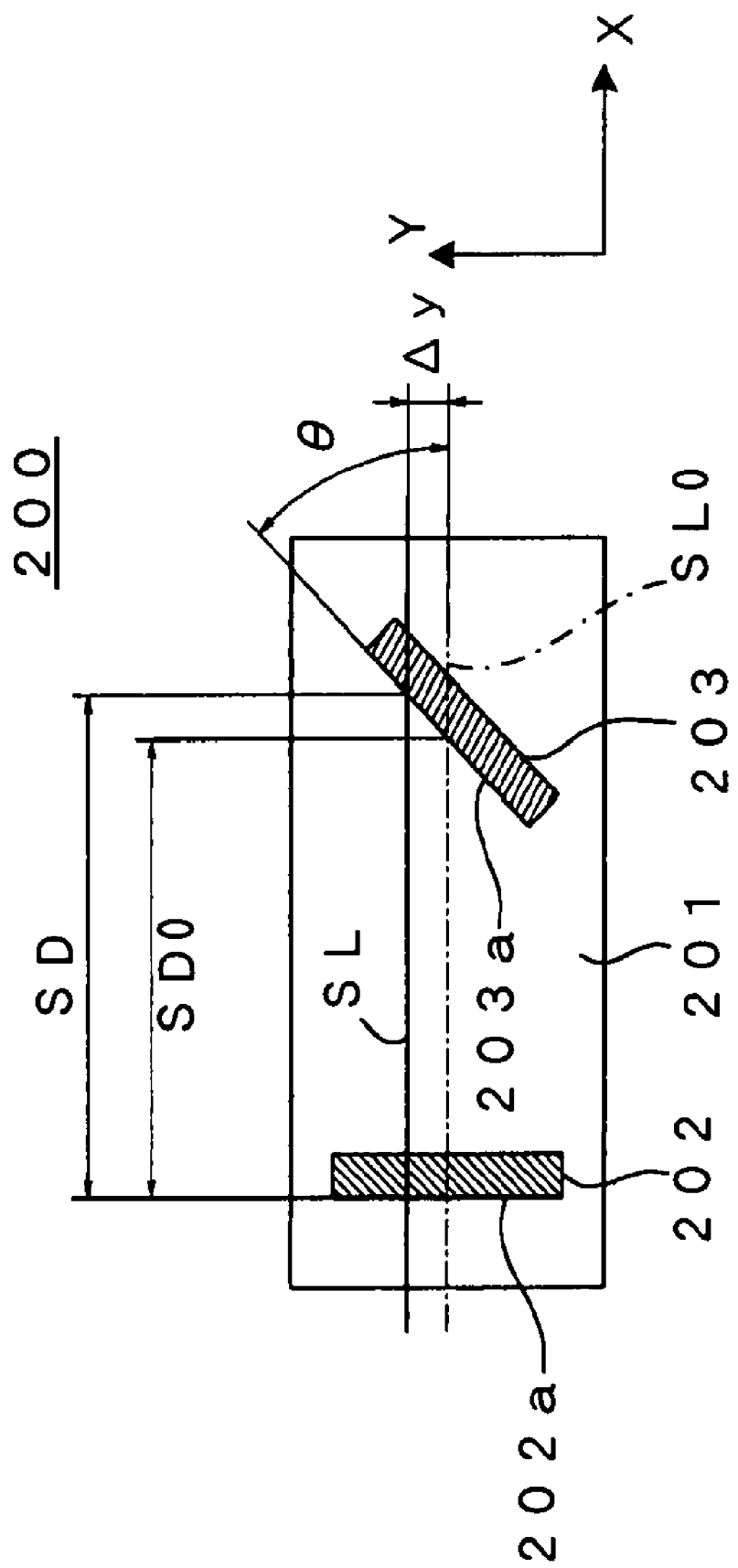
FIG. 20 is a diagram showing an arrangement of a deviation detector installed in an eighth embodiment of the image forming apparatus according to the invention.

During the operation of the image forming apparatus, the scan position SL of the scanned beam may be deviated from the reference scan position SL0 with respect to the subscan direction Y due to the changes in the operating environment and such. In order to enhance the image quality by overcoming such a problem, a deviation detector such as shown in FIG. 20 may be provided for active correction of the deviated scan position SL. Referring to FIG. 20, an eighth embodiment of the invention will be described as below.

FIG. 20 is a diagram showing an arrangement of a deviation detector installed in the eighth embodiment of the image forming apparatus according to the invention. The deviation detector 200 includes two photosensors 202, 203 which are mounted on a sensor base plate 201 as spaced away from each other by a predetermined distance along the main scan direction X. These photosensors 202, 203 each have a rectangular effective sensing region. One 202 of the photosensors is positioned in a manner that a longitudinal side of its effective sensing region 202a is substantially perpendicular to the main scan direction X. The other photosensor 203 is positioned in a manner that a longitudinal side of its effective sensing region 203a is inclined at an angle θ to the main scan direction X. Accordingly, as shown in the figure, a position detected by the photosensor 203 is shifted along the main scan direction X if the scan position SL is deviated from the reference scan position SL0 along the subscan direction Y. Where the scan position is at the reference scan position SL0, a detection distance is SD0. When the light beam is scanned on the reference scan position SL0, it takes a reference time t0 for scanning. In contrast, where the scan position is deviated by αy along the subscan direction Y, a detection distance corresponding to the deviated scan position SL is SD. When the light beam is scanned on the scan position SL, a corresponding scan time is tm. Thus, the amount of deviation Δy may be determined based on a time difference (=tm−t0).

According to the eighth embodiment, the photosensors 202, 203 are electrically connected with the CPU 101. Based on output signals from the photosensors 202, 203, the CPU 101 determines the amount of deviation Δy with respect to the subscan direction Y, using the following equation:

$$\Delta y = V_s \times (tm - t0) \times \tan\theta,$$

wherein Vs denotes a scan speed of the light beam. In addition, the CPU conditions the fine adjustment mechanism for adjusting the position of the scanned beam in accordance with the amount of deviation Δy of the scan position.

According to the eighth embodiment as described above, the deviation detector 200 senses the amount of deviation Δy of the scan position on the photosensitive member relative to the reference scan position SL0 with respect to the subscan direction Y. Based on the detection result, the fine adjustment mechanism adjusts the scanned beam for its position SL with respect to the subscan direction Y, whereby the scanned beam is registered with the reference scan position SL0. In other words, an active adjustment is made on the position of the scanned beam with respect to the subscan direction Y during the operation of the apparatus, whereby the scan position SL of the light beam is prevented from deviating from the reference scan position SL0 along the subscan direction Y. This ensures that the high-quality images are always formed (Effect P).

Ninth Embodiment

In the image forming apparatus of this type, the formation of the latent image, the development process and the image transfer process are controlled based on the vertical synchronous signal Vsync. However, the timing of scanning the light beam or the horizontal synchronous signal Hsync is asynchronous with the vertical synchronous signal Vsync and hence, there may occur a synchronization error between the vertical synchronous signal and the scanning timing. In such a case, an image transferred to the transfer medium such as the intermediate transfer belt 71 is deviated from a transfer position by an amount of the synchronization error. This leads to the following problem. The synchronization error varies from a toner image of one color to that of another color so that the toner images of the respective colors are displaced from one another. That is, the registration deviations occur to lower the image quality. It may be contemplated to eliminate the registration deviations by adjusting the scan position with respect to the subscan direction Y. In this approach, the difference between the horizontal synchronous signal Hsync and the vertical synchronous signal Vsync is defined as a "deviation amount" of the invention. Based on the deviation amount, the fine adjustment mechanism may adjust the scanned beam for its position SL with respect to the subscan direction Y, thereby eliminating the registration deviations caused by the synchronization error (Effect Q). While an excellent response performance, in particular, is required for eliminating the synchronization error, an active control by way of the fine adjustment mechanism may be provided to satisfy the above requirement. Thus is ensured that the high-quality images are formed. It is noted here that the vertical synchronous sensor 77 and the synchronous sensor 60 are equivalent to "detection means" of the invention.

II. Multi-Beam 4-Cycle System Apparatus

Tenth Embodiment

Figure 21:
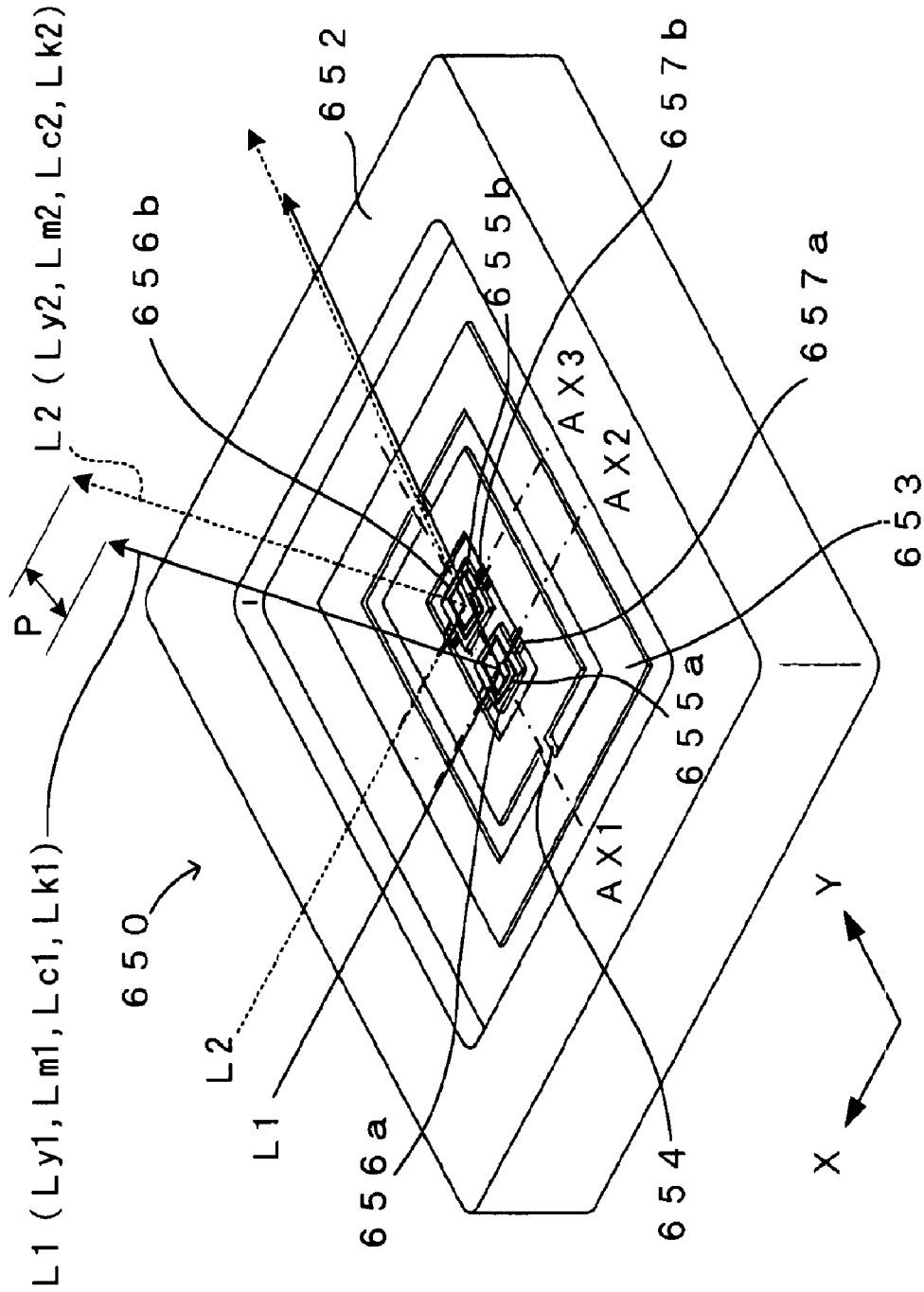
FIG. 21 is a perspective view showing an optical scanning device of an exposure unit according to the invention.
Figure 22:
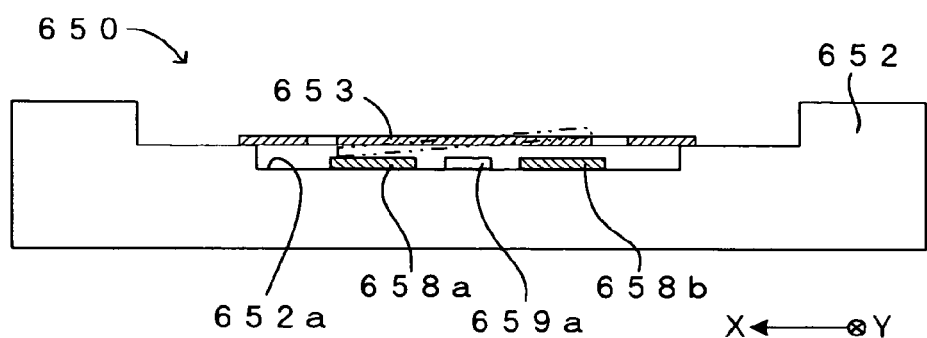
FIG. 22 is a sectional view taken along a main scan direction of the optical scanning device of FIG. 21.
Figure 23:
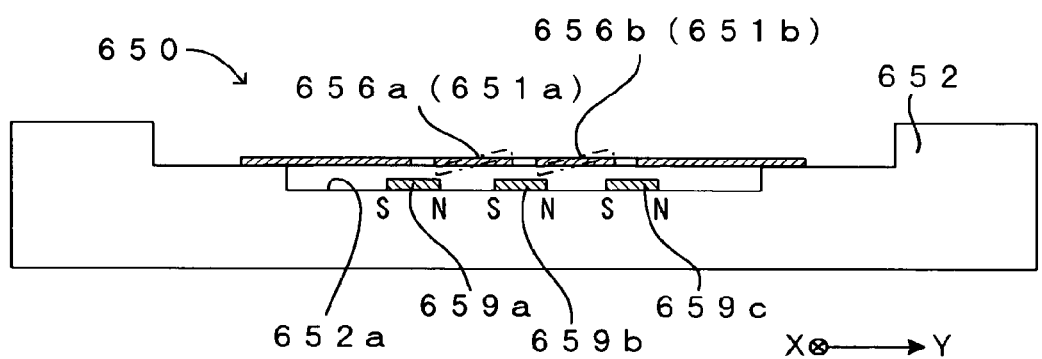
FIG. 23 is a sectional view taken along a subscan direction of the optical scanning device of FIG. 21.
Figure 24:
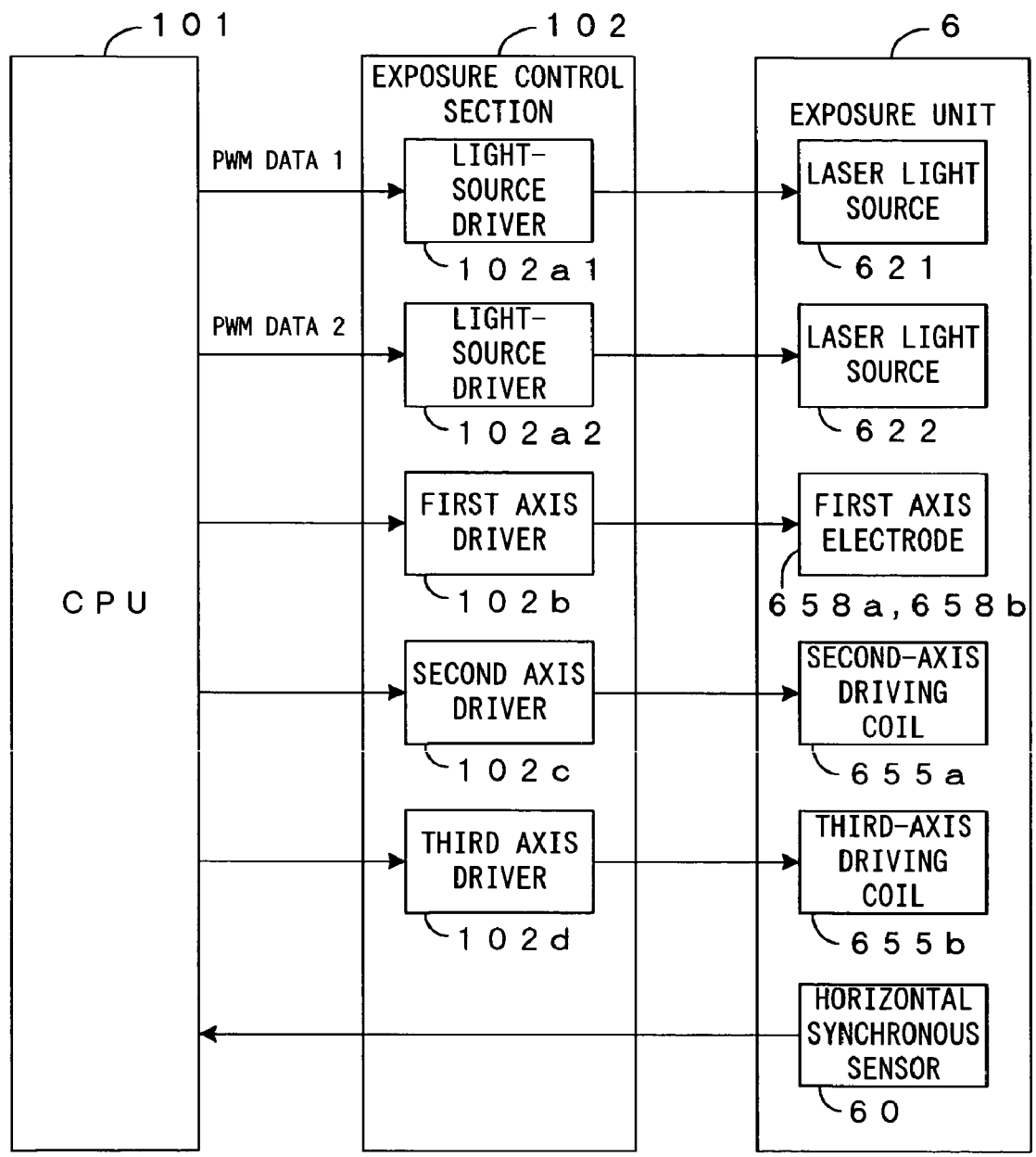
FIG. 24 is a block diagram showing an electrical arrangement of an image forming apparatus equipped with the exposure unit of FIG. 21.

FIG. 21 is a perspective view showing an optical scanning device of an exposure unit according to the invention. FIGS. 22 and 23 are sectional views taken along the main scan direction and along the subscan direction of the optical scanning device of FIG. 21, respectively. FIG. 24 is a block diagram showing an electrical arrangement of an image forming apparatus equipped with the exposure unit of FIG. 21. A tenth embodiment principally differs from the first to the ninth embodiments in that the exposure unit comprises a light source section which includes two laser light sources 621, 622 and from which two light beams L1, L2 are emitted, and in that the light beams L1, L2 are deflected by deflector mirror planes 651a, 651b, respectively. Otherwise, the embodiment is arranged the same way as the first embodiment. Therefore, the same reference numerals are used and the description thereof is dispensed with.

The tenth embodiment is provided with an optical scanning device 650 including the two deflector mirror planes 651a, 651b. These deflector mirror planes 651a, 651b are pivotally movable in unison about the first axis AX1 as the main-scan deflection axis and are independently pivotally movable about respective second axis AX2 and AX3 as the subscan deflection axes.

Similarly to the aforesaid optical scanning device 65, this optical scanning device 650 is also formed using the micromachining technique which applies the semiconductor fabrication technique for integrally forming the micromachines on a semiconductor substrate. In the optical scanning device 651, the silicon substrate 652 functions as the "support member" of the invention, as shown in FIG. 21. The outer movable plate 653 is formed by processing a part of the silicon substrate. The outer movable plate 653 is shaped like a frame and is resiliently supported by the silicon substrate 652 via the torsion spring 654, thus allowed to pivot about the first axis AX1 extended substantially in parallel with the subscan direction Y.

Two inner movable plates 656a, 656b are pivotally supported in the outer movable plate 653, as allowed to move independently from each other. Specifically, the inner movable plate 656a is resiliently supported in the outer movable plate 653 via a torsion spring 657a with its axis extended perpendicularly to that of the torsion spring 654, thus allowed to pivot about the second axis AX2 extended substantially in parallel with the main scan direction X. Disposed at a circumferential edge of an upper side of the inner movable plate 656a is a planar coil 655a which is coated with an insulation layer and serves as the "second-axis driving coil". Furthermore, an aluminum film as a deflector mirror plane 651a is laid on a central portion of the upper side of the inner movable plate 656a.

The inner movable plate 656b on the other side also has the same arrangement as the inner movable plate 656a. Specifically, the inner movable plate 656b is resiliently supported in the outer movable plate 653 via a torsion spring 657b, thus allowed to pivot about the third axis AX3 extended substantially in parallel with the main scan direction X. Disposed atop the inner movable plate 656b are a planar coil 655b as a "third-axis driving coil" and a deflector mirror plane 651b.

As shown in FIGS. 22 and 23, the recess 652a is formed substantially centrally of the silicon substrate 652 such as to permit the outer movable plate 653 and the inner movable plates 656a, 656b to pivot about the respective axes AX1, AX2 and AX3. On the other hand, the electrodes 658a, 658b are fixed to the inside bottom of the recess 652a at respective places opposite the opposite ends of the outer movable plate 653 (see FIG. 22). These two electrodes 658a, 658b function as the "first axis electrode" for driving the outer movable plate 653 into pivotal motion about the first axis AX1. Specifically, the first axis electrodes 658a, 658b are electrically connected with the first axis driver 102b of the exposure control section 102. The outer movable plate 653 is brought into oscillations about the first axis AX1 by means of the first axis driver 102b applying the predetermined voltage alternately to the first axis electrode 658a and 658b. Thus, both the deflector mirror planes 658a, 658b are brought into reciprocal oscillations. By setting the driving frequency of the reciprocal oscillations to the resonant frequency of the outer movable plate, the oscillation amplitude of the outer movable plate 653 is increased so that the opposite ends of the outer movable plate 653 may be moved so far as to positions in proximity of the electrodes 658a, 658b.

As shown in FIG. 23, permanent magnets 659a to 659c in mutually different orientations are fixed to the inside bottom of the recess 652a at places outwardly relative to the respective opposite ends of the inner movable plates 656a, 656b. The second-axis and third-axis driving coils 655a, 655b are electrically connected with the second axis driver 102c and a third_axis driver 102d of the exposure control section 102, respectively. Hence, the inner movable plate 656a (deflector mirror plane 651a) may be brought into pivotal motion about the torsion spring 657a as the second axis AX2 by energizing the coil 655a. On the other hand, the inner movable plate 656b (deflector mirror plane 651b) may be brought into pivotal motion about the torsion spring 657b as the third axis AX3 by energizing the coil 655b. It is noted here that if the alternating current is applied to the second-axis driving coil 655a and the third-axis driving coil 655b to continue the repetitive motions of the plates, the deflector mirror plane 651a may be brought into reciprocal oscillations about the torsion spring 657s as the second axis AX2 while the deflector mirror plane 651b may be brought into reciprocal oscillations about the torsion spring 657b as the third axis AX3. In this manner, the embodiment is adapted to control the deflector mirror planes 651a, 651b independently from each other.

The optical scanning device 650 is designed to drive the deflector mirror plane 651a into pivotal motion about the first axis AX1 and the second axis AX2 perpendicular to each other and to drive the deflector mirror plane 651b into pivotal motion about the first axis AX1 and the third axis AX3 perpendicular to each other, the deflector mirror planes movable independently from each other. According to the embodiment, the mirror driver section including the first axis driver 102b, the second axis driver 102c and the third axis driver 102d is so controlled as to pivotally move the deflector mirror planes 651a, 651b about the first axis AX1, thereby deflecting the two light beams L1, L2 for scanning along the main scan direction X. On the other hand, the deflector mirror plane 651a is pivotally moved about the second axis AX2 thereby to shift the light beam L1 along the subscan direction Y, whereas the deflector mirror plane 651b is pivotally moved about the third axis AX3 thereby to shift the light beam L2 along the subscan direction Y. Thus, the individual scanned beams may be adjusted for their positions with respect to the subscan direction Y. In this manner, the embodiment operates the first axis AX1 as the main-scan deflection axis, and the second axis AX2 and the third axis AX3 as the subscan deflection axes. Furthermore, the embodiment is adapted to control a distance between the two scanned beams (beam pitch P) by independently driving the inner movable members 656a, 656b into pivotal motions about the respective subscan deflection axes AX2, AX3.

As described above, the tenth embodiment also offers the same working effects as the first to the ninth embodiments. Furthermore, the distance between the two scanned beams is controllable, as mentioned supra. Therefore, the image quality may be improved by adjusting the distance between the scanned beams, as required.

III. Single-Beam Tandem Apparatus

Eleventh Embodiment

Figure 25:
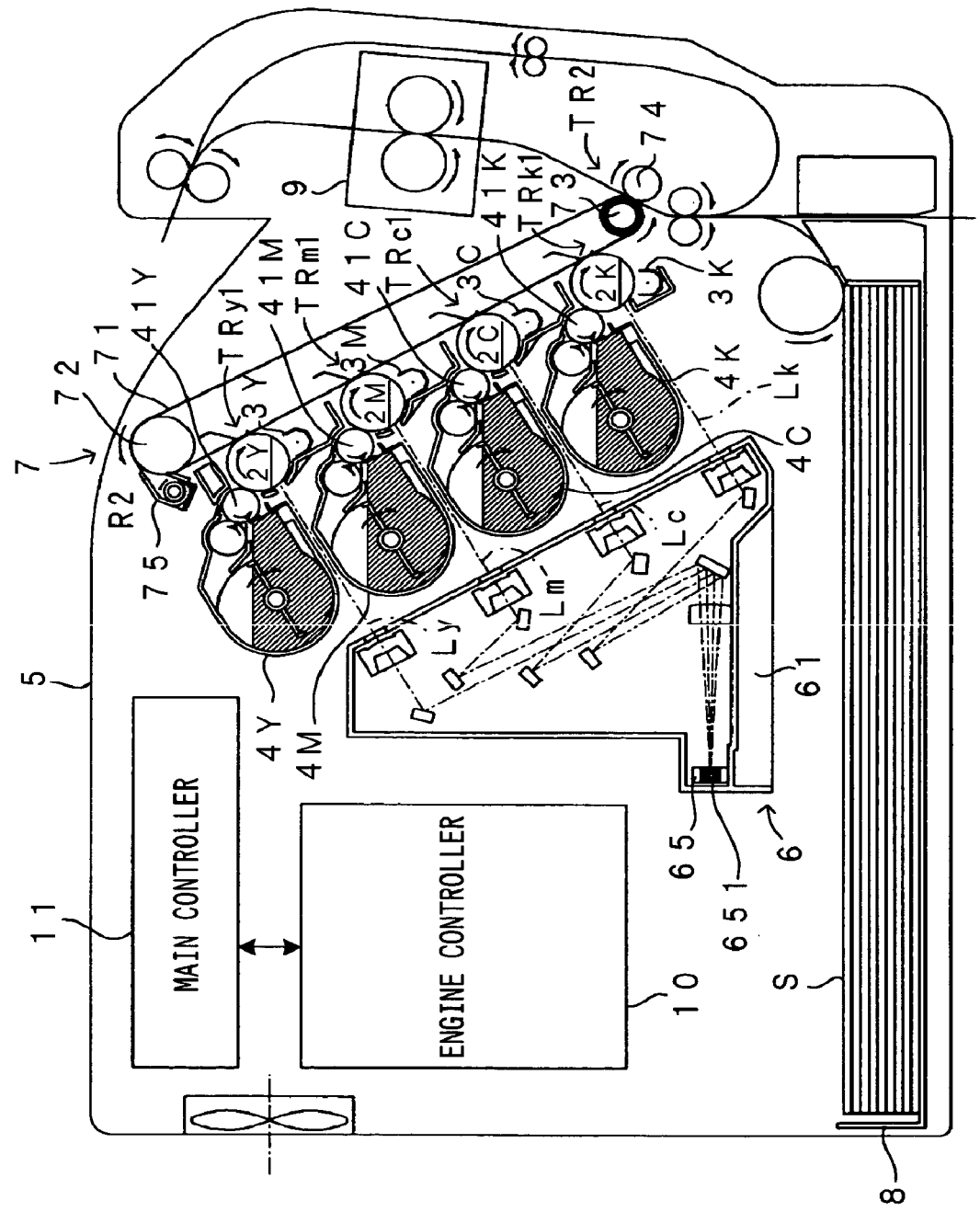
FIG. 25 is a diagram showing an eleventh embodiment of the image forming apparatus according to the invention.

FIG. 25 is a diagram showing an eleventh embodiment of the image forming apparatus according to the invention. The image forming apparatus is a color printer of a so-called tandem system. As the latent image carriers, photosensitive members 2Y, 2M, 2C, 2K for four different colors of yellow (Y), magenta (M), cyan (C) and black (K) are juxtaposed in the apparatus body 5. The apparatus forms a full color image by superimposing the toner images formed on the individual photosensitive members 2Y, 2M, 2C, 2K or forms a monochromatic image using the toner image of black (K) alone. When, in response to a user demand for forming an image, the external apparatus such as a host computer outputs a print command to the main controller 11, the CPU 111 of the main controller 11 outputs a print command which is responded by the engine controller 10 which, in turn, controls the individual parts of the engine EG for forming the image corresponding to the print command on a sheet S such as a copy sheet, transfer sheet, plane paper sheet or transparent sheet for OHP. Since the apparatus has substantially the same electrical arrangement as that of the first embodiment, description will be made with reference to FIGS. 2 and 9 as required.

In the engine EG, a charger unit, a developing unit and a cleaner are provided in correspondence to each of the four photosensitive members 2Y, 2M, 2C, 2K. Since the charger units, developing units and cleaners for the respective colors have the same arrangements, the description here is made on the arrangements for the yellow color. On the other hand, the description on the arrangements for the other colors is omitted while the components thereof are represented by corresponding reference numerals.

The photosensitive member 2Y is rotatable in a direction of an arrow shown in FIG. 25. The charger unit 3Y, the developing unit 4Y and the cleaner (not shown) are disposed around the photosensitive member 2Y as arranged along the direction of the rotation thereof. The charger unit 3Y comprises, for example, a scorotron charger. The charger unit is applied with a charging bias from the charge control section 103 so as to uniformly charge an outer periphery of the photosensitive member 2Y at a predetermined surface potential. The exposure unit 6 irradiates a scanned beam Ly upon the outer periphery of the photosensitive member 2Y thus charged by the charger unit 3Y. Thus, an electrostatic latent image is formed on the photosensitive member 2Y in correspondence to a yellow image data item included in the print command. The exposure unit 6 is not dedicated to the yellow color but is shared by the individual color components. The exposure unit operates based on a control command from the exposure control section 102. The arrangement and operations of the exposure unit 6 will be described in details hereinlater.

The electrostatic latent image thus formed is developed into a toner image by the developing unit 4Y, which contains therein a yellow toner. When a developing bias from the developing-unit control section 104 is applied to a developing roller 41Y, the toner carried on the developing roller 41Y is caused to adhere to surface portion of the photosensitive member 2Y according to surface potentials thereat. As a result, the electrostatic latent image on the photosensitive member 2Y is visualized as a yellow toner image. The developing bias applied to the developing roller 41Y may be a DC voltage, a DC voltage with an AC voltage superimposed thereon, or the like. Particularly in an image forming apparatus of a non-contact development system wherein the photosensitive member 2Y and the developing roller 41Y are spaced a distance from each other and wherein the latent image is developed with a toner caused to jump across the gap therebetween, the developing bias may preferably have a waveform obtained by superimposing an AC voltage of a sine wave, triangular wave or a rectangular wave on the DC voltage in the light of efficient toner jump.

The yellow toner image developed by the developing unit 4Y is primarily transferred onto the intermediate transfer belt 71 of the transfer unit 7 in a primary transfer region TRy1. Toner images of the other color components than yellow are formed the same way as the yellow toner image. The developing units for the other color components than yellow are arranged the same way as that for the yellow color. A magenta toner image, a cyan toner image and a black toner image are formed on the respective photosensitive members 2M, 2C, 2K and are primarily transferred onto the intermediate transfer belt 71 in respective primary transfer regions TRm1, TRc1, TRk1.

The transfer unit 7 includes the intermediate transfer belt 71 entrained around a plurality of rollers 72, 73; and a belt driver (not shown) which drives the roller 72 into rotation thereby rotating the intermediate transfer belt 71 in a predetermined rotational direction R2. On the other hand, a secondary transfer roller 74 opposes the roller 73 with the intermediate transfer belt 71 interposed therebetween. The secondary transfer roller is adapted to be pressed against or moved away from the belt 71 by means of an unillustrated electromagnetic clutch. In a case where a color image is transferred to the sheet S, the color image is formed on the intermediate transfer belt 71 by superimposing the respective toner images on top of each other with primary transfer timings so controlled. In the meantime, the resultant color image is secondarily transferred onto the sheet S taken out from the cassette 8 and delivered to the secondary transfer region TR2 defined between the intermediate transfer belt 71 and the secondary transfer roller 74. In a case where, on the other hand, a monochromatic image is transferred onto the sheet S, only a black toner image is formed on the photosensitive member 2K and then is transferred onto the sheet S delivered to the secondary transfer region TR2. After subjected to the secondary image transfer, the sheet S is transported to the discharge tray disposed on the upper side of the apparatus body via the fixing unit 9.

After the toner images are primarily transferred to the intermediate transfer belt 71, the individual photosensitive members 2Y, 2M, 2C, 2K are subjected to unillustrated static elimination means for resetting their surface potentials. Furthermore, the photosensitive members are cleaned of residual toners remaining thereon by means of the respective cleaners and thereafter, subjected to the subsequent charging process by the charger units 3Y, 3M, 3C, 3K.

A transfer belt cleaner 75, the density sensor 76 (FIG. 2) and the vertical synchronous sensor 77 (FIG. 2) are disposed in vicinity of the roller 72. The cleaner 75 is adapted to be moved to or away from the roller 72 by means of an unillustrated electromagnetic clutch. As moved to the roller 72, the cleaner 75 presents its blade against the surface of the intermediate transfer belt 71 entrained about the roller 72, so as to remove the adhered toner from an outside surface of the intermediate transfer belt 71, the toner remaining on the intermediate transfer felt after the secondary image transfer. The density sensor 76 faces to the surface of the intermediate transfer belt 71 for determining an optical density of a patch image formed on the outside surface of the intermediate transfer belt 71. The vertical synchronous sensor 77 is a sensor for detecting a reference position of the intermediate transfer belt 71, functioning as a vertical synchronous sensor for outputting a synchronous signal or the vertical synchronous signal Vsync in association with the rotation of the intermediate transfer belt 71 in the subscan direction. In this apparatus, the operations of the individual parts thereof are controlled based on the vertical synchronous signal Vsync in order to synchronize the operating timings of the individual parts and to superimpose the toner images of the respective colors exactly on top of each other.

Figure 26:
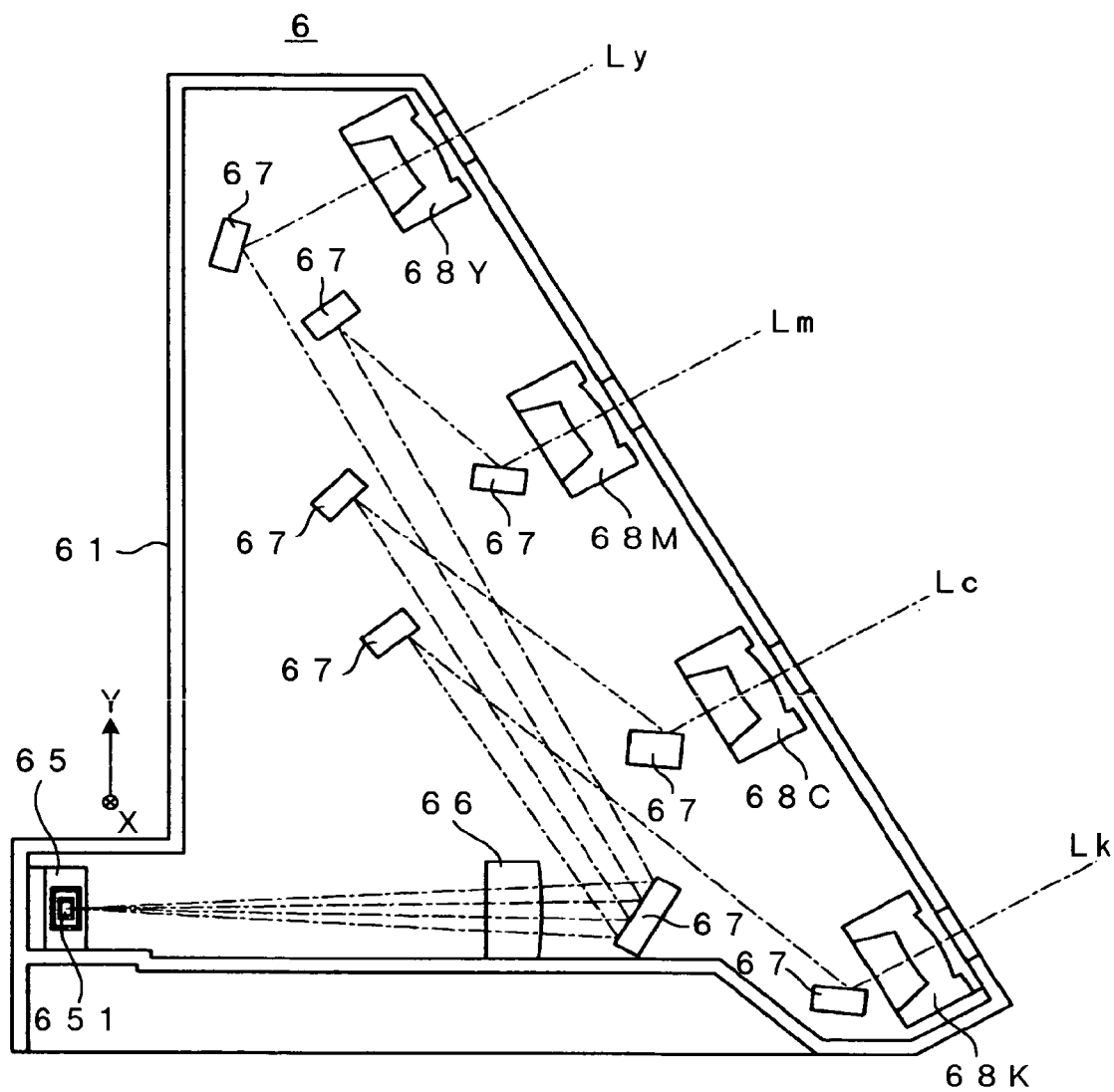
FIG. 26 is a sectional view taken along a subscan direction of an exposure unit installed in the image forming apparatus of FIG. 25.
Figure 27:
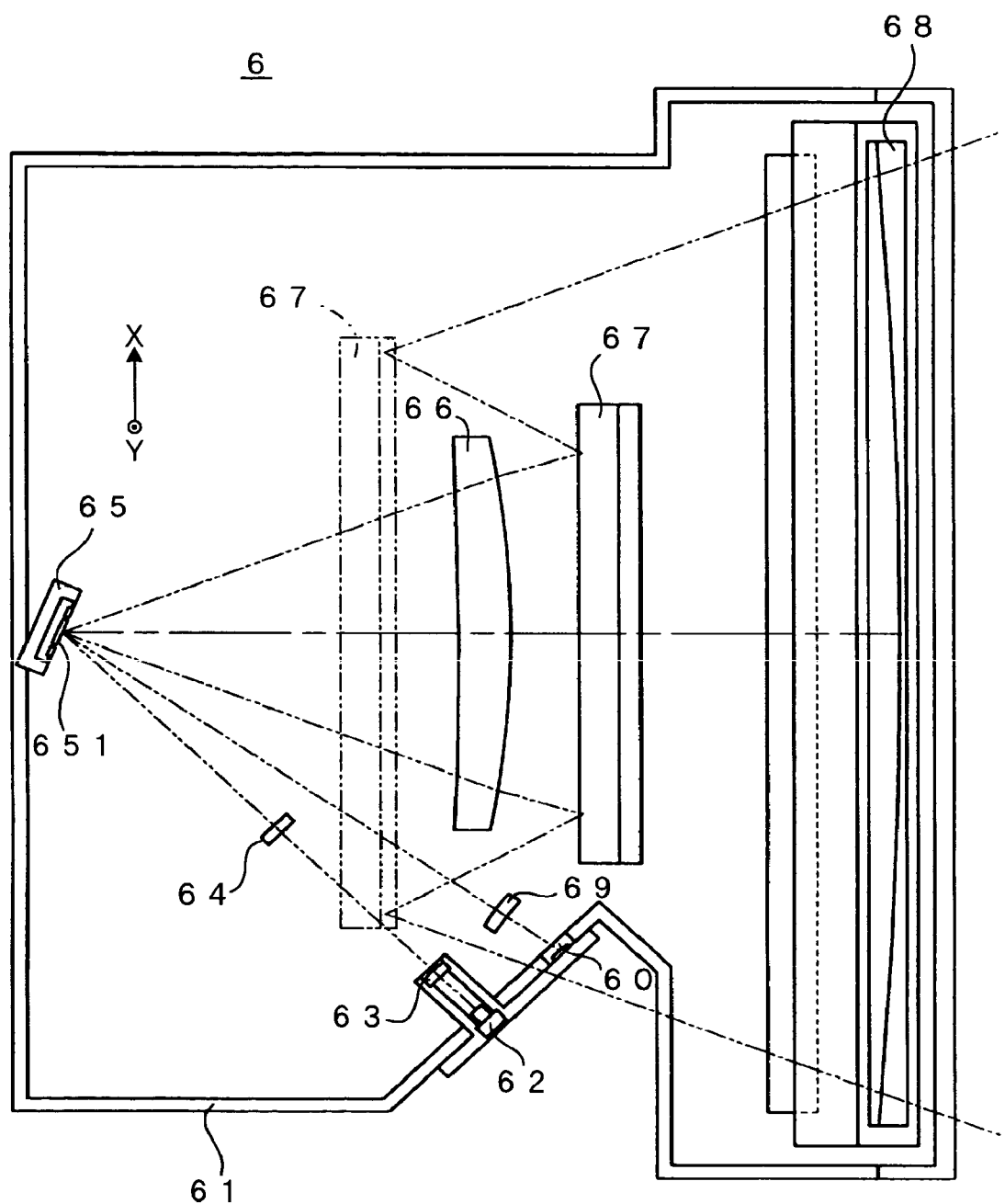
FIG. 27 is a sectional view taken along a main scan direction of the exposure unit installed in the image forming apparatus of FIG. 25.

FIG. 26 is a sectional view taken along the subscan direction of an exposure unit installed in the image forming apparatus of FIG. 25 for showing the arrangement thereof FIG. 27 is a sectional view taken along the main scan direction of the exposure unit installed in the image forming apparatus of FIG. 25. The exposure unit 6 has an exposure unit casing 61.

The exposure unit casing 61 has a single laser light source 62 fixed thereto such as to emit a light beam from the laser light source 62. As shown in FIG. 9, the laser light source 62 is electrically connected with the light-source driver 102a of the exposure control section 102. Hence, the light-source driver 102a provides ON/OFF control of the laser light source 62 based on the image data so that a light beam modulated according to the image data may be emitted from the laser light source 62. According to the embodiment, the laser light source 62 is equivalent to the "light source" of the invention.

Within the exposure unit casing 61, the collimator lens 63, the cylindrical lens 64, the optical scanning device 65, the first scanning lens 66, a group of reflection mirrors 67 and the second scanning lenses 68 (68Y, 68M, 68C, 68K) are provided for scanningly irradiating the light beam from the laser light source 62 onto the surface of the photosensitive members 2Y, 2M, 2C, 2K. Specifically, the light beam from the laser light source 62 is shaped into a collimated beam of a suitable size by means of the collimator lens 63 and then becomes incident on the cylindrical lens 64 powered only in the subscan direction, as shown in FIG. 5. The collimated beam is converged only in the subscan direction so as to be linearly focused at place near the deflector mirror plane 651 of the optical scanning device 65. Incidentally, the optical scanning device 65 has the same arrangement as that of the first embodiment. It goes without saying that this embodiment may employ the optical scanning device 65 arranged the same way as in the seventh embodiment. In this section, the description will focus on the operations of the optical scanning device 65, omitting the explanation of the arrangement thereof.

According to the embodiment, the mirror driver section including the first axis driver 102b and the second axis driver 102c is so controlled as to bring the deflector mirror plane 651 into pivotal motion about the first axis AX1, thereby deflecting the light beam for scanning along the main scan direction X. Furthermore, the deflector mirror plane 651 is pivotally moved about the second axis AX2 for the dual purposes of guiding the light beam to any one of the four photosensitive members 2Y, 2M, 2C, 2K thereby selectively switching the scanned beam from one photosensitive member to another for irradiation with the scanned beam, and of finely adjusting the scanned beam for its scan position on the photosensitive member with respect to the subscan direction Y. Thus, the embodiment operates the first axis AX1 as the main-scan deflection axis, and the second axis AX2 as the fine adjustment axis. In this embodiment, the second axis AX2 functions not only as the fine adjustment axis but also as a switch axis. In other words, the embodiment is adapted to selectively switch the light beam from one photosensitive member to another for irradiation with the scanned beam by taking the method wherein the deflector mirror plane 651 is pivotally moved about the second axis AX2 thereby guiding the light beam to any one of the four photosensitive members 2Y, 2M, 2C, 2K. It goes without saying that an arrangement may be made such that the first axis AX1 has the dual functions as the fine adjustment axis and the switch axis whereas the second axis AX2 functions as the main-scan deflection axis. Hereinafter, the axis having such dual functions will be referred to simply as the "switch axis" for simplicity of explanation.

Returning to FIGS. 26 and 27, the explanation of the exposure unit 6 is continued. As scanned by the optical scanning device 65 as described above, the light beam is emitted from the optical scanning device 65 toward the selected one of the photosensitive members. In this process, the scanned beam is irradiated upon the selected photosensitive member via the second optical system including the first scanning lens 66, the reflection mirror group 67 and the second scanning lens 68. In a case where, for example, the light beam is switched to the yellow photosensitive member 2Y by the optical scanning device 65, a scanned beam for yellow Ly is irradiated on the photosensitive member 2Y via the first scanning lens 66, the reflection mirror group 67 and the second scanning lens 68Y thereby to form a linear latent image thereon. The same holds for the other color components.

Figure 29:
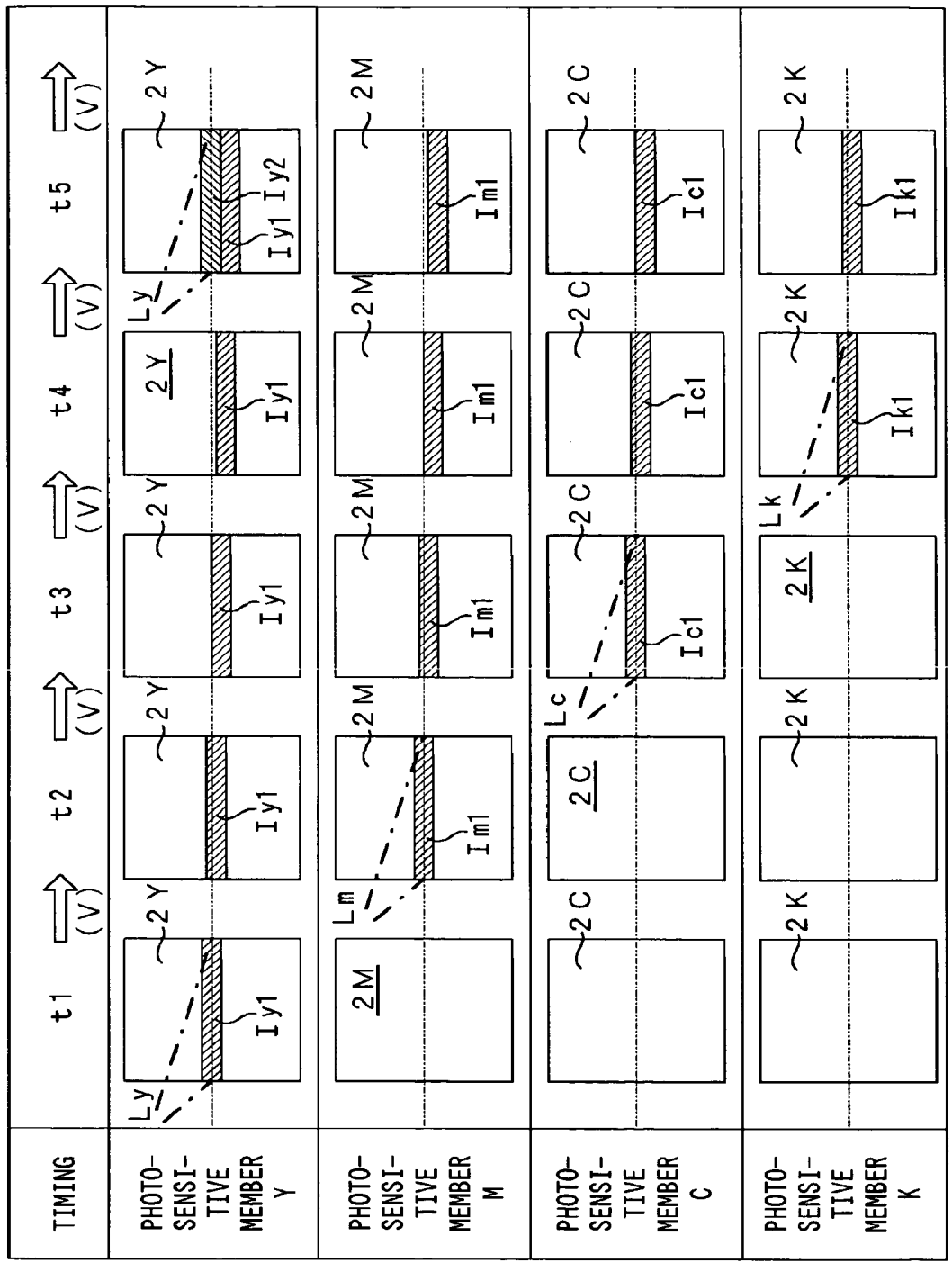
FIG. 29 is a schematic diagram showing a color-image forming operation performed by the image forming apparatus of FIG. 25.

FIG. 28 is a diagram schematically showing an image processing performed by the image forming apparatus of FIG. 25. FIG. 29 is a schematic diagram showing a color-image forming operation performed by the image forming apparatus of FIG. 25. Now, the color-image forming operation (color printing operation) of the image forming apparatus of FIG. 25 will hereinbelow be described with reference to these figures. When a color print command is supplied from the external apparatus such as a host computer, the image forming apparatus commits image data D included in the print command to storage in an image memory 113. As shown in FIG. 28, the image data D includes a plurality of 1-line color-image data pieces DL. The main controller 11 performs color separation for obtaining 1-line color data sets for the respective color components. Specifically, there are obtained a plurality of 1-line image data pieces DLy for yellow, a plurality of 1-line image data pieces DLm for magenta, a plurality of 1-line image data pieces DLc for cyan and a plurality of 1-line image data pieces DLk for black, which are stored in the image memory 113. In this embodiment, the image memory 113 functions as the "storage means" of the invention. The term "1-line image data piece" herein means a line data piece equivalent to one scan stroke of the scanned beam for the color of interest. Accordingly, when the light beam from the laser light source 62 is scanned on the photosensitive member 2 corresponding to the color component indicated by the 1-line image data piece with the laser light source 62 ON/OFF-controlled based on the 1-line image data piece, there is formed a linear latent image represented by the 1-line image data piece of the color component of interest.

At completion of the color separation of the image data D per page or given block, the main controller 11 sequentially reads out 1-line image data pieces from the image memory 113 as timed to the writing of a latent image to each of the photosensitive members 2 (see dot-dash lines with arrows in FIG. 28). In this embodiment, the image data pieces are serially read out in the order of Y-Y-Y-M-Y-M-Y-M-C- . . . since the photosensitive members 2Y, 2M, 2c, 2K are arranged at given space intervals. Based on the serial data including the 1-line image data pieces DLy, DLm, DLc, DLk thus read, laser modulation data (PWM data) is generated for modulation of the pulse width of the light beam from the laser light source 62. The resultant data is outputted to the engine controller 10 via an unillustrated video IF. Where the 1-line image data pieces are serially read out from the image memory 113 in the order of Y-M-C-K-Y . . . , for example, PWM data pieces corresponding to the respective 1-line image data pieces are applied to the engine controller 10.

Receiving the PWM data pieces, the engine controller 10 sequentially forms linear latent images by scanning, in each timing, the light beam exclusively on any one of the photosensitive members that corresponds to each of the PWM data pieces while rotating the photosensitive members 2Y, 2M, 2C, 2K at a constant speed V. Specifically, when the aforesaid PWM data pieces are applied, the laser light source 62 first emits the light beam to the optical scanning device 65 at a timing t1 under ON/OFF control based on a 1-line image data piece of yellow. At the timing t1, the second axis driver 102c energizes the coil 655 thereby to set the deflector mirror plane 651 in position via the pivotal motion about the second axis AX2 as the switch axis so that the light beam may be guided to the photosensitive member 2Y. After the pivotal motion about the second axis AX2 is stopped, the deflector mirror plane 651 thus set in position is brought into reciprocal oscillations about the first axis AX1 as the main-scan deflection axis by means of the first axis driver 102b applying the predetermined voltage alternately to the first axis electrode 658a and 658b, thereby defectively scanning the light beam along the main scan direction X. Thus, the light beam Ly is scanned only on the photosensitive member 2Y for forming a linear latent image Iy1 corresponding the 1-line image data piece of yellow DLy, as illustrated by a column of "timing t1" in FIG. 29. It is noted that a two-dot and dash line in FIG. 29 (and FIGS. 30-32 to be described hereinlater) indicates an exposure position on the photosensitive member.

After completion of the formation of the linear latent image Iy1, the laser light source 62 emits the light beam to the optical scanning device 65 at the subsequent timing t2 under ON/OFF control according to a 1-line image data piece of magenta. At the timing t2, the second axis driver 102c energizes the coil 655 thereby to set the deflector mirror plane 651 in position via the pivotal motion about the second axis AX2 such that the light beam may be guided to the photosensitive member 2M. In the position thus set, the deflector mirror plane 651 is brought into reciprocal oscillations about the first axis AX1 by means of the first axis driver 102b applying the predetermined voltage alternately to the first axis electrode 658a and 658b, thereby defectively scanning the light beam along the main scan direction X. Thus, the light beam Lm is scanned only on the photosensitive member 2M for forming a linear latent image 1 ml corresponding the 1-line image data piece of magenta DLm, as illustrated by a column of "timing t2" in FIG. 29.

In a similar manner to the above, a cyan linear latent image Ic1, a black linear latent image Ik1, a yellow linear latent image Iy2, . . . are formed on the respective photosensitive members 2 for the respective color components at the respective timings t3, t4, t5, . . . . In this manner, the latent images corresponding to the image data D are formed on the respective photosensitive members 2Y, 2M, 2C, 2K. These latent images are developed into toner images of the four colors by the respective developing units 4Y, 4M, 4C, 4K. By controlling primary transfer timings, these toner images are superimposed on top of each other on the intermediate transfer belt 71, whereby a color image is formed. Subsequently, the resultant color image is secondarily transferred onto the sheet S and then fixed thereto.

Figure 30:
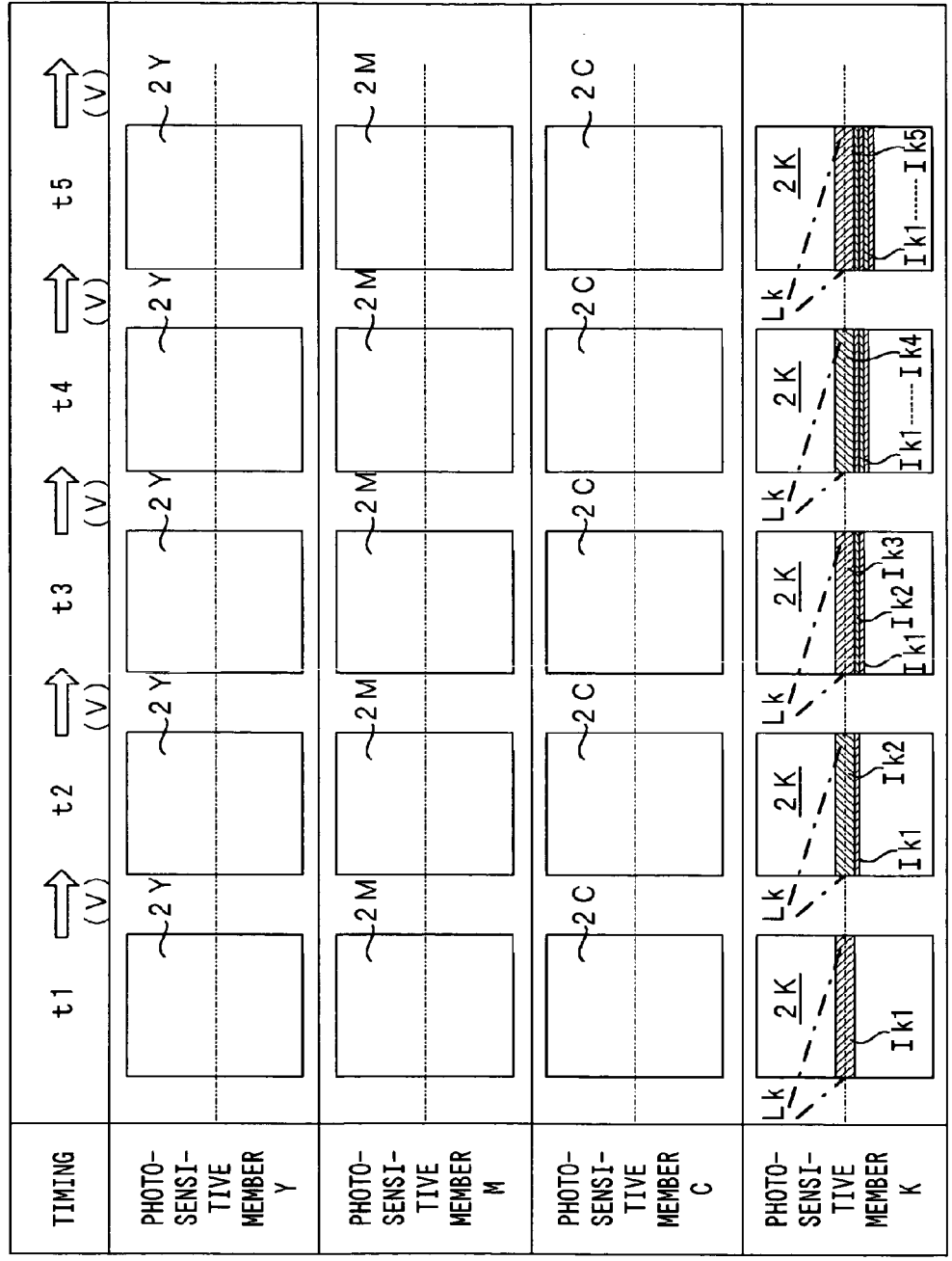
FIG. 30 is a schematic diagram showing one exemplary monochromatic-image forming operation performed by the image forming apparatus of FIG. 25.
Figure 33A:
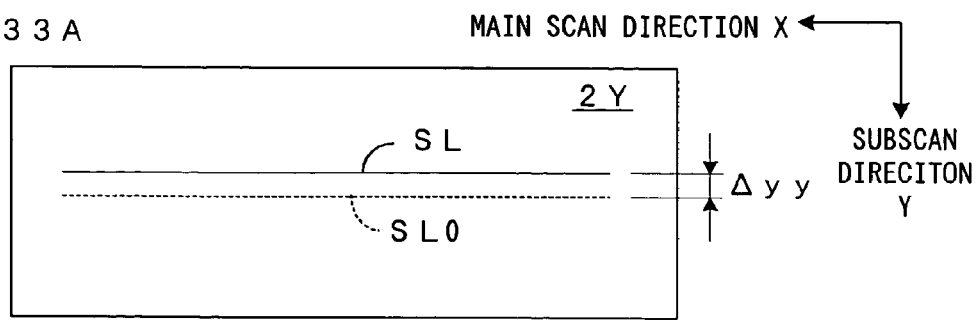
FIGS. 33A-33D and FIGS. 34A-34D are diagrams each schematically showing a relationship between a scan position of a scanned beam and a reference scan position on a photosensitive member.
Figure 33B:
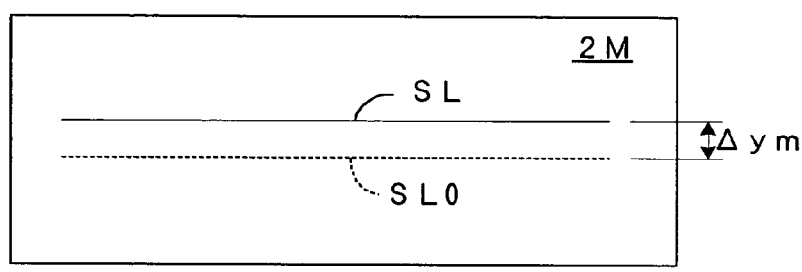
Figure 33C:
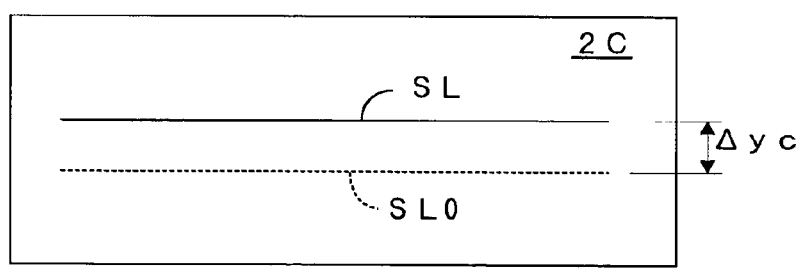
Figure 33D:
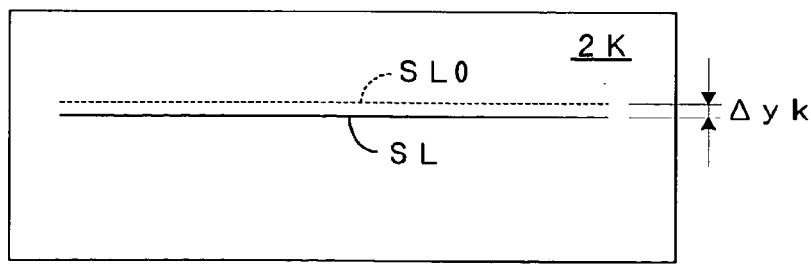
Figure 34A:
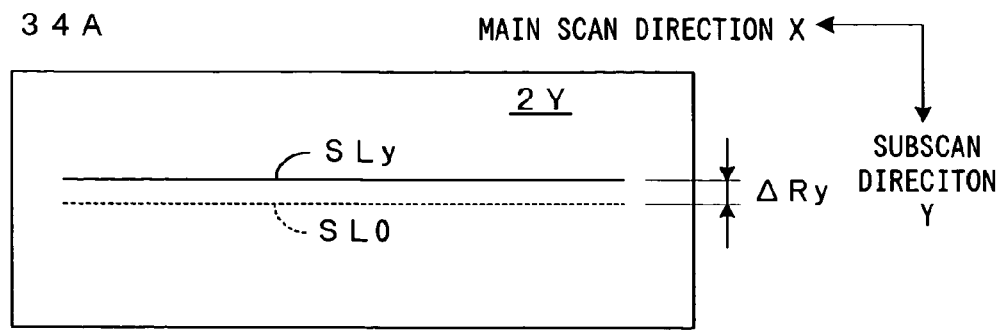
Figure 34B:
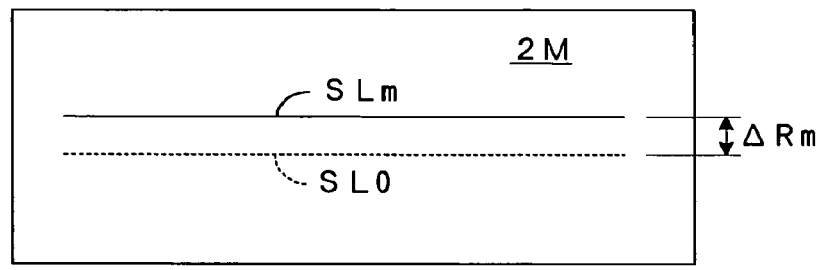
Figure 34C:
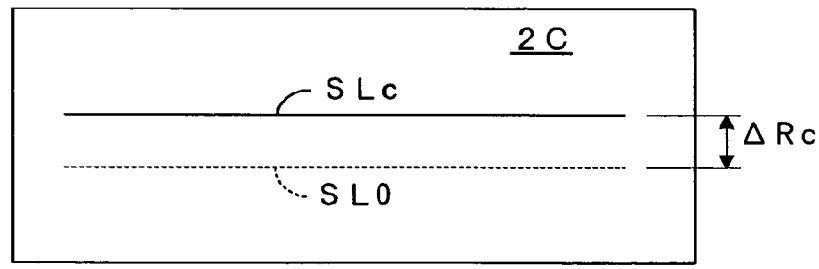
Figure 34D:
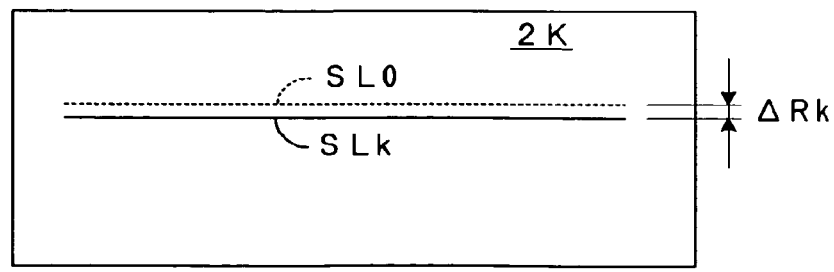

FIG. 30 is a schematic diagram showing one exemplary monochromatic-image forming operation performed by the image forming apparatus of FIG. 25. Now referring to the figure, description will be made as below on the monochromatic-image forming operation (monochromatic printing operation) of the image forming apparatus of FIG. 25. It is noted, however, that the operation for forming the monochromatic image is essentially the same as the color-image forming operation except that only the color component of black is used. Hence, the description will focus on a difference between these image forming operations.

When a monochromatic print command is supplied from the external apparatus such as a host computer, the image forming apparatus commits image data D included in the print command to storage in the image memory 113. The image data D includes a plurality of 1-line image data pieces of black. When 1-line image data pieces per page or given block included in the image data D are stored in the image memory 113, the main controller 11 sequentially reads out the 1-line image data pieces from the image memory 113 as timed to the writing of a latent image to each of the photosensitive members 2. Based on the 1-line image data pieces thus read, laser modulation data (PWM data) is generated for modulation of the pulse width of the light beam from the laser light source 62. The resultant data is outputted to the engine controller 10 via the unillustrated video IF. Receiving the PWM data pieces, the engine controller 10 sequentially forms linear latent images by scanning, in each timing, the light beam on the black photosensitive member 2K while rotating the photosensitive members 2Y, 2M, 2C, 2K at a constant speed V Specifically, the laser light source 62 first emits the light beam to the optical scanning device 65 at a timing t1 under ON/OFF control based on a 1-line image data piece of black. At the timing t1, the second axis driver 102c energizes the coil 655 thereby to set the deflector mirror plane 651 in position via the pivotal motion about the second axis AX2 as the switch axis, such that the light beam may be guided to the photosensitive member 2K. After the pivotal motion about the second axis AX2 is stopped, the deflector mirror plane 651 thus set in position is brought into reciprocal oscillations about the first axis AX1 as the main-scan deflection axis by means of the first axis driver 102b applying the predetermined voltage alternately to the first axis electrode 658a and 658b. The deflector mirror plane deflects the light beam to scan along the main scan direction X. Thus, the light beam Lk is scanned only on the photosensitive member 2K for forming a linear latent image Ik1 corresponding the 1-line image data piece of black, as illustrated by a column of "timing t1" in FIG. 30.

After completion of the formation of the linear latent image Ik1, the laser light source 62 emits the light beam to the optical scanning device 65 at the subsequent timing t2 under ON/OFF control based on the subsequent 1-line image data piece. At the timing t2, the deflector mirror plane 651 is not operated to pivot about the second axis AX2 and is set in the position for guiding the light beam to the photosensitive member 2K. In the position so set, the deflector mirror plane 651 is brought into reciprocal oscillations about the first axis AX1 by means of the first axis driver 102b applying the predetermined voltage alternately to the first axis electrode 658a and 658b, thereby defectively scanning the light beam along the main scan direction X. Thus, the light beam Lk is scanned on the photosensitive member 2K for forming a linear latent image Ik2 corresponding the subsequent 1-line image data piece, as illustrated by a column of "timing t2" in FIG. 30.

In a similar manner to the above, black linear latent images Ik3, Ik4, Ik5, . . . are formed on the photosensitive member 2K at the respective timings t3, t4, t5, . . . . In this manner, the latent images corresponding to the image data D are formed on the photosensitive member 2K. These latent images are developed by the developing unit 4K, so as to form a black toner image. The resultant toner image is primarily transferred onto the intermediate transfer belt 71. Thereafter, the toner image is secondarily transferred onto the sheet S and then fixed thereto.

Where the color image and the monochromatic image formed in the aforementioned manner are compared, the monochromatic image has the greater number of linear latent images per unit time, or higher definition. That is, the embodiment is adapted to vary the resolution depending upon the color image or the monochromatic image. As a matter of course, the rotational speed of the photosensitive member 2K may be increased in a case where priority is given to the print speed for the monochromatic image. When the monochromatic printing is carried out, control may be provided such as to stop the rotation of the photosensitive members 2Y, 2M, 2C for yellow, magenta and cyan.

FIG. 31 is a schematic diagram showing another example of the monochromatic-image forming operation performed by the image forming apparatus of FIG. 25. In the monochromatic-image forming operation, the rotational speed of the photosensitive member 2K is set at 4 times the normal rotational speed, as shown in the figure. That is, in correspondence to the photosensitive member 2K moved at a constant speed (4V), the black linear latent images Ik1, Ik2, Ik3, Ik4, Ik5, . . . are formed on the photosensitive member 2K at the respective timings t1, t2, t3, t4, t5, . . . .

FIG. 32 is a schematic diagram showing still another example of the monochromatic-image forming operation performed by the image forming apparatus of FIG. 25. In the monochromatic-image forming operation, as shown in the figure, the rotational speed of the photosensitive member 2K is set at twice the normal rotational speed whereas an interval for scanning the light beam Lk is set at twice the normal scan interval. That is, in correspondence to the photosensitive member 2K moved at a constant speed (2V), the black linear latent images Ik1, Ik2, Ik3, . . . are formed on the photosensitive member 2K at the respective timings t1, t3, t5, . . . . Therefore, the print speed is twice the speed of the high-definition printing (FIG. 29) and half the speed of the high-speed monochromatic printing (FIG. 31).

It is noted here that the relation between the rotational speed of the photosensitive member 2K and the scan timing is not limited to those of the high-speed monochromatic printing (FIG. 31) and the double-speed monochromatic printing (FIG. 32) but is arbitrary. However, the high-speed monochromatic printing (FIG. 31) and the double-speed monochromatic printing (FIG. 32) permit the print speed to be increased with the deflector mirror plane 651 driven in the pivotal motion about the first axis AX1 in the resonant mode. Therefore, the embodiment permits the print mode to be switched between the color printing and the monochromatic printing without changing the pivotal motion of the deflector mirror plane 651, thus ensuring a stable image formation. Furthermore, the embodiment provides for an exact control of the print speed with the deflector mirror plane 651 maintained in the pivotal motion in the resonant mode.

As described above, the embodiment offers not only the same working effects as those (C) to (H) mentioned above but also the following ones.

(S) In the image forming apparatus thus arranged, the PWM data is generated by sequentially reading out the 1-line image data pieces from the image memory 113 as timed to the writing of a latent image to each of the photosensitive members 2. The light beam from the laser light source 63 is modulated based on the PWM data and then, is deflected along the main scan direction X to form the scanned beam. Furthermore, in accordance with the order of reading out the 1-line image data pieces, the scanned beam from the deflector mirror plane 651 is selectively switched from one photosensitive member 2 to another for irradiation therewith. Thus, the linear latent image is formed on the photosensitive member 2 corresponding to the switching operation. Despite the provision of only one laser light source 62, the embodiment is able to form the linear latent images on the individual photosensitive members 2Y, 2M, 2C, 2K by scanning the light beams Ly, Lm, Lc, Lk on the surfaces thereof. Therefore, the embodiment further reduces the size and costs of the apparatus as compared with the conventional apparatus requiring four light sources. In addition, the embodiment simplifies the operation for optical adjustment.

(T) The optical scanning device 65 is capable of deflecting the light beam from the laser light source 62 along the subscan direction Y concurrently with the deflective scanning operation, the light deflection in the subscan direction Y accomplishing both the light switching operation and the fine adjustment of the scanned beam for its position SL on the photosensitive member 2 with respect to the subscan direction Y. This provides for the simple but highly precise adjustment of the light beam for the scan position thereof on the individual photosensitive members 2Y, 2M, 2C, 2k with respect to the subscan direction Y. As a result, the high-quality image can be formed because even if the scanned beam is deviated from the reference scan position SL0 with respect to the subscan direction Y due to the component tolerances or assembly errors, the deviation can be corrected.

Here, one example of the fine adjustment operation will be described with reference to FIGS. 33A to 33D. In a case where, for example, it is found in the final adjustment step following the product assembly that the scan positions SL of the scanned beam for the respective color components are deviated from the reference scan position SL0, indicated by a broken line in the figure, with respect to the subscan direction Y by the respective deviation amounts $\Delta yy$, $\Delta ym$, $\Delta yc$, $\Delta yk$, the adjustment may be made as follows. Specifically, deviation information on the individual color components may be previously acquired and stored in the RAM 107 functioning as the "storage means" of the invention. Then, the CPU 101 may retrieve the deviation amount from the RAM 107 so as to bring the deflector mirror plane 651 into the pivotal motion about the second axis AX2 based on the retrieved value. Thus, the scanned beam for every color component may be adjusted for its position on the photosensitive member 2 with respect to the subscan direction Y so that the scan position SL of the scanned beam is registered with the reference scan position SL0. In this manner, the scan position SL of the light beam L with respect to the subscan direction Y may be simply but highly precisely registered with the reference scan position SL0. As a result, it is ensured that the high-quality images are formed.

(U) The optical scanning device 65 is capable of deflecting the light beam from the laser light source 62 along the subscan direction Y concurrently with the deflective scanning operation, the light deflection in the subscan direction Y accomplishing both the light switching operation and the adjustment of the scanned beam for its position on the photosensitive member 2 with respect to the subscan direction Y. This provides for the simple but highly precise adjustment of the light beam for the scan position thereof on the individual photosensitive members 2Y, 2M, 2C, 2k with respect to the subscan direction Y. Therefore, the registration deviations may be reduced by adjusting the position of the scanned beam based on the correction information necessary for correcting the registration deviation, such as the registration control amount described in Patent Document 1.

Here, one example of the registration correction operation will be described with reference to FIGS. 34A-34D. The correction information necessary for the correction of the registration deviation, such as registration control amounts $\Delta Ry$, $\Delta Rm$, $\Delta Rc$, $\Delta Rk$ shown in the figures, are determined prior to the formation of a color image or at power on, for example. The information thus determined is stored in the storage means such as the RAM 107. When the color image is formed in response to a print command, the positions to form the latent images of the respective colors are adjusted with respect to the subscan direction Y based on the respective registration control amounts $\Delta Ry$, $\Delta Rm$, $\Delta Rc$, $\Delta Rk$. As to a black image, the laser light source 62 is operated based on image data indicative of a black toner image so as to form a latent image on the photosensitive member 2. In this process, the CPU 101 retrieves the registration control amount ΔRk for black from the RAM 107 so as to bring the deflector mirror plane 651 into the pivotal motion about the second axis AX2 based on the retrieved value. Thus, the position SLk of the scanned beam on the photosensitive member 2 is shifted from the reference scan position SL0 by ΔRk along the subscan direction Y. Hence, the black toner image is shifted by ΔRk along the subscan direction Y before transferred onto the intermediate transfer belt 71.

As to toner images of the other colors, the same procedure as the black toner image is taken to form the latent image, to form the toner image and to transfer the toner image. Then, these toner images are superimposed on top of each other on the intermediate transfer belt 71. Specifically, as to the cyan toner image, the position SLc of the scanned beam on the photosensitive member 2 is shifted from the reference scan position SL0 by ΔRc along the subscan direction Y. Thus, the cyan toner image is shifted by ΔRc along the subscan direction Y before transferred onto the intermediate transfer belt 71. As to the magenta toner image, the position SLm of the scanned beam on the photosensitive member 2 is shifted from the reference scan position SL0 by ΔRm along the subscan direction Y. Thus, the magenta toner image is shifted by ΔRm along the subscan direction Y before transferred onto the intermediate transfer belt 71. As to the yellow toner image, the position SLy of the scanned beam on the photosensitive member 2 is shifted from the reference scan position SL0 by ΔRy along the subscan direction Y. Thus, the yellow toner image is shifted by ΔRy along the subscan direction Y before transferred onto the intermediate transfer belt 71. Thus, the toner images of the respective colors are superimposed on top of each other on the intermediate transfer belt 71 as shifted from the reference scan position SL0 by the respective registration control amounts ΔRy, ΔRm, ΔRc, ΔRk along the subscan direction Y, so that the registration deviations are effectively reduced.

As mentioned supra, the registration deviations are corrected by adjusting the scan positions SLk, SLc, SLm, SLy of the scanned beam. Hence, the correction of the registration deviations does not dictate the need for varying the rotational speeds of the photosensitive members 2Y, 2M, 2C, 2k and the intermediate transfer belt 71. Accordingly, the photosensitive members 2Y, 2M, 2C, 2k and the intermediate transfer belt 71 are allowed to run in a stable manner. As a result, it is ensured that the high-quality images are formed.

(V) The above embodiment is adapted to perform both the color printing operation using the four color toners and the monochromatic printing operation using only the black toner. In the monochromatic printing operation, the black is defined as a "limited color" of the invention such that the latent image is formed with the image data limited to the limited color, from which image data the 1-line image data pieces are read out. That is, the 1-line image data pieces DLk are serially read out from a black image data item (data block including plural 1-line image data pieces DLk, as shown in FIG. 28). Then, the modulated light beam is formed based on each of the 1-line image data pieces DLk thus read. Settings are made such that scanned beam Lk obtained by deflecting the modulated light beam may be guided to the black photosensitive member 2K, and the linear latent images Ik1, Ik2, . . . are sequentially formed thereon. Therefore, only the 1-line image data pieces DLk of black may be serially read out from the image memory 113 in an efficient manner while the latent images corresponding to the 1-line image data pieces DLk thus read may be serially formed on the black photosensitive member 2K. By virtue of such efficient data retrieval and formation of the latent images based on the retrieved data, time required for making monochromatic prints can be reduced (FIGS. 31, 32).

Twelfth Embodiment

Figure 35:
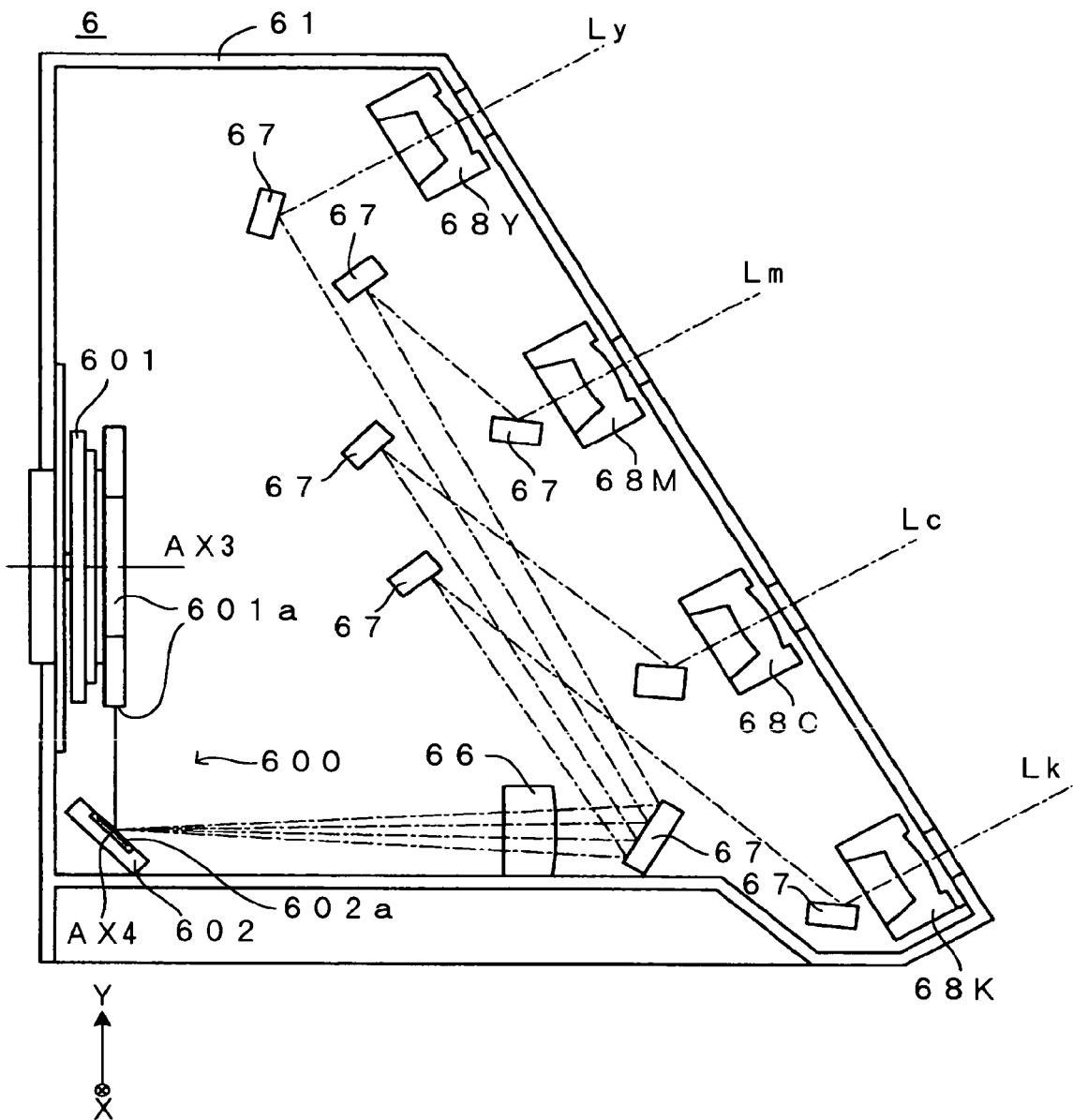
FIG. 35 is a diagram showing a twelfth embodiment of the image forming apparatus according to the invention.

FIG. 35 is a diagram showing a twelfth embodiment of the image forming apparatus according to the invention. The twelfth embodiment principally differs from the eleventh embodiment in that this embodiment employs an optical scanning system 600 comprising a combination of a polygon mirror 601 and a switching pivotal mirror 602 is used as an "optical scan means" of the invention. Otherwise, the twelfth embodiment is basically arranged the same way as the eleventh embodiment. According to the twelfth embodiment, the polygon mirror 601 is fixed to place in the exposure unit casing 61. The polygon mirror 601 is rotated about a rotary axis AX3 (main-scan deflection axis) perpendicular to the main scan direction X, thereby allowing a deflector mirror plane 601a thereof to deflect the light beam from the laser light source 62 for scanning along the main scan direction X. Then, the scanned beam from the deflector mirror plane 601a becomes incident on a switching reflector plane 602a of the pivotal mirror 602.

The pivotal mirror 602 is pivotally movable about a pivotal axis AX4 (switch axis) extended in parallel with the main scan direction X and is driven into pivotal motion by a pivotal positioning mechanism not shown. Thus, the scanned beam is deflected by the pivotal mirror 602 so as to be guided to any one of the four photosensitive members 2Y, 2M, 2C, 2K. That is, the embodiment is adapted to selectively switch the scanned beam to any one of the photosensitive members for irradiation therewith.

When a color print command is supplied from the external apparatus such as a host computer, the image forming apparatus commits image data D included in the print command to storage in the image memory 113 just as in the eleventh embodiment. At completion of the color separation of the image data D per page or given block, the main controller 11 sequentially reads out 1-line image data pieces from the image memory 113 as timed to the writing of the latent image to each of the photosensitive members 2, so as to generate PWM data. The light beam from the laser light source 62 is modulated based on the PWM data while the light beam from the laser light source 62 is deflected along the main scan direction X by means of the polygon mirror 601 so as to form the scanned beam. Furthermore, the switching reflector plane 602a selectively switches the guided scan beam from one photosensitive member 2 to another in accordance with the order of reading out the 1-line image data pieces. Hence, the linear latent image is formed on the photosensitive member 2 corresponding to the switching operation. Incidentally, the monochromatic printing operation is also performed the same way as in the eleventh embodiment.

Despite the provision of only one laser light source 62, the embodiment is able to form the linear latent images on the individual photosensitive members 2Y, 2M, 2C, 2K by scanning the light beams Ly, Lm, Lc, Lk on the surfaces of the four photosensitive members 2Y, 2M, 2C, 2K. Therefore, the embodiment further reduces the size and costs of the apparatus as compared with the conventional apparatus requiring four light sources. In addition, the embodiment simplifies the operation for optical adjustment (Effect S).

In the twelfth embodiment, the former one of the polygon mirror 601 and the pivotal mirror 602, which constitute the optical scan means, is disposed at the site of the laser light source 62. Alternatively, the latter mirror may be disposed at the site of the laser light source 62.

Thirteenth Embodiment

Figure 36:
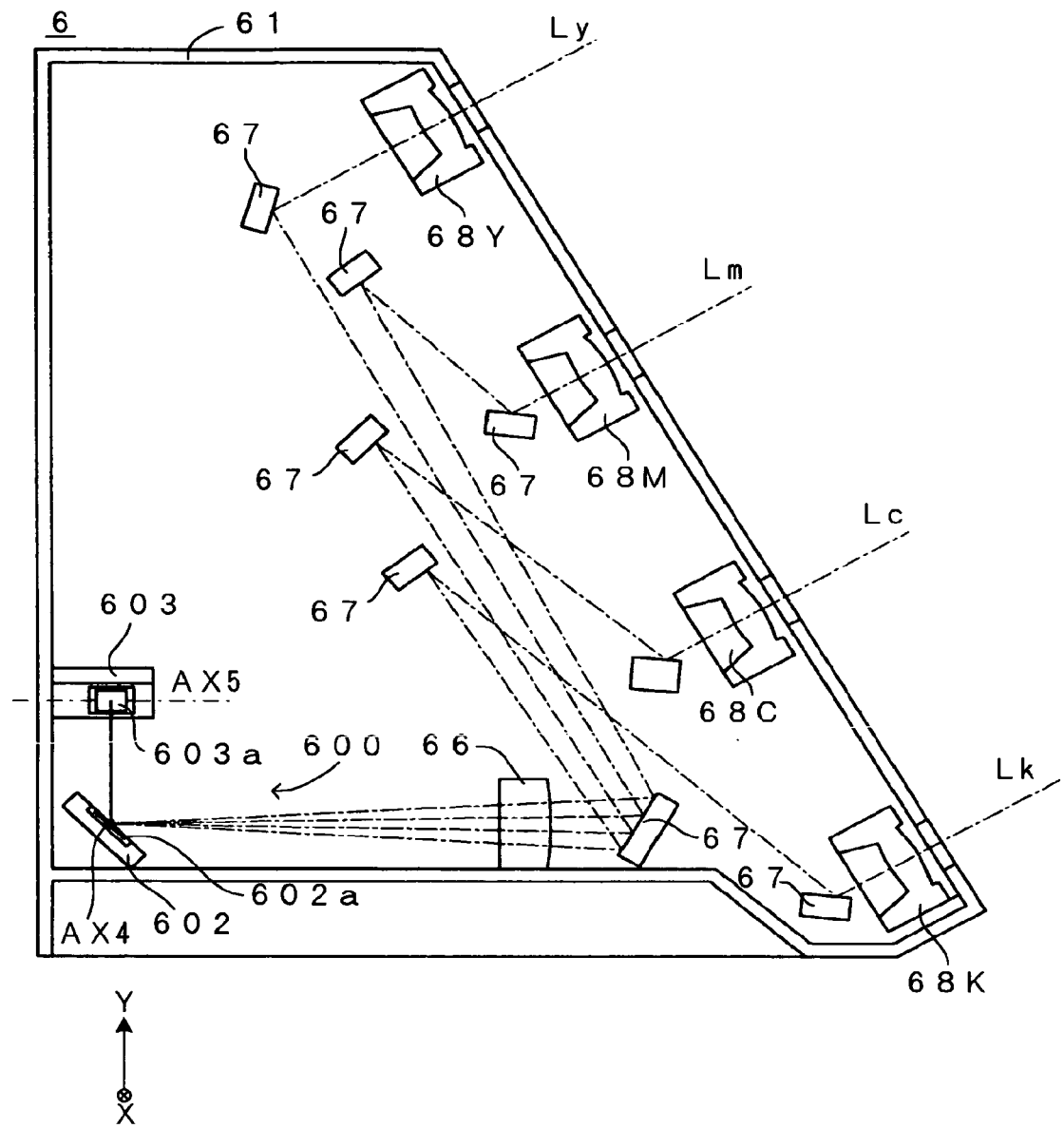
FIG. 36 is a diagram showing a thirteenth embodiment of the image forming apparatus according to the invention.

FIG. 36 is a diagram showing a thirteenth embodiment of the image forming apparatus according to the invention. The thirteenth embodiment principally differs from the eleventh embodiment in that the optical scanning system 600 comprising the combination of two pivotal mirrors 602, 603 is used as the "optical scan means" of the invention. Otherwise, the embodiment is basically arranged the same way as the eleventh embodiment. According to the thirteenth embodiment, the pivotal mirror 603 functions as a "main-scanning pivotal mirror" of the invention. Specifically, the pivotal mirror 603 is pivotally movable about a pivotal axis AX5 (main-scan deflection axis) perpendicular to the main scan direction X. The pivotal mirror 603 is driven into reciprocal pivotal motions by the pivotal positioning mechanism (not shown) so that a deflector mirror plane 603a thereof may deflect the light beam from the laser light source 62 for scanning along the main scan direction X. Then, the scanned beam from the deflector mirror plane 603a becomes incident on the switching reflector plane 602a of the pivotal mirror 602.

The pivotal mirror 602 has the same arrangement as that of the twelfth embodiment, and functions as a "switching pivotal mirror" of the invention. Specifically, the scanned beam is deflected by the pivotal mirror 602 so as to be guided to any one of the four photosensitive members 2Y, 2M, 2C, 2K. The embodiment is adapted to selectively switch the scanned beam to any one of the photosensitive members for irradiation therewith.

When a color print command is supplied from the external apparatus such as a host computer, the image forming apparatus commits image data D included in the print command to storage in the image memory 113 just as in the eleventh embodiment. At completion of the color separation of the image data D per page or given block, the main controller 11 sequentially reads out 1-line image data pieces from the image memory 113 as timed to the writing of the latent image to each of the photosensitive members 2, so as to generate PWM data. The light beam from the laser light source 62 is modulated based on the PWM data while the light beam from the laser light source 62 is deflected along the main scan direction X by means of the main-scanning pivotal mirror 603, so as to from the scanned beam. Furthermore, the switching pivotal mirror 602 selectively switches the guided beam from one photosensitive member 2 to another in accordance with the order of reading out the 1-line image data pieces. Hence, the linear latent image is formed on the photosensitive member 2 corresponding to the switching operation. Incidentally, the monochromatic printing operation is also performed the same way as in the eleventh embodiment.

Despite the provision of only one laser light source 62, the embodiment is able to form the linear latent images on the individual photosensitive members 2Y, 2M, 2C, 2K by scanning the light beams Ly, Lm, Lc, Lk on the surfaces thereof. Therefore, the embodiment further reduces the size and costs of the apparatus as compared with the conventional apparatus requiring four light sources. In addition, the embodiment simplifies the operation for optical adjustment (Effect S).

In the thirteenth embodiment, the former one of the pivotal mirror 603 for deflecting the light beam along the main scan direction X and the pivotal mirror 602 for deflecting the light beam along the subscan direction Y, the pivotal mirrors constituting the optical scan means, is disposed at the site of the laser light source 62. Alternatively, the latter mirror may be disposed at the site of the laser light source 62.

Fourteenth Embodiment

Figure 37:
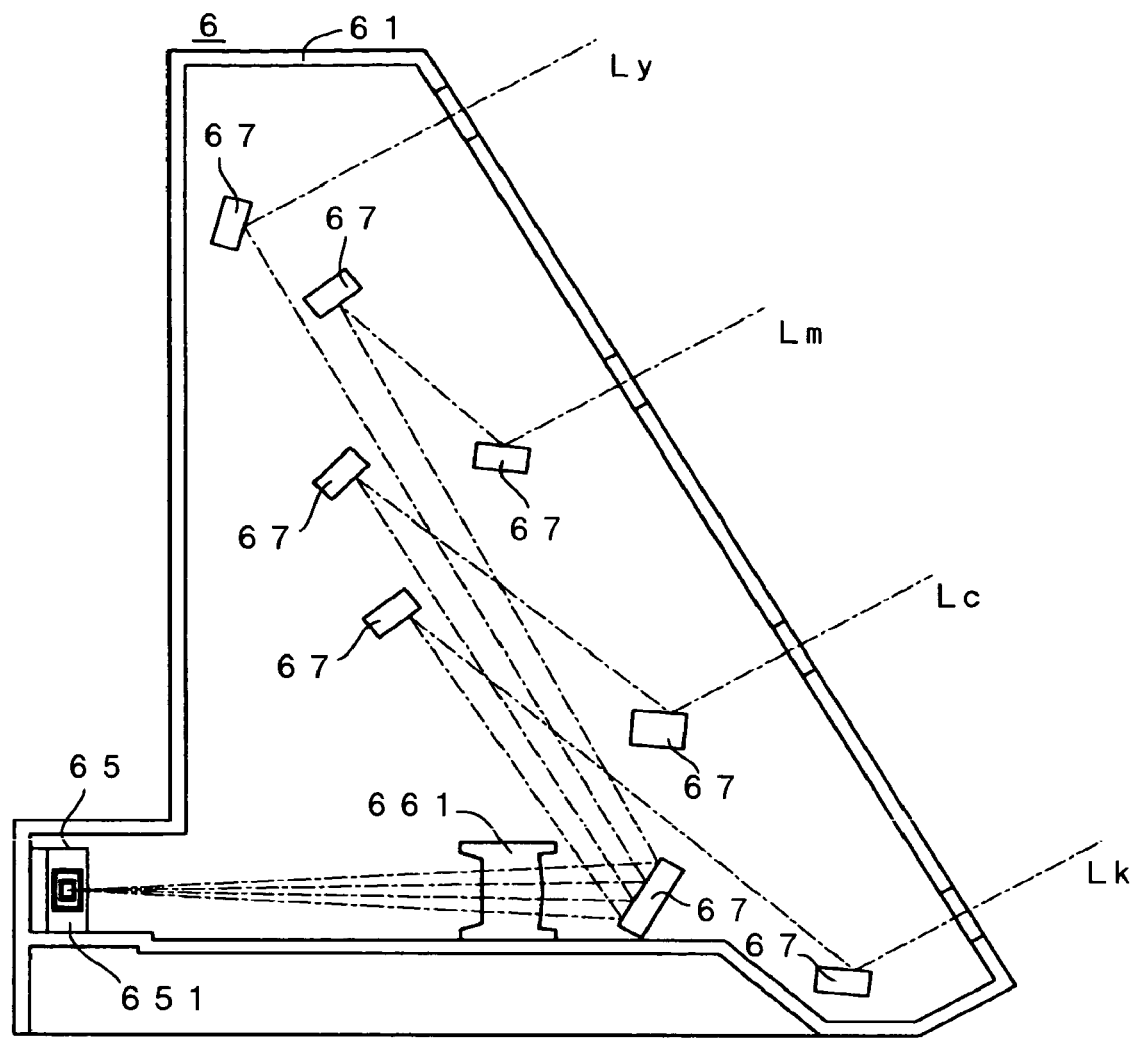
FIG. 37 is a diagram showing a fourteenth embodiment of the image forming apparatus according to the invention.

FIG. 37 is a diagram showing a fourteenth embodiment of the image forming apparatus according to the invention. An optical arrangement of an exposure unit of the fourteenth embodiment is shown in expansion by the same sectional view taken along the subscan direction as that of the fourth embodiment (FIG. 14). A major difference from the eleventh embodiment consists in that the fourteenth embodiment has an arrangement wherein the light beam scanned by the deflector mirror plane 651 along the main scan direction X is focused on the photosensitive member 2. According to the eleventh embodiment, the first scanning lens 66 and the second scanning lenses 68Y, 68M, 68C, 68K constitute the optical focusing system (second optical system) wherein the scanned beam Ly is focused on the photosensitive member 2Y by means of the scanning lenses 66, 68Y; the scanned beam Lm is focused on the photosensitive member 2M by means of the scanning lenses 66, 68M; the scanned beam Lc is focused on the photosensitive member 2C by means of the scanning lenses 66, 68C; and the scanned beam Lk is focused on the photosensitive member 2K by means of the scanning lenses 66, 68K. In contrast, the fourteenth embodiment employs the aforementioned aspherical single lens 661 for focusing the scanned beams Ly, Lm, Lc, Lk on the respective photosensitive members 2Y, 2M, 2C, 2K, as shown in FIG. 37.

By employing the aspherical single lens 661, the embodiment can offer the same working effects as the fourth embodiment. That is, the exposure unit 6 may be reduced in size and cost, which leads to the downsizing and cost reduction of the image forming apparatus (Effect M).

The fourteenth embodiment also features an optical system for correcting the so-called tilted deflection plane. As shown in FIG. 14, the light beam from the laser light source 62 is shaped into the collimated beam by means of the collimator lens 63 and then, becomes incident on the cylindrical lens 64 powered only in the subscan direction. The collimated beam is converged only in the subscan direction so as to be linearly focused at place near the deflector mirror plane 651 of the optical scanning device 65. The scanned beam from the deflector mirror plane 651 is focused on the surface of each of the photosensitive members 2 by means of the aspherical single lens 661. This establishes the optically conjugated relation between the surface of each photosensitive member 2 and the deflector mirror plane 651 such that if some degree of inclination of the first axis (main-scan deflection axis) occurs, such an inclination may be optically corrected. Since the light beam upon the deflector mirror plane 651 assumes a linear shape, the deflector mirror plane 651 may be reduced in size. This is advantageous in terms of high-speed scanning (Effect O).

In the image forming apparatus employing the aspherical single lens 661, as well, the color printing operation and the monochromatic printing operation are also performed the same way as in the foregoing embodiments. Hence, the same working effects as those of the eleventh embodiment may be offered. In this respect, the same holds for fifteenth to eighteenth embodiments to be described hereinlater.

Fifteenth Embodiment

The above fourteenth embodiment is arranged such that the optically conjugated relation is established between the surface of each photosensitive member 2 and the deflector mirror plane 651, whereas a fifteenth embodiment, likewise to the fifth embodiment, has the so-called non-conjugated optical system wherein the deflector mirror plane 651 is shifted from the conjugate point CP with respect to the surface of the photosensitive member (see FIG. 15). Therefore, the fifteenth embodiment involves a fear of the error associated with the tilted deflection plane.

However, the deflector mirror plane 651 is adapted to deflect the light beam not only along the main scan direction X but also along the subscan direction Y. Hence, the fifteenth embodiment corrects the tilted deflection plane in a manner that the second axis driver 102c (FIG. 9) energizes the coil 655 for pivotally moving the deflector mirror plane 651 about the second axis AX2 for positioning.

Sixteenth Embodiment

Figure 16:
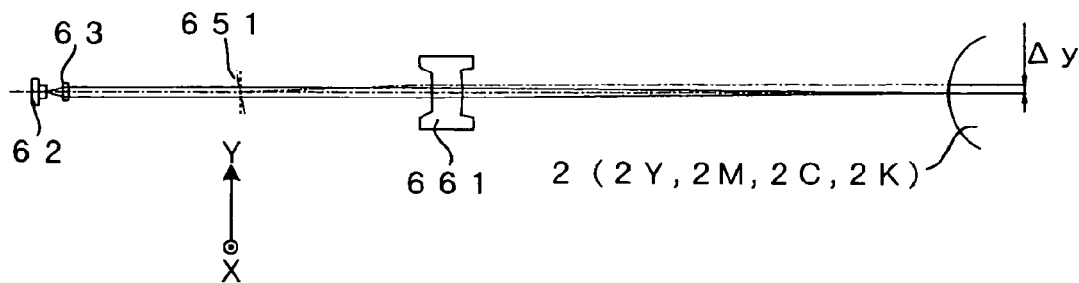
FIG. 16 is a diagram showing a sixth embodiment of the image forming apparatus according to the invention.

Similarly to the sixth embodiment, a sixteenth embodiment is arranged such that the light beam from the laser light source 62 is shaped into the collimated beam by means of the collimator lens 63 and then, becomes incident directly on the deflector mirror plane 651 of the optical scanning device 65 (see FIG. 16). The scanned beam is deflected by the deflector mirror plane 651 so as to be focused on the surface of each of the photosensitive members 2 by means of the aspherical single lens 661. Similarly to the above fifteenth embodiment, the sixteenth embodiment features the non-conjugated optical system. Therefore, the sixteenth embodiment involves a fear of the error associated with the tilted deflection plane.

However, the deflector mirror plane 651 is adapted to deflect the light beam not only along the main scan direction X but also along the subscan direction Y. The sixteenth embodiment, likewise to the above fifteenth embodiment, corrects the tilted deflection plane in the manner that the second axis driver 102c (FIG. 9) energizes the coil 655 for pivotally moving the deflector mirror plane 651 about the second axis AX2 for positioning.

Seventeenth Embodiment

Figure 38:
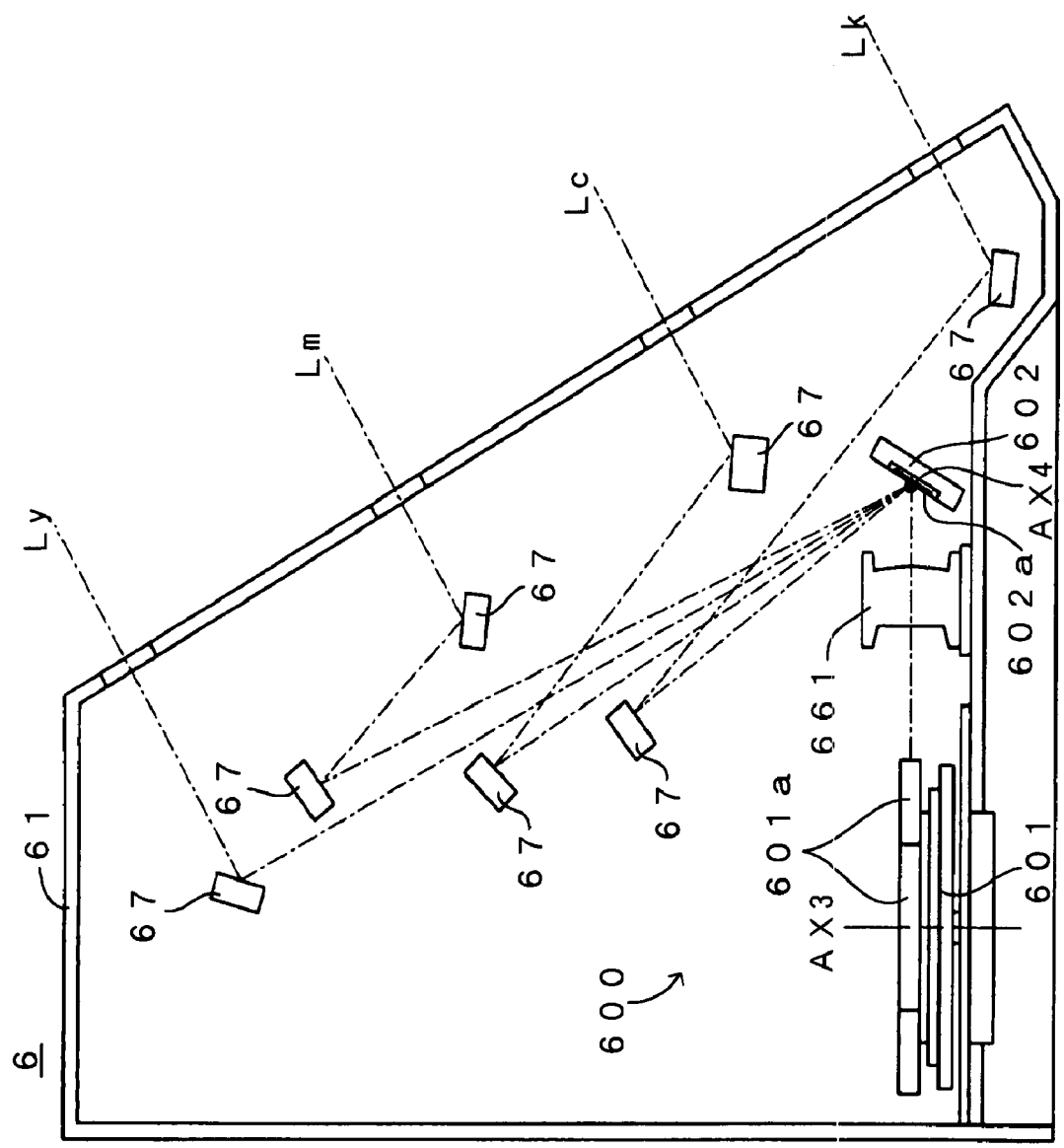
FIG. 38 is a diagram showing a seventeenth embodiment of the image forming apparatus according to the invention.

FIG. 38 is a diagram showing a seventeenth embodiment of the image forming apparatus according to the invention. The seventeenth embodiment employs the optical scanning system 600 comprising the combination of the polygon mirror 601 and the pivotal mirror 602 as the "optical scan means" of the invention. The embodiment further uses the aspherical single lens 661 for focusing the scanned beams Ly, Lm, Lc, Lk on the respective photosensitive members 2Y, 2M, 2C, 2K. Otherwise, the embodiment is arranged basically the same way as the eleventh embodiment.

In the seventeenth embodiment, the polygon mirror 601 is fixed to place in the exposure unit casing 61. The polygon mirror 601 is rotated about the rotary axis AX3 (main-scan deflection axis) perpendicular to the main scan direction X, thereby allowing a deflector mirror plane 601a thereof to deflect the light beam from the laser light source 62 for scanning along the main scan direction X. Then, the scanned beam from the deflector mirror plane 601a becomes incident on the switching reflector plane 602a of the pivotal mirror 602 via the aspherical single lens 661 equivalent to a "third optical system" of the invention.

The pivotal mirror 602 is pivotally movable about the pivotal axis AX4 (switch axis) extended in parallel with the main scan direction S and is driven into pivotal motion by the pivotal positioning mechanism not shown. Thus, the scanned beam is deflected by the pivotal mirror 602 so as to be guided to any one of the four photosensitive members 2Y, 2M, 2C, 2K and then focused on the surface thereof. Then, the color printing operation or the monochromatic printing operation is performed in the same manner as in the eleventh embodiment.

In the seventeenth embodiment, the former one of the polygon mirror 601 and the pivotal mirror 602, which constitute the optical scan means, is disposed at the site of the laser light source 62. Alternatively, the latter mirror may be disposed at the site of the laser light source 62. In addition, the location of the aspherical single lens 661 is not limited to the position illustrated by the embodiment but may be disposed on a light emission side of the deflector mirror plane 602.

Eighteenth Embodiment

Figure 39:
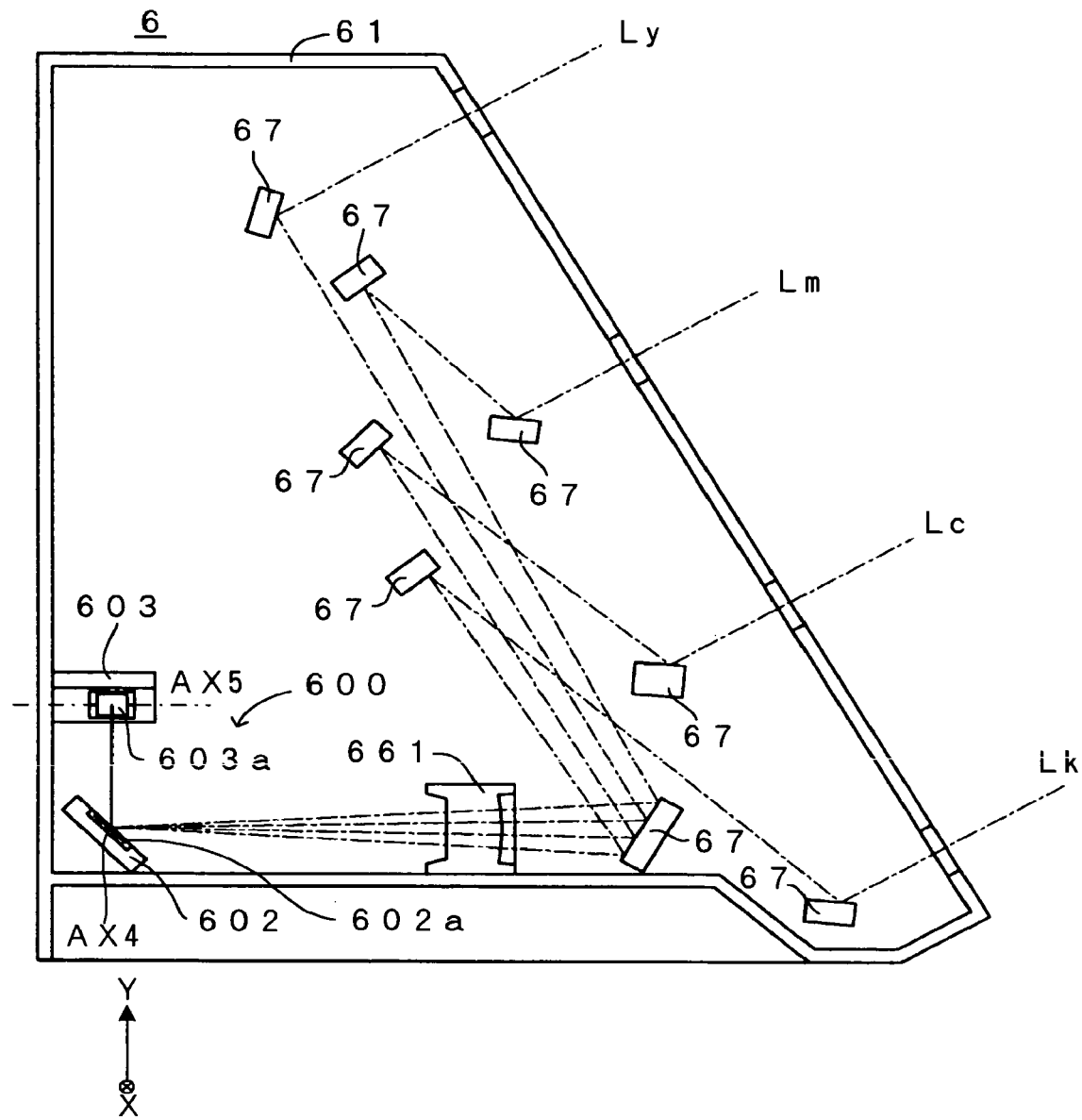
FIG. 39 is a diagram showing an eighteenth embodiment of the image forming apparatus according to the invention.

FIG. 39 is a diagram showing an eighteenth embodiment of the image forming apparatus according to the invention. The eighteenth embodiment employs the optical scanning system 600 comprising the combination of the two pivotal mirrors 603, 602, as the "optical scan means" of the invention. The embodiment further uses the aspherical single lens 661 for focusing the scanned beams Ly, Lm, Lc, Lk on the respective photosensitive members 2Y, 2M, 2C, 2K. Otherwise, the embodiment is arranged basically the same way as the eleventh embodiment.

In the eighteenth embodiment, the pivotal mirror 603 is pivotally movable about the pivotal axis AX5 (main-scan deflection axis) perpendicular to the main scan direction X. The pivotal mirror 603 is driven into reciprocal pivotal motions by the pivotal positioning mechanism (not shown) so that the deflector mirror plane 603a thereof may deflect the light beam from the laser light source 62 for scanning along the main scan direction X.

After deflected by the pivotal mirror 602 along the subscan direction Y, the scanned beam is guided to any one of the four photosensitive members 2Y, 2M, 2C, 2K and focused on the surface thereof by means of the aspherical single lens 661 equivalent to the "third optical system" of the invention. Then, the color printing operation or the monochromatic printing operation is performed in the same manner as in the eleventh embodiment.

According to the eighteenth embodiment, the former one of the main-scanning pivotal mirror 603 for deflecting the light beam along the main scan direction X and the switching pivotal mirror 602 for deflecting the light beam along the subscan direction Y is disposed at the site of the laser light source 62, the pivotal mirrors constituting the optical scan means. Alternatively, the latter mirror may be disposed at the site of the laser light source 62. In addition, the location of the aspherical single lens 661 is not limited to the position illustrated by the embodiment but may be disposed between the pivotal mirrors 603, 602, for example.

IV. Multi-Beam Tandem Apparatus

Nineteenth Embodiment

Figure 40:
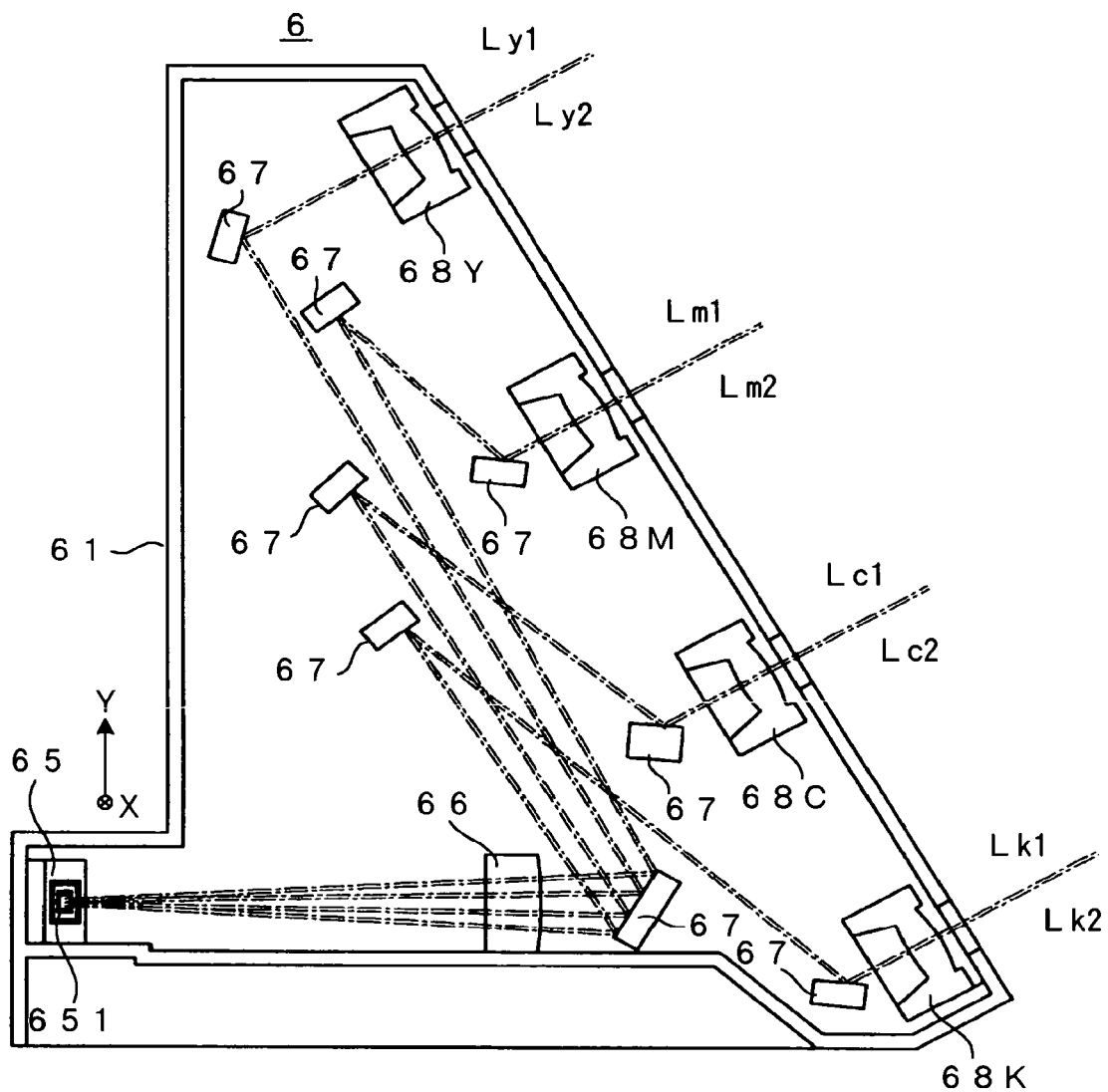
FIG. 40 is a diagram showing a nineteenth embodiment of the image forming apparatus according to the invention.
Figure 41:
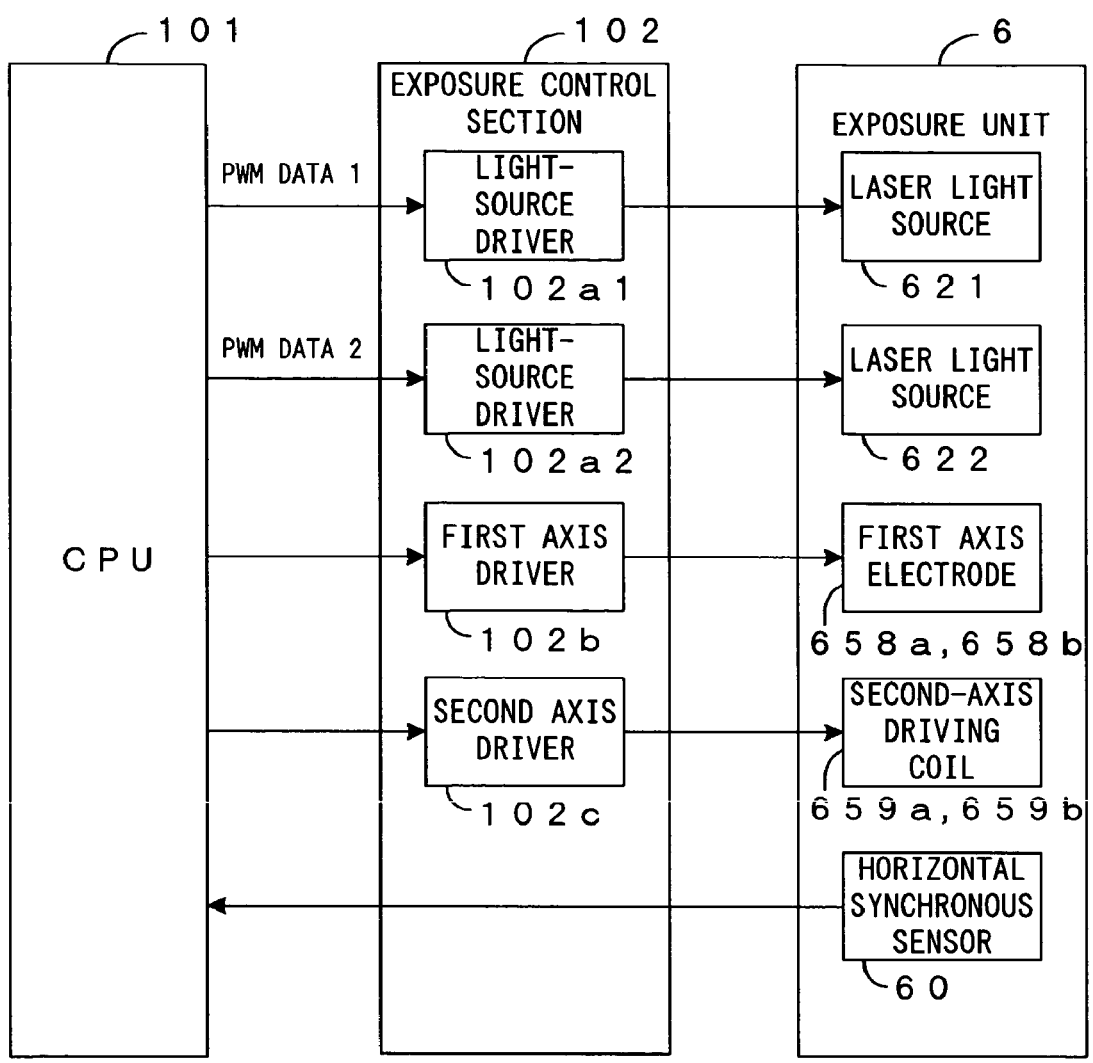
FIG. 41 is a block diagram showing an electrical arrangement of the nineteenth embodiment of the image forming apparatus according to the invention.

FIG. 40 is a diagram showing a nineteenth embodiment of the image forming apparatus according to the invention. FIG. 41 is a block diagram showing an electrical arrangement of the nineteenth embodiment of the image forming apparatus according to the invention. A major difference from the eleventh embodiment (single-beam image forming apparatus) consists in that the nineteenth embodiment has the light source section which includes the two laser light sources 621, 622 and emits two light beams toward the deflector mirror plane 651 of the optical scanning device 65. According to the embodiment, the exposure control section 102 is provided with two light-source drivers 102a1, 102a2 as shown in FIG. 41. Based on PWM data 1 to be described hereinlater, the light-source driver 102a1 provides ON/OFF control of the laser light source 621 whereby a light beam modulated according to the image data is emitted from the laser light source 621. On the other hand, based on PWM data 2 to be described hereinlater, the light-source driver 102a2 provides ON/OFF control of the laser light source 622 whereby a light beam modulated according to the image data is emitted from the laser light source 622. In this manner, the two light beams corresponding to the image data are emitted from the light source section. Otherwise, the embodiment is arranged the same way as the eleventh embodiment and hence, the same reference numerals are used and the description thereof is dispensed with.

Figure 42:
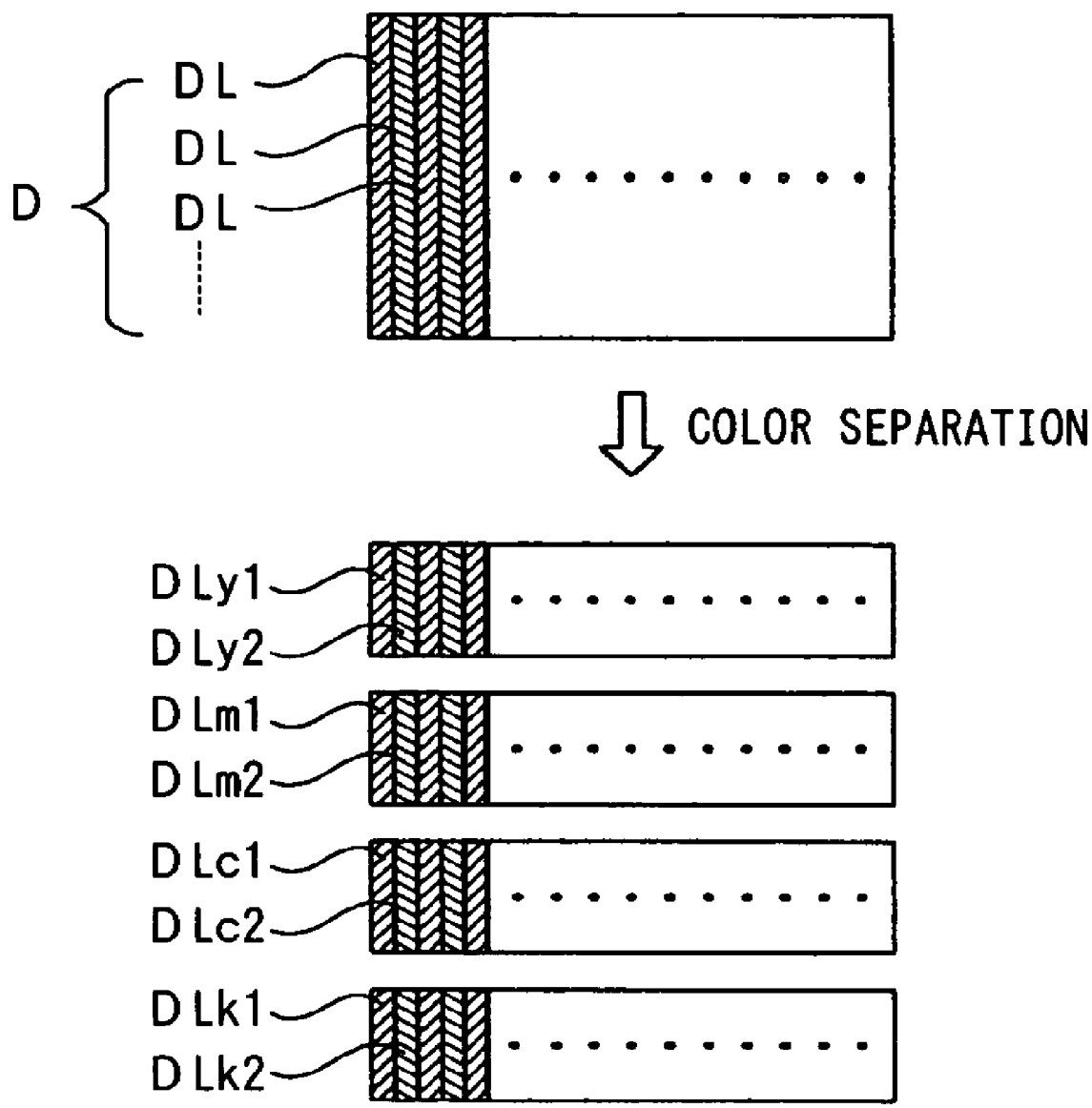
FIG. 42 is a diagram schematically showing an image processing performed by the image forming apparatus of FIG. 40.
Figure 43:
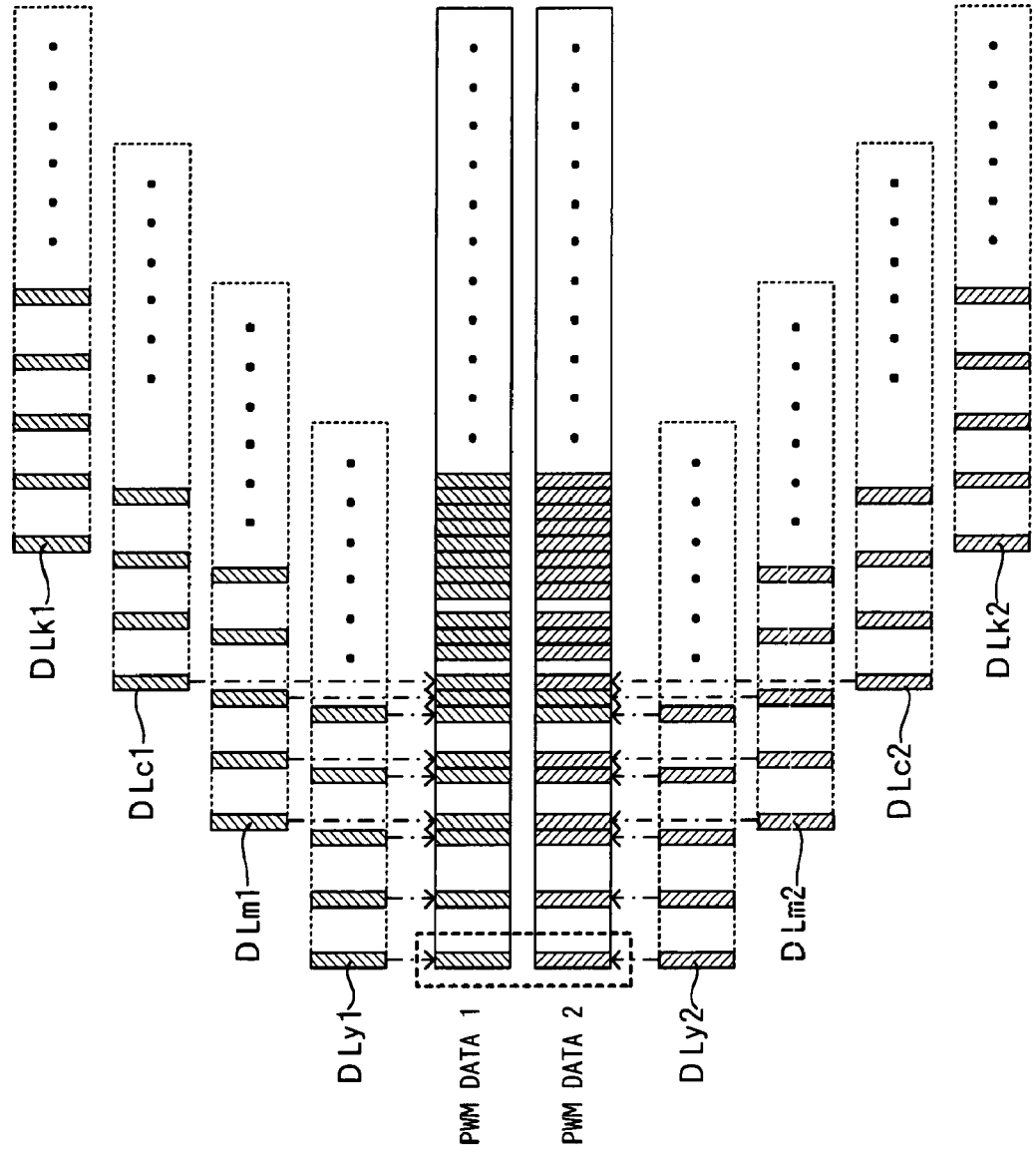
FIG. 43 is a diagram schematically showing an image processing performed by the image forming apparatus of FIG. 40.
Figure 44:
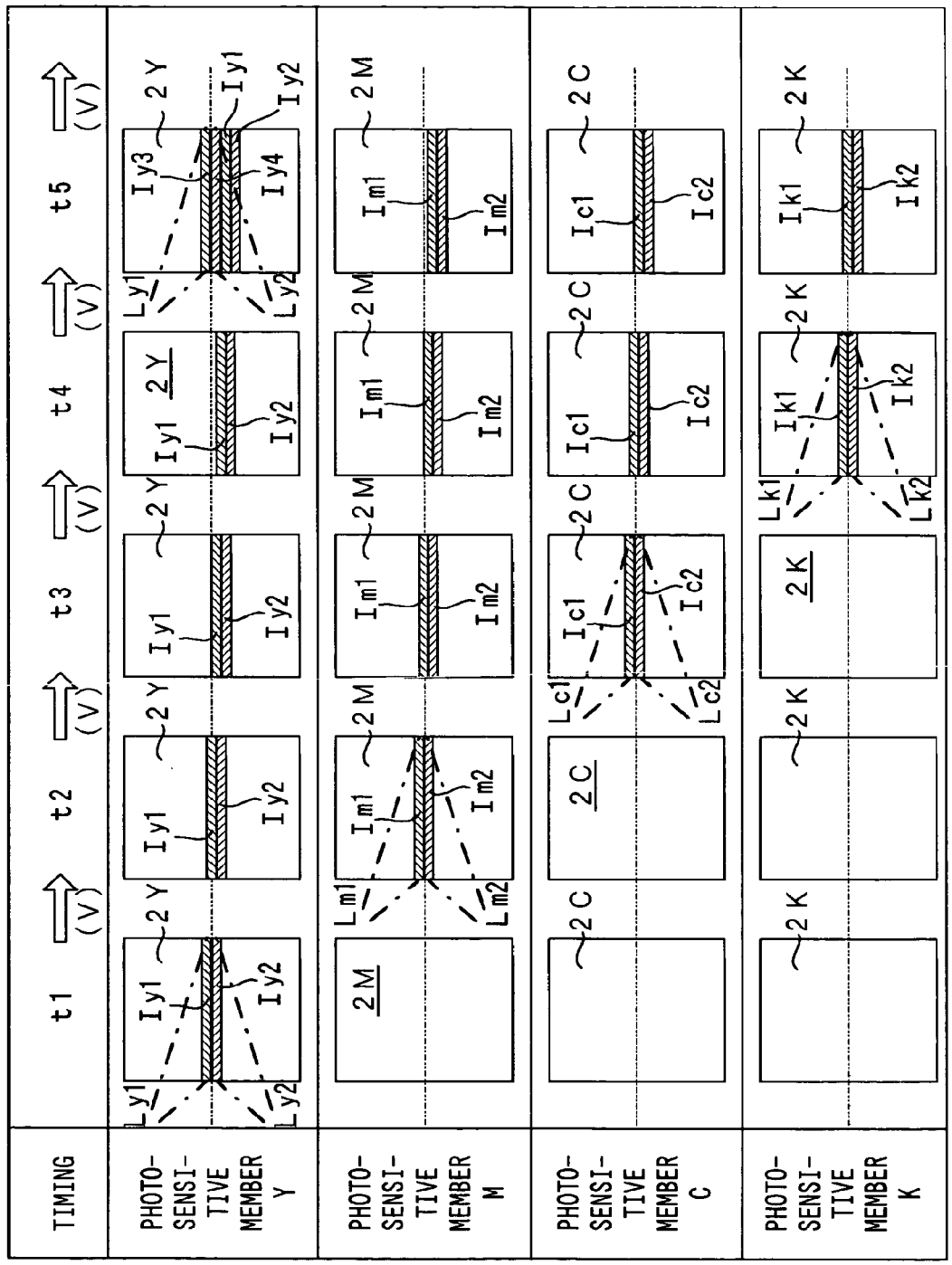
FIG. 44 is a schematic diagram showing a color-image forming operation performed by the image forming apparatus of FIG. 40.

FIGS. 42 and 43 are diagrams schematically showing an image processing performed by the image forming apparatus of FIG. 40. FIG. 44 is a schematic diagram showing a color-image forming operation performed by the image forming apparatus of FIG. 40. The color-image forming operation (color printing operation) of the image forming apparatus of FIG. 40 will hereinbelow be described with reference to these figures. When a color print command is supplied from the external apparatus such as a host computer, the image forming apparatus commits image data D included in the print command to storage in the image memory 113. As shown in FIG. 42, the image data D includes a plurality of 1-line color-image data pieces DL. The main controller 11 performs color separation for obtaining 1-line color data sets of the respective color components. Specifically, there are obtained a plurality of 1-line image data pieces DLy1, DLy2, . . . for yellow; a plurality of 1-line image data pieces DLm1, DLm2, . . . for magenta; a plurality of 1-line image data pieces DLc1, DLc2, . . . for cyan; and a plurality of 1-line image data pieces DLk1, DLk2, . . . for black. The resultant image data pieces are stored in the image memory 113. In this embodiment, the image memory 113 functions as the "storage means" of the invention.

Accordingly, when the light beams are scanned on the photosensitive member 2 corresponding to the 1-line image data of the color component of interest with the laser light sources 621, 622 ON/OFF-controlled based on the 1-line image data pieces, there are formed linear latent images representing the 1-line image data pieces of the color component of interest. It is noted that the "1-line image data set" means herein M pieces of 1-line image data (M=2 in this embodiment) supplied at a time or as associated with each other.

At completion of the color separation of the image data D per page or given block, the main controller 11 sequentially reads out 1-line image data sets from the image memory 113 as timed to the writing of the latent images to each of the photosensitive members 2 (see dot-dash lines with arrows in FIG. 43). In this embodiment, the image data pieces are serially read out by sets of M data pieces in the order of Y-Y-Y-M-Y-M-Y-M-C- . . . , since the photosensitive members 2Y, 2M, 2c, 2K are arranged at given space intervals. The light source section is controlled based on the serial data including the 1-line image data sets thus read (data unit enclosed by a bold broken line in FIG. 43). More specifically, the laser modulation data (PWM data 1) for modulation of the pulse width of the light beam from the laser light source 621 is generated based on the serial data including the 1-line image data pieces DLy1, DLm1, DLc1, DLk1. The resultant data is outputted to the engine controller 10 via the unillustrated video IF. On the other hand, the PWM data 2 for the laser light source 622 is generated the same way. That is, the laser modulation data (PWM data 2) for modulation of the pulse width of the light beam from the laser light source 622 is generated based on the serial data including the 1-line image data pieces DLy2, DLm2, DLc2, DLk2. The resultant data is outputted to the engine controller 10 via the unillustrated video IF. Where a set of 1-line image data pieces are serially read out from the image memory 113 in the order of Y-M-C-K-Y . . . , for example, the PWM data 1 and 2 corresponding to the respective sets o 1-line image data pieces are supplied to the engine controller 10 simultaneously.

According to the embodiment, the main controller 11 generates the PWM data 1, 2 based on the sets of 1-line image data pieces serially read out from the image memory 113 as timed to the writing of the latent images, the PWM data 1, 2 used for operatively controlling the respective laser light sources 621, 622. Then the main controller supplies the resultant PWM data in parallel to the engine controller 10. Alternatively, the engine controller 10 may be serially supplied with the sets of 1-line image data pieces so as to generate the PWM data 1, 2.

Receiving the PWM data 1, 2, the engine controller 10 forms the linear latent images by scanning, in each timing, the two light beams exclusively on the photosensitive member 2 corresponding to the PWM data 1, 2 as rotating the photosensitive members 2Y, 2M, 2C, 2K at a constant speed V. In a case where the above PWM data 1, 2 are supplied, the two light beams are emitted to the optical scanning device 65 at timing t1 from the light source section with the laser light sources 621, 622 individually ON/OFF controlled based on a set of 1-line image data pieces of yellow. At the timing t1, the second axis driver 102c energizes the coil 655 for pivotally moving the deflector mirror plane 651 about the second axis AX2 as the switch axis thereby positioning the deflector mirror plane to guide the two light beams to the photosensitive member 2Y. After the pivotal motion about the second axis AX2 is stopped, the deflector mirror plane 651 thus set in position is brought into reciprocal oscillations about the first axis AX1 as the main-scan deflection axis by means of the first axis driver 102b applying the predetermined voltage alternately to the first axis electrode 658a and 658b. The deflector mirror plane deflects the light beams to scan along the main scan direction X. Thus, the scanned beams Ly1, Ly2 are scanned only on the photosensitive member 2Y so that, as illustrated by a column of "timing t1" in FIG. 44, two linear latent images Iy1, Iy2 are simultaneously formed in correspondence to the 1-line image data set of yellow (DLy1, DLy2).

After completion of the formation of the linear latent images Iy1, Iy2, the light beams are emitted to the optical scanning device 65 at the subsequent timing t2 from the light source section with the laser light sources 621, 622 individually ON/OFF controlled based on the set of 1-line image data pieces of magenta (DLm1, DLm2). At the timing t2, the second axis driver 102c energizes the coil 655 for pivotally moving the deflector mirror plane 651 about the second axis AX2 thereby positioning the deflector mirror plane to guide the two light beams to the photosensitive member 2M. In the position thus set, the deflector mirror plane 651 is brought into reciprocal oscillations about the first axis AX1 by means of the first axis driver 102b applying the predetermined voltage alternately to the first axis electrode 658a and 658b. The deflector mirror plane 651 deflects the light beams to scan along the main scan direction X. Thus, the scanned beams Lm1, Lm2 are scanned exclusively on the photosensitive member 2M so that, as illustrated by a column of "timing t2"

in FIG. 44, two linear latent images Im1, Im2 are simultaneously formed in correspondence to the 1-line image data set of yellow (DLm1, DLm2).

In a similar manner to the above, cyan linear latent images Ic1, Ic2, black linear latent images Ik1, Ik2, yellow linear latent images Iy3, Iy4, . . . are formed on the respective photosensitive members 2 for the respective color components at the respective timings t3, t4, t5, . . . . In this manner, the latent images corresponding to the image data D are formed on the respective photosensitive members 2Y, 2M, 2C, 2K. These latent images are developed into toner images of the four colors by the respective developing units 4Y, 4M, 4C, 4K. By controlling the primary transfer timings, these toner images are superimposed on top of each other on the intermediate transfer belt 71, thereby forming a color image. Subsequently, the resultant color image is secondarily transferred onto the sheet S and then fixed thereto.

Figure 45:
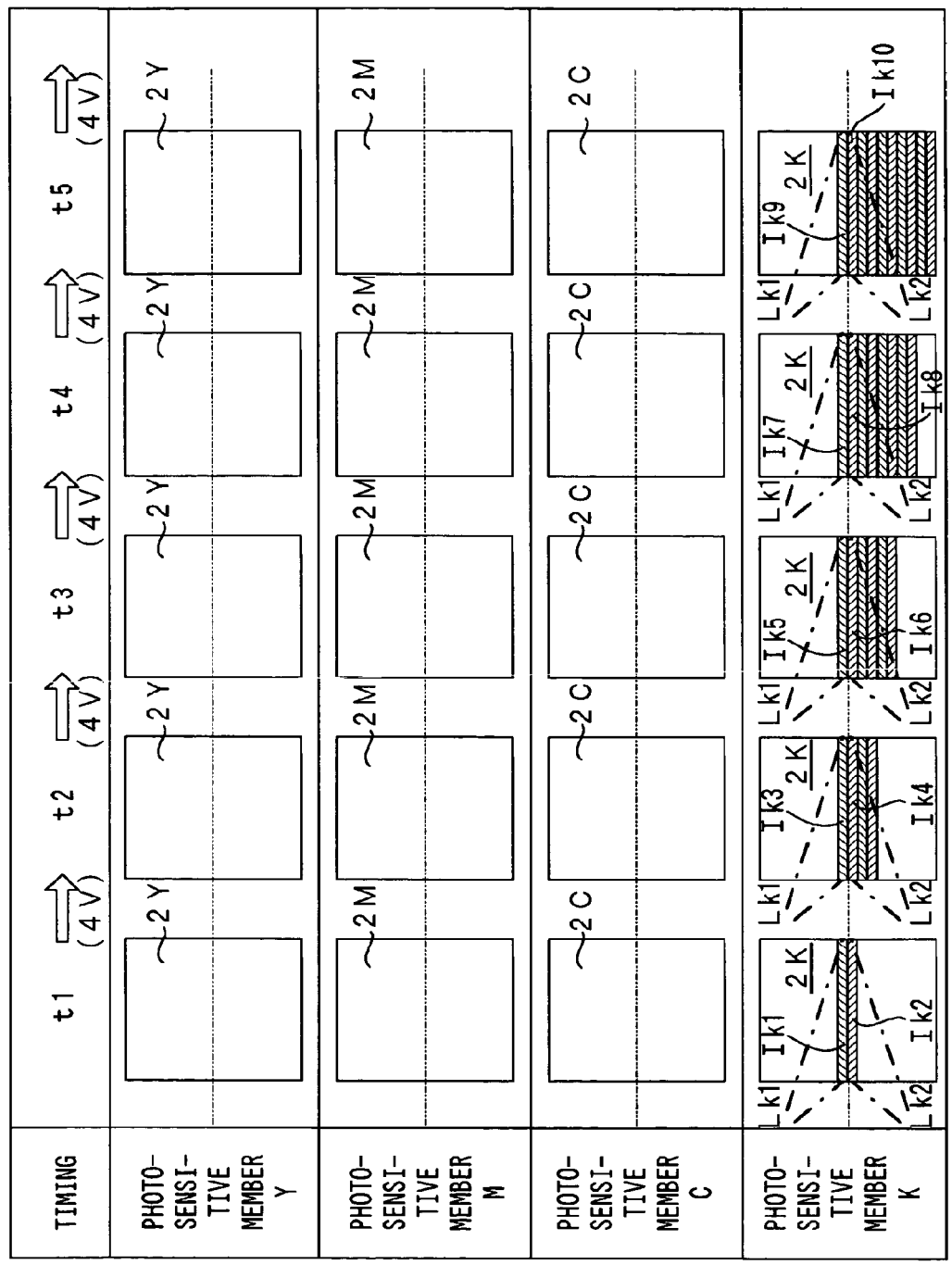
FIG. 45 is a schematic diagram showing one exemplary monochromatic-image forming operation performed by the image forming apparatus of FIG. 40.

FIG. 45 is a schematic diagram showing one exemplary monochromatic-image forming operation performed by the image forming apparatus of FIG. 40. Now referring to the figure, description is made as below on the monochromatic-image forming operation (monochromatic printing operation) of the image forming apparatus of FIG. 40. It is noted, however, that the monochromatic-image forming operation is essentially the same as the color-image forming operation except that only the black color component is used. Hence, the description will focus on a difference between these image forming operations.

When a monochromatic print command is supplied from the external apparatus such as a host computer, the image forming apparatus commits image data D included in the print command to storage in the image memory 113. The image data D includes a plurality of 1-line black-image data pieces. Each time 1-line image data pieces per page or given block of the image data D are stored in the image memory 113, the main controller 11 sequentially reads out the 1-line image data sets from the image memory 113 as timed to the writing of latent images to each of the photosensitive members 2. Based on the set of 1-line image data pieces thus read, the laser modulation data (PWM data 1, 2) are generated for modulation of the pulse widths of the light beams from the laser light sources 621, 622. The resultant data are outputted to the engine controller 10 via the unillustrated video IF.

Receiving the PWM data, the engine controller 10 forms two linear latent images at a time by scanning, in each timing, the two light beams on the black photosensitive member 2K as rotating the photosensitive members 2Y, 2M, 2C, 2K at a constant speed 4V Specifically, the laser light sources 621, 622 first emit the light beams to the optical scanning device 65 at a timing t1 under ON/OFF control based on a 1-line black-image data set. At the timing t1, the second axis driver 102c energizes the coil 655 thereby to set the deflector mirror plane 651 in position via the pivotal motion about the second axis AX2 as the switch axis so that the light beams may be guided to the photosensitive member 2K. After the pivotal motion about the second axis AX2 is stopped, the deflector mirror plane 651 thus set in position is brought into reciprocal oscillations about the first axis AX1 as the main-scan deflection axis by means of the first axis driver 102b applying the predetermined voltage alternately to the first axis electrode 658a and 658b. The deflector mirror plane deflects the light beams to scan along the main scan direction X. Thus, the light beams Lk1, Lk2 are scanned exclusively on the photosensitive member 2K for simultaneously forming two linear latent images Ik1, Ik2 corresponding the 1-line black-image data set, as illustrated by a column of "timing t1" in FIG. 45.

After completion of the formation of the linear latent images Ik1, Ik2, the laser light sources 621, 622 emit the light beams to the optical scanning device 65 at the subsequent timing t2 under ON/OFF control based on the subsequent 1-line image data set. At the timing t2, the deflector mirror plane 651 is not operated to pivot about the second axis AX2 and is set in the position for guiding the light beams to the photosensitive member 2K. In the position thus set, the deflector mirror plane 651 is brought into reciprocal oscillations about the first axis AX1 by means of the first axis driver 102b applying the predetermined voltage alternately to the first axis electrode 658a and 658b. The deflector mirror plane deflects the two light beams to scan along the main scan direction X. Thus, the light beams Lk1, Lk2 are scanned on the photosensitive member 2K so that linear latent images Ik3, Ik4 are simultaneously formed in correspondence to the subsequent 1-line image data set, as illustrated by a column of "timing t2" in FIG. 45.

In a similar manner to the above, black linear latent images (Ik5, Ik6), (Ik7, Ik8), (Ik9, Ik10), . . . are formed on the photosensitive member 2K at the respective timings t3, t4, t5, . . . . In this manner, latent images corresponding to the image data D are formed on the photosensitive member 2K. These latent images are developed into a black toner image by the developing unit 4K. The resultant toner image is primarily transferred onto the intermediate transfer belt 71. Thereafter, the toner image is secondarily transferred onto the sheet S and then fixed thereto.

Where time required for forming the color image in the aforementioned manner is compared with time required for forming the monochromatic image in the aforementioned manner, the rotational speed of the photosensitive member during the monochromatic printing is 4 times the rotational speed thereof during the color printing. Thus, 4 times higher print speed is attained for forming the image of the same resolution (high-speed monochromatic printing). Alternative settings may be made such that the rotational speed of the photosensitive member $2k$ is twice the color print speed and that the interval of scanning the light beams Lk1, Lk2 is increased to twice (double-speed monochromatic printing). The relation between the rotational speed of the photosensitive member 2K and the scan timing is not limited to those of the aforementioned high-speed monochromatic printing (FIG. 45) and the double-speed monochromatic printing but is arbitrary. In the high-speed monochromatic printing (FIG. 45) and the double-speed monochromatic printing, however, the print speed may be increased with the deflector mirror plane 651 maintained in the pivotal motion about the first axis AX1 in the resonant mode. This permits the apparatus to be switched between the color printing and the monochromatic printing without changing the pivotal motion of the deflector mirror plane 651. Hence, it is ensured that the image formation is performed in a stable manner. Furthermore, an exact control of the print speed is allowed with the deflector mirror plane 651 maintained in the pivotal motion in the resonant mode.

The following approach may be taken to increase the resolution of the monochromatic print. If the black linear latent images are formed on the photosensitive member 2K at the respective timings t1 to t5, . . . in the aforementioned manner while maintaining the rotational speed of the photosensitive member 2 at that of the color printing, a greater number of linear latent images for monochromatic image are formed per unit time than those for color image. Hence, a monochromatic image of higher definition can be formed. That is, the embodiment is adapted to vary the image resolution depending upon the color image or monochromatic image.

According to the embodiment, therefore, there may be obtained the following working effects additionally to the same effects (C) to (H), and (S) to (V) as those of the eleventh embodiment.

(W) Since two linear latent images are formed at a time by irradiating two scanned beams on any one of the four photosensitive members, there may be achieved twice the print speed of the single-beam image forming apparatus (eleventh to the eighteenth embodiments) wherein one linear latent image is formed at a time by irradiating a single scanned beam on the photosensitive member 2. Where the apparatus is set to the same print speed as that of the single-beam image forming apparatus, a main scan frequency of the scanned beam may be decreased and the modulation frequency of each laser light source may be decreased.

(X) In the above embodiment, the optical scanning device 65 switches the two scanned beams to be guided to a target photosensitive member. Hence, both of the two light beams from the light source section function as the scanned beams for forming the linear latent images on every photosensitive member 2. In contrast to the conventional apparatus wherein the light source is dedicated to each of the photosensitive members, therefore, the apparatus may be further reduced in size and costs. Furthermore, the operation for optical adjustment may be simplified. In addition, the embodiment is adapted for an arbitrary definition of the number M of light beams from the light source section, eliminating the restriction by the number N of photosensitive members 2. Therefore, a high degree of design freedom is provided.

(Y) The above embodiment is designed to perform the color printing operation using four color toners and the monochromatic printing operation using a black toner alone. In the monochromatic printing operation, the black color is defined as the "limited color" of the invention while the latent images are formed based on the 1-line image data pieces read out from the image data limited to the limited color. Specifically, 1-line image data sets (DLk1, DLk2) are serially read out from the image data of black (data block composed of plural 1-line image data pieces DLk1, DLk2 shown in FIG. 42). Each time the 1-line image data set (DLk1, DLk2) is read out, the modulated light beams are formed based on the image data set thus read. The scanned beams Lk1, Lk2 obtained by deflecting the modulated light beams are so set as to be guided to the black photosensitive member 2K so that the linear latent images Ik1, Ik2, . . . are sequentially formed thereon. Accordingly, only the 1-line image data sets (DLk1, DLk2) may be serially read out from the image memory 113 in an efficient manner, while two latent images may be formed at a time on the black photosensitive member 2K in correspondence to the 1-line image data set (DLk1, DLk2) thus read. Thus, the time required for accomplishing the monochromatic printing is reduced by performing such efficient data retrieval and forming the latent images based on the data thus retrieved (FIG. 45).

Twentieth Embodiment

The optical scanning device 650 employed by the tenth embodiment may be used for simultaneously deflecting two light beams. A twentieth embodiment employing the optical scanning device 650 principally differs from the eleventh embodiment in that this embodiment includes the light source section which comprises two laser light sources 621, 622 and which emits two light beams L1, L2, and in that the light beams L1, L2 are deflected by the deflector mirror planes 651a, 651b, respectively. Otherwise, the embodiment is arranged the same way as the eleventh embodiment and hence, the same reference numerals are used and the description thereof is dispensed with.

The twentieth embodiment thus arranged operates similarly to the nineteenth embodiment. When a color print command is supplied from the external apparatus such as a host computer, the apparatus commits the image data D included in the print command to storage in the image memory 113. At completion of the color separation of the image data D per page or given block, the main controller 11 sequentially reads out 1-line image data sets from the image memory 113 as timed to the writing of the latent images to each of the photosensitive members 2, so as to generate PWM data 1, 2. Based on the PWM data 1, 2, the light beams from the laser light sources 621, 622 are modulated. On the other hand, the deflector mirror planes 651a 651b deflect the light beams L1, L2 from the laser light sources 621, 622 along the main scan direction X thereby forming the scanned beams, and also selectively switch the scanned beams from one target (photosensitive member 2) to another in accordance with the order of reading out the 1-line image data sets. Hence, two linear latent images are formed at a time on the photosensitive member 2 corresponding to the switching operation. Incidentally, the monochromatic printing operation is also performed the same way as in the nineteenth embodiment.

As described above, the twentieth embodiment also offers the same working effects as the nineteenth embodiment. Furthermore, since a distance between the two scanned beams is controllable, the image quality may be improved by adjusting the distance between the scanned beams as required (Effect R).

While the twentieth embodiment is arranged such that the two deflector mirror planes 651a, 651b are driven into independent pivotal motions about the respective switch axes AX2, AX3, an alternative arrangement may be made such that both the mirror planes are interlinked so as to be driven in unison.

Although the nineteenth and twentieth embodiments employ the optical scanning devices 65, 650 as the "optical scan means" of the invention, there may also be used the optical scanning system 600 comprising the combination of the polygon mirror 601 and the switching pivotal mirror 602 or the combination of the two pivotal mirrors 603, 602.

In the nineteenth and the twentieth embodiments, the first scanning lens 66 and the second scanning lenses 68Y, 68M, 68C, 68K constitute the optical focusing system (second optical system). Specifically, the scanned beams Ly1, Ly2 are focused on the photosensitive member 2Y by means of the scanning lenses 66, 68Y; the scanned beams Lm1, Lm2 are focused on the photosensitive member 2M by means of the scanning lenses 66, 68M; the scanned beams Lc1, Lc2 are focused on the photosensitive member 2C by means of the scanning lenses 66, 68C; and the scanned beams Lk1, Lk2 are focused on the photosensitive member 2K by means of the scanning lenses 66, 68K. Similarly to the fourth to the eighth embodiments, the optical focusing system may comprise the aspherical single lens 661 alone. This optical focusing system may function as the "third optical system" of the invention. The same working effects as those of the foregoing embodiments may be obtained by the use of the aspherical single lens 661.

In the nineteenth and twentieth embodiments, the light source section emits two light beams whereas the optical scan means (optical scanning device 65, 600, 650) selectively switches the two scanned beams to any one of the photosensitive members for irradiation with the beams at a time. However, the number M of light beams emitted from the light source section (light source means) is not limited to "2" but may be 3 or more. Where the switchable selection of the photosensitive member is performed by the optical scanning device 650, it is desirable that the deflector mirror planes are provided by the same number as the number M of the light beams.

V. Miscellaneous

It is noted that the invention is not limited to the foregoing embodiments and various other changes or modifications than the above may be made so long such changes or modifications do not deviate from the effect of the invention. For instance, while the first to the tenth embodiments apply the invention to the color image forming apparatuses using the four color toners, the subjects of application of the invention are not limited to these. That is, the invention is applicable to all kinds of image forming apparatuses using a single color toner or plural color toners.

While the eleventh to the twenties embodiments apply the invention to the image forming apparatuses wherein the toner images of four colors are formed on the respective photosensitive members 2Y, 2M, 2C, 2k, the invention is applicable to all kinds of so-called tandem-type image forming apparatuses. In other words, the invention may be applied to all kinds of image forming apparatuses including N latent image carriers (N denoting a natural number of N≧2) on which the linear latent images are formed by scanning the light beam(s) thereon along the main scan direction. Such apparatuses offer the same working effects as the foregoing embodiments.

While the foregoing embodiments select black as the "limited color" of the invention, another color may be defined as the limited color. Otherwise, two or three of the four colors may be selected as the "limited colors". That is, the invention may be applied to an image forming apparatus which forms a color image based on image data of N colors (N denoting a natural number of N≧2) and which also forms an image other than the color image as limiting the number of usable colors to (N−1) or less.

The foregoing embodiments have been described by way of example of the printer which responds to a print command supplied form the external apparatus such as a host computer and prints an image included in the print command on the sheet S such as a transfer sheet, or copy sheet. However, the invention is not limited by this and may be applied to all kinds of electrophotographic image forming apparatuses including copiers, facsimiles and the like.

Although the invention has been described with reference to specific embodiments, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. An image forming apparatus including N latent image carriers (N denoting a natural number of N≧2) each formed with a linear latent image on its surface by scanning a single light beam thereon along a main scan direction, the apparatus comprising:
    a light source for emitting a single light beam; and
    optical scan means operative to deflect the light beam from said light source for scanning along said main scan direction and to guide said scanned beam along a sub-scan direction different from said main scan direction, thereby selectively switching the light beam to any one of said N latent image carriers for irradiation with said scanned beam,
    wherein said optical scan means comprises:
        an inner movable member having a deflector mirror plane for reflecting the light beam from said light source;
        an outer movable member for pivotally supporting said inner movable member about a first axis;
        a support member for pivotally supporting said outer movable member about a second axis different from said first axis; and
        a mirror driver section for driving said inner movable member into pivotal motion about said first axis and said outer movable member into pivotal motion about said second axis,
    wherein said mirror driver section drives said deflector mirror plane into pivotal motion about a main-scan deflection axis defined by either one of said first axis and said second axis thereby scanning the light beam from said light source along said main scan direction, and also drives said deflector mirror plane into pivotal motion about a switch axis defined by the other axis thereby selectively switching said scanned beam to any one of the latent image carriers for irradiation with said scanned beam,
    wherein the apparatus further comprises a third optical system for focusing the light beam, scanned by said deflector mirror plane along said main scan direction, on the latent image carrier to which the scanned beam is guided by said deflector mirror plane, and
    wherein said third optical system comprises a single lens and has a distortion characteristic that the scanned beam deflected based on a swinging characteristic intrinsic to said deflector mirror plane is moved on the surface of each latent image carrier at a constant speed, the third optical system specified that opposite sides in a tangential plane are formed in mutually different non-arcuate shapes in a manner to correct for tangential field-curvature aberration in the light beam at any position on the surface of each latent image carrier, and that sagital curvatures at positions on the non-arcuate curve of at least either one of said opposite sides in the tangential plane are varied non-correlatively of the tangential curvature in order to correct for sagital field-curvature aberration in the light beam.

2. An image forming apparatus as claimed in claim 1, wherein said inner movable member, said outer movable member and said support member are formed of monocrystalline silicon.

3. An image forming apparatus as claimed in claim 1, wherein said mirror driver section drives said deflector mirror plane into pivotal motion about said main-scan deflection axis in a resonant mode.

4. An image forming apparatus as claimed in claim 1, wherein said mirror driver section drives said deflector mirror plane into pivotal motion about said main-scan deflection axis by way of an electrostatic attractive force.

5. An image forming apparatus as claimed in claim 1, wherein said mirror driver section positions said deflector mirror plane by pivotally moving the same about said switch axis in a non-resonant mode.

6. An image forming apparatus as claimed in claim 1, wherein said mirror driver section positions said deflector mirror plane by pivotally moving the same about said switch axis by way of an electromagnetic force.

7. An image forming apparatus as claimed in claim 1, further comprising:
- a first optical system disposed between said light source and said optical scan means and operative to converge the light beam from said light source in said subscan direction thereby linearly focusing the light beam on said deflector mirror plane; and
- a second optical system disposed between each of said N latent image carriers and said optical scan means and operative to focus the scanned beam from said optical scan means on the corresponding latent image carrier.

8. An image forming apparatus including N latent image carriers (N denoting a natural number of N≧2) each formed with a linear latent image on its surface by scanning a single light beam thereon along a main scan direction, the apparatus comprising:
- a light source for emitting a single light beam; and
- optical scan means operative to deflect the light beam from said light source for scanning along said main scan direction and to guide said scanned beam along a sub-scan direction different from said main scan direction, thereby selectively switching the light beam to any one of said N latent image carriers for irradiation with said scanned beam,
- wherein said optical scan means comprises:
  - a polygon mirror having a plurality of deflector mirror planes for reflecting the light beam and driven into rotation about a main-scan deflection axis perpendicular to said main scan direction thereby deflectively scanning the light beam along said main scan direction via said deflector mirror planes; and
  - a switching pivotal mirror having a switching reflector plane for reflecting the light beam and pivotally moved about a switch axis perpendicular to said subscan direction for switching the light beam to any one of the latent image carriers for irradiation with the light beam,
- wherein either one of said polygon mirror and said switching pivotal mirror is disposed at the site of said light source for reflecting the light beam from said light source, whereas the other mirror operates to reflect the light beam from said one mirror,
- wherein the apparatus further comprises a third optical system for focusing the light beam, scanned by said deflector mirror plane along said main scan direction, on the latent image carrier to which the scanned beam is guided by said deflector mirror plane, and
- wherein said third optical system comprises a single lens and has a distortion characteristic that the scanned beam deflected based on a swinging characteristic intrinsic to said deflector mirror plane is moved on the surface of each latent image carrier at a constant speed, the third optical system specified that opposite sides in a tangential plane are formed in mutually different non-arcuate shapes in a manner to correct for tangential field-curvature aberration in the light beam at any position on the surface of each latent image carrier, and that sagital curvatures at positions on the non-arcuate curve of at least either one of said opposite sides in the tangential plane are varied non-correlatively of the tangential curvature in order to correct for sagital field-curvature aberration in the light beam.

9. An image forming apparatus as claimed in claim 8, further comprising:
- a first optical system disposed between said light source and said deflector mirror plane and operative to converge the light beam from said light source in said subscan direction thereby linearly focusing the light beam on said deflector mirror plane; and
- a second optical system disposed between each of said N latent image carriers and said deflector mirror plane and operative to focus the scanned beam from said deflector mirror plane on the corresponding latent image carrier.

10. An image forming apparatus including N latent image carriers (N denoting a natural number of N≧2) each formed with a linear latent image on its surface by scanning a single light beam thereon along a main scan direction, the apparatus comprising:
- a light source for emitting a single light beam; and
- optical scan means operative to deflect the light beam from said light source for scanning along said main scan direction and to guide said scanned beam along a sub-scan direction different from said main scan direction, thereby selectively switching the light beam to any one of said N latent image carriers for irradiation with said scanned beam
- wherein said optical scan means comprises:
  - a main-scanning pivotal mirror having a deflector mirror plane for reflecting the light beam and pivotally moved about a main-scan deflection axis perpendicular to said main scan direction thereby deflectively scanning the light beam along said main scan direction via said deflector mirror plane; and
  - a switching pivotal mirror having a switching reflector plane for reflecting the light beam and pivotally moved about a switch axis perpendicular to said sub-scan direction for switching the light beam to any one of the latent image carriers for irradiation with the light beam,
- wherein either one of said main-scanning pivotal mirror and said switching pivotal mirror is disposed at the site of said light source for reflecting the light beam from said light source, whereas the other mirror operates to reflect the light beam from said one mirror,
- wherein the apparatus further comprises a third optical system for focusing the light beam, scanned by said deflector mirror plane along said main scan direction, on the latent image carrier to which the scanned beam is guided by said deflector mirror plane, and
- wherein said third optical system comprises a single lens and has a distortion characteristic that the scanned beam deflected based on a swinging characteristic intrinsic to said deflector mirror plane is moved on the surface of each latent image carrier at a constant speed, the third optical system specified that opposite sides in a tangential plane are formed in mutually different non-arcuate shapes in a manner to correct for tangential field-curvature aberration in the light beam at any position on the surface of each latent image carrier, and that sagital curvatures at positions on the non-arcuate curve of at least either one of said opposite sides in the tangential plane are varied non-correlatively of the tangential curvature in order to correct for sagital field-curvature aberration in the light beam.

11. An image forming apparatus as claimed in claim 10, further comprising:
- a first optical system disposed between said light source and said deflector mirror plane and operative to converge the light beam from said light source in said subscan direction thereby linearly focusing the light beam on said deflector mirror plane; and
- a second optical system disposed between each of said N latent image carriers and said deflector mirror plane and operative to focus the scanned beam from said deflector mirror plane on the corresponding latent image carrier.

12. An image forming apparatus as claimed in claim 1 designed to form images of different N colors on said N latent image carriers, respectively, the apparatus further comprising:

storage means for storing N image data items representative of images of said N colors; and control means which reads out a 1-line image data piece, equivalent to one scan stroke of the scanned beam, from the image data item of a color stored in said storage means and then, modulates said scanned beam based on the 1-line image data piece for forming a linear latent image on a latent image carrier corresponding to the color of interest, wherein said control means serially reads out the 1-line image data pieces one by one from said storage means as selectively switching a reading source of the 1-line image data piece among said N image data items and then, in association with each 1-line image data piece thus read, switches a target of the scanned beam guided by said optical scan means for establishing correspondence between the latent image carrier and the color component of the read data.

* * * * *